(12) United States Patent
Chiba et al.

(10) Patent No.: US 8,301,691 B2
(45) Date of Patent: Oct. 30, 2012

(54) SERVER APPARATUS, NETWORK SYSTEM, DATA TRANSFER METHOD, AND PROGRAM

(75) Inventors: Hiroyuki Chiba, Kanagawa (JP); Akihiko Kinoshita, Tokyo (JP); Takashi Kanao, Tokyo (JP); Tsuyoshi Honma, Chiba (JP)

(73) Assignee: Sony Corporation (JP)

( * ) Notice: Subject to any disclaimer, the term of this patent is extended or adjusted under 35 U.S.C. 154(b) by 274 days.

(21) Appl. No.: 12/384,004

(22) Filed: Mar. 31, 2009

(65) Prior Publication Data
US 2009/0248797 A1   Oct. 1, 2009

(30) Foreign Application Priority Data
Apr. 1, 2008 (JP) ................ P2008-094985

(51) Int. Cl.
*G06F 15/16* (2006.01)
(52) U.S. Cl. .......... 709/203; 709/204; 709/205
(58) Field of Classification Search .......... 709/201, 709/203, 204, 205, 217, 219
See application file for complete search history.

(56) References Cited

U.S. PATENT DOCUMENTS

| | | | |
|---|---|---|---|
| 2001/0027472 A1* | 10/2001 | Guan | 709/203 |
| 2002/0184318 A1* | 12/2002 | Pineau | 709/206 |
| 2004/0039781 A1* | 2/2004 | LaVallee et al. | 709/205 |
| 2004/0143669 A1* | 7/2004 | Zhao et al. | 709/228 |
| 2007/0271338 A1* | 11/2007 | Anschutz | 709/204 |
| 2009/0182806 A1* | 7/2009 | Shivaji-Rao | 709/203 |

FOREIGN PATENT DOCUMENTS

| | | |
|---|---|---|
| JP | 2002-328860 A | 11/2002 |
| JP | 2003-030072 A | 1/2003 |
| JP | 2006-109152 A | 4/2006 |

* cited by examiner

*Primary Examiner* — Barbara Burgess
(74) *Attorney, Agent, or Firm* — Lerner, David, Littenberg, Krumholz & Mentlik, LLP

(57) ABSTRACT

Disclosed is a server apparatus including a registration means for associating a first apparatus with a plurality of second apparatuses as the control targets thereof, and registering the first apparatus and the plurality of second apparatuses associated, a constant connection session establishment means for establishing a constant connection session with each of the plurality of second apparatuses, a request reception means for receiving from the first apparatus a first request to transfer data between the plurality of second apparatuses, and a request transmission means for transmitting a second request to directly transfer data between the plurality of second apparatuses to one of the plurality of second apparatuses through the constant connection session in response to the received first request.

10 Claims, 54 Drawing Sheets

| No. | Outline of interface function (main parameter) | Protocol used | Access I/F |
|---|---|---|---|
| R-0: Request<br>R-0R: Response | Apparatus authentication<br>(Request: authentication method, apparatus authentication information<br>Response: apparatus authentication continuation ID, expiration date of apparatus authentication continuation ID) | SOAP/HTTP(S) | [IF-00] |
| R-1: Request<br>R-1R: Response | Controlled apparatus registration<br>(Request: user identification information<br>Response: controlled apparatus registration password, expiration date of password) | HTTP(S) | [IF-01] |
| R-2: Request<br>R-2R: Response | Controller/service management ID obtainment<br>(Request: service ID<br>Response: Controller/service management ID) | SOAP/HTTP(S) | [IF-02] |
| R-3: Request<br>R-3R: Response | Controlled apparatus registration password obtainment<br>(Request: service ID, controller/service management ID<br>Response: controlled apparatus registration password, expiration date of password) | SOAP/HTTP(S) | [IF-02] |
| R-5: Request | Onetime password transmission<br>(Request: controlled apparatus registration password) | Infrared communication | [IF-03] |
| R-6: Request<br>R-6R: Response | Controlled apparatus registration<br>(Request: apparatus authentication continuation ID, controlled apparatus registration password<br>Response: number of services currently associated) | SOAP/HTTP(S) | [IF-00] |
| R-7: Request<br>R-7R: Response | Controlled apparatus registration completion notification<br>(Request: service ID, apparatus/service management ID, controlled apparatus registration password<br>Response: "none") | SOAP/HTTP(S) | [IF-05] |

FIG.3

| No | Outline of interface function (main parameter) | Protocol used | Access I/F |
|---|---|---|---|
| D-0-1: Request<br>D-0-1R: Response | XMPP login information obtainment<br>(Request: apparatus authentication continuation ID<br>Response: Full JID(D), XMPP password/expiration date, XMPP address/port, authentication method, SSL option, cryptography key) | SOAP/HTTP(S) | [IF-00] |
| D-0-2: Request<br>D-0-2R: Response | XMPP login authentication<br>(Request: Full JID(D), XMPP login password<br>Response: OK or NG) | XMPP<br>(automatic login and constant session establishment) | [IF-06] |
| DM-0: Request<br>DM-0R: Response | Apparatus detection<br>(Request: Nonce, encrypted Full JID(D) of A<br>Response: encrypted Full JID(D) of B) | UDP<br>(request: multicast, response: unicast) | [IF-32] |

FIG.10

| No. | Outline of interface function (main parameter) | Protocol used | Access I/F |
|---|---|---|---|
| D-1: Request<br>D-3: Response | Controlled apparatus list obtainment<br>(Request: user identification information<br>Response: controlled apparatus list) | HTTP(S) | [IF-01] |
| D-2: Request<br>D-2R: Response | Controlled apparatus list obtainment<br>(Request: service ID, controller/service management ID<br>Response: controlled apparatus list) | SOAP/HTTP(S) | [IF-02] |
| D-4: Request<br>D-4R: Response | Content list obtainment<br>(Request: user identification information,<br>controlled apparatus number, search condition<br>Response: content list) | SOAP/HTTP(S) | [IF-01] |
| D-5: Request<br>D-5R: Response | XMPP login<br>(Request: service ID, controller/service<br>management ID, controlled apparatus number<br>Response: XMPP session ID) | SOAP/HTTP(S) | [IF-02] |
| D-6: Request<br>D-6R: Response | Direct access start<br>(Request: service ID, controller/service management ID,<br>controlled apparatus number, URN (content obtainment<br>service), XMPP session ID<br>Response: Direct access URI) | SOAP/HTTP(S) | [IF-02] |
| D-7: Request<br>D-7R: Response | URI obtainment<br>(Request: URN<br>Response: Direct access URI list) | XMP2P | [IF-07] |
| D-8: Request<br>D-8R: Response | NAT setting of port for direct access<br>(Request: Local IP address/port<br>Response: Global IP address/port) | UPnP | [IF-08] |

FIG.15

| No. | Outline of interface function (main parameter) | Protocol used | Access I/F |
|---|---|---|---|
| D-19: Request<br>D-19R: Response | Content list obtainment<br>(Request: search condition<br>Response: content list) | SOAP/HTTP(S) | [IF-09] |
| C-2: Request<br>C-2R: Response | Direct access termination notification<br>(Request: service ID, controller/service management ID, XMPP session ID, URN, direct access URI<br>Response: "none") | SOAP/HTTP(S) | [IF-02] |
| C-3: Request | Direct access termination notification<br>(Request: URN, direct access URI) | XMP2P | [IF-07] |
| C-4: Request | Closing of direct access port<br>(Request: global IP address/port) | UPnP | [IF-08] |
| C-5: Request<br>C-5R: Response | XMPP logout notification<br>(Request: service ID, controller/service management ID, XMPP session ID<br>Response: "none") | SOAP/HTTP(S) | [IF-02] |

FIG.16

| No. | Outline of interface function (main parameter) | Protocol used | Access I/F |
|---|---|---|---|
| DM-1: Request<br>DM-1R: Response | Direct access instruction<br>(Request: user identification information, controlled apparatus number (A), controlled apparatus number (B), content of direct access instruction<br>Response: transaction ID) | HTTP(S) | [IF-01] |
| DM-2: Request<br>DM-2R: Response | Direct access instruction<br>(Request: service ID, controller/service management ID, controlled apparatus number (A), controlled apparatus number (B), content of direct access instruction<br>Response: transaction ID, access route information) | SOAP/HTTP(S) | [IF-02] |
| DM-3: Request<br>DM-3R: Response | Direct access instruction<br>(Request: content of direct access instruction, transaction ID, Full JID(D) of B<br>Response: access route information, global IP address/port, OTP) | XMP2P | [IF-07] |
| DM-4: Request<br>DM-4R: Response | URI obtainment<br>(Request: URN (data copy)<br>Response: Local URI) | SOAP/HTTP(S) | [IF-32] |

FIG.26

| No. | Outline of interface function (main parameter) | Protocol used | Access I/F |
|---|---|---|---|
| DM-5: Request<br>DM-5R: Response | Direct access<br>(Request: to Local URI (or request pass), content pass, (OTP)<br>Response: content data) | SOAP/HTTP(S) | [IF-32]<br>[IF-33]:<br>in case of tunneling |
| DM-6: Request<br>DM-6R: Response | Status notificatio<br>(Request: apparatus authentication continuation ID, transaction ID, status<br>Response: "none") | SOAP/HTTP(S) | [IF-00] |
| DM-7: Request<br>DM-7R: Response | Status notification<br>(Request: transaction ID, status<br>Response: "none") | SOAP/HTTP(S) | [IF-05] |
| DM-8: Request<br>DM-8R: Response | Status check<br>(Request: user identification information, transaction ID<br>Response: status) | HTTP(S) | [IF-01] |
| DM-9: Request<br>DM-9R: Response | Direct access instruction 2<br>(Request: content of direct access instruction, transaction ID, Global URI, OTP<br>Response: "none") | XMP2P | [IF-07] |

FIG.27

| No. | Outline of interface function (main parameter) | Protocol used | Access I/F |
|---|---|---|---|
| S-4: Request<br>S-4R: Response | Callback request<br>(Request: URN (data copy), global IP address/port, OTP<br>Response: request pass = NULL) | XMP2P | [IF-07] |
| S-6: Request<br>S-6R: Response | Direct access session establishment request<br>(Request: to global IP address/port, OTP, request pass<br>Response: authentication result | TCP (unique) | [IF-31] |

FIG.28

| No. | Outline of interface function (main parameter) | Protocol used | Access I/F |
|---|---|---|---|
| DM-11: Request<br>DM-11R: Response | Direct access control<br>(Request: user identification information, content of direct access control, transaction ID<br>Response: direct access control result, status) | HTTP(S) | [IF-01] |
| DM-12: Request<br>DM-12R: Response | Direct access control<br>(Request: service ID, controller/service management ID, content of direct access control, transaction ID<br>Response: direct access control result, status) | SOAP/HTTP(S) | [IF-02] |
| DM-13: Request<br>DM-13R: Response | Direct access control<br>(Request: content of direct access control, transaction ID<br>Response: direct access control result, status) | XMP2P | [IF-07] |

FIG.29

Dev-ID0001@dap.sony.com/ Product code-serial number

⎵ Bare JID ⎵ ⎵ Resource ⎵

⎵ Full JID(D) ⎵

FIG.53

Dev-ID0001@dap.sony.com/Controller/service management ID-01234

Bare JID | Resource

Full JID(D)

FIG.54

SERVER APPARATUS, NETWORK SYSTEM, DATA TRANSFER METHOD, AND PROGRAM

The present application claims priority from Japanese Patent Application No. JP 2008-094985, filed in the Japanese Patent Office on Apr. 1, 2008, the entire content of which is incorporated herein by reference.

BACKGROUND OF THE INVENTION

1. Field of the Invention

The present invention relates to a server apparatus, a network system, a data transfer method, and a program.

2. Description of the Related Art

For accessing a controlled apparatus in a home from a controller on the Internet, a DDNS (Dynamic Domain Name System), an e-mail system, or the like may be used.

In the DDNS, a controlled apparatus in a home registers an own address in a DDNS server. When the controlled apparatus receives a domain name and a port number that are specified by a controller on the Internet, the controller is allowed to access the controlled apparatus.

As a protocol for realizing a real-time communication, an XMPP (extensible Messaging and Presence Protocol) has been proposed (see, "Extensible Messaging and Presence Protocol (XMPP): Core", RFC3920, The Internet Engineering Task Force (IETF), October, 2004). One of forms of the real-time communication using the XMPP is an instant messaging (IM) (see, "Extensible Messaging and Presence Protocol (XMPP) Instant Messaging and Presence", RFC3921, The Internet Engineering Task Force (IETF), October, 2004). In the instant messaging (IM), whether IM clients (members among whom an IM exchange can be made) are online is checked. When the IM clients are online, an online conversation (chat) or a file exchange can be made with the IM clients.

Further, as a protocol for calling data or a service in another computer, an SOAP (Simple Object Access Protocol) has been proposed (see, "SOAP Version 1.2", W3C Recommendation, World Wide Web Consortium (W3C), June, 2003). In communication using the SOAP, a message in which collateral information called envelope is attached to an XML (extensible Markup Language) document is exchanged using a protocol such as an HTTP (Hyper Text Transfer Protocol). Clients that use a service and a server that provides the service both have a creation/interpretation engine of the SOAP, which makes it possible to call an object between different environments.

SUMMARY OF THE INVENTION

As a system for accessing from a controller of a user an in-home controlled apparatus as a controlled target thereof via a network, the following system has been studied. That is, in the system, a combination of the controller and kinds of services and the controlled apparatus as the controlled target thereof are associated and registered. In response to an access request from the controller, a direct access management server judges the controlled apparatus as the controlled target thereof based on the association, and provides information required to directly access the controlled apparatus to the controller.

In a situation in which there are a plurality of controlled apparatuses as controlled targets of a controller of a user, data can be transferred between the controller of the user and each of the controlled apparatuses. However, for transferring data from one controlled apparatus to another controlled apparatus, the controller has to obtain data from the one controlled apparatus and then transmit the obtained data to the other controlled apparatus, which is inefficient. This problem is particularly remarkable in a case of transferring large-volume data.

Incidentally, in a DLNA (Digital Living Network Alliance) which is an industry standard of a system for connecting electric apparatuses in a home via a network, it is possible to perform real-time, direct communication such as data transfer from one controlled apparatus to another controlled apparatus. In the DLNA, although the controller and the controlled apparatuses are registered in one another through dynamic apparatus detection on the same LAN, to thereby enable data transfer between the controlled apparatuses connected via the same LAN, registration of the controller and the controlled apparatuses connected via the Internet in one another is not supported. Therefore, it is also impossible to transfer data between the controlled apparatuses connected via the Internet.

In view of the above-mentioned circumstances, it is desirable to provide a server apparatus, a network system, a data transfer method, and a program capable of transferring data from one controlled apparatus to another controlled apparatus through an operation using a controller, and efficiently transferring data between the controlled apparatuses.

According to an embodiment of the present invention, there is provided a server apparatus. The server apparatus includes a registration means, a constant connection session establishment means, a request reception means, and a request transmission means.

The registration means associates a first apparatus with a plurality of second apparatuses as the control targets thereof, and registers the first apparatus and the plurality of second apparatuses associated. The constant connection session establishment means establishes a constant connection session with each of the plurality of second apparatuses. The request reception means receives from the first apparatus a first request to transfer data between the plurality of second apparatuses. The request transmission means transmits a second request to directly transfer data between the plurality of second apparatuses to one of the plurality of second apparatuses through the constant connection session in response to the received first request.

With this structure, a service of directly transferring data from the one of the second apparatuses to the other through the operation using the first apparatus can be provided based on the association between the first apparatus and the plurality of second apparatuses as the control targets of the first apparatus and the constant connection session established between the first apparatus and the plurality of second apparatuses. Thus, the data transfer between the plurality of the second apparatuses can be effectively performed.

The first request may include information to specify one of the plurality of second apparatuses as a data transfer source, information to specify one of the plurality of second apparatuses as a data transfer destination, and information to specify data to be transferred, and the request transmission means may transmit the second request to the second apparatus as the data transfer destination through the constant connection session.

With this structure, the content specified by the first apparatus can be transferred from the second apparatus as the data transfer source to the second apparatus as the data transfer destination, each of which are specified by the first apparatus.

The server apparatus according to the embodiment further includes means for receiving, from the one of the plurality of second apparatuses that receives the second request, information relating to an access route between the plurality of second apparatuses, and means for exchanging, in a case where it is determined that the access route between the plurality of second apparatuses is the Internet based on the received information relating to the access route, information between the plurality of second apparatuses, which is necessary to directly transfer data between the plurality of second apparatuses via the Internet.

With this structure, even in a case where the plurality of second apparatuses are connected via the Internet, a service of directly transferring data from the one of the second apparatuses to the other via the Internet through the operation using the first apparatus can be provided.

The server apparatus according to the embodiment further includes means for setting, in a case where the information necessary to directly transfer data between the plurality of second apparatuses via the Internet is failed to be obtained, a port for tunneling, and transmitting information necessary to access the port for tunneling to the one of the plurality of second apparatuses via the constant connection session, and means for performing control such that data is transferred between the plurality of second apparatuses via the port for tunneling and the constant connection session established with the other one of the plurality of second apparatuses.

With this structure, even in a case where the server apparatus fails to obtain information necessary to directly transfer data between the plurality of second apparatuses via the Internet, data can be transferred from the one of the plurality of second apparatuses to the other through the operation using the first apparatus.

The server apparatus according to the embodiment may further include means for receiving a data transfer completion notification from the one of the plurality of second apparatuses and means for transmitting to the first apparatus the data transfer completion notification received from the one of the plurality of second apparatuses. With this structure, the first apparatus can confirm the status of the data transfer.

The server apparatus according to the embodiment further includes means for receiving from the first apparatus a third request to cancel data transfer in progress between the plurality of second apparatuses, and means for transmitting a request to stop data transfer in progress between the plurality of second apparatuses to one of the plurality of second apparatuses via the constant connection session in response to the third request.

According to another embodiment of the present invention, there is provided a network system. The network system includes a first apparatus, a plurality of second apparatuses, each of which is a control target of the first apparatus, and a server apparatus. In the network system, the first apparatus includes a first request transmission means for transmitting to the server apparatus a first request to transfer data between the plurality of second apparatuses. The server apparatus includes a registration means for associating the first apparatus with the plurality of second apparatuses as the control targets thereof and registering the first apparatus and the plurality of second apparatuses associated, a constant connection session establishment means for establishing a constant connection session with each of the plurality of second apparatuses, a request reception means for receiving from the first apparatus a first request to transfer data between the plurality of second apparatuses, and a second request transmission means for transmitting a second request to directly transfer data between the plurality of second apparatuses to one of the plurality of second apparatuses through the constant connection session in response to the received first request. The plurality of second apparatuses each include a data transfer means for transferring data between the plurality of second apparatuses in response to the second request from the server apparatus.

According to another embodiment of the present invention, there is provided a data transfer method for a network system including a first apparatus, a plurality of second apparatuses as control targets thereof, and a server apparatus. The data transfer method includes transmitting a first request to transfer data between the plurality of the second apparatuses from a first request means of the first apparatus to the server apparatus, associating the first apparatus with the plurality of second apparatuses and registering the first apparatuses and the plurality of second apparatuses by a registering means of the server apparatus, establishing a constant connection session with each of the plurality of second apparatuses by a constant connection session establishment means of the server apparatus, transmitting a second request to directly transfer data between the plurality of second apparatuses to one of the plurality of second apparatuses through the constant connection session by a second request transmission means of the server apparatus in response to the first request received from the first apparatus, and transferring data between the plurality of second apparatuses by a data transfer means of the plurality of second apparatuses in response to the second request from the server apparatus.

According to another embodiment of the present invention, there is provided a program for causing a computer to function as a registration means for associating the first apparatus with the plurality of second apparatuses as the control targets thereof and registering the first apparatus and the plurality of second apparatuses associated, a constant connection session establishment means for establishing a constant connection session with each of the plurality of second apparatuses, a request reception means for receiving from the first apparatus a first request to transfer data between the plurality of second apparatuses, and a request transmission means for transmitting a second request to directly transfer data between the plurality of second apparatuses to one of the plurality of second apparatuses through the constant connection session in response to the received first request.

According to another embodiment of the present invention, there is provided a server apparatus. The server apparatus includes a registration unit, a constant connection session establishment unit, a request reception unit, and a request transmission unit. The registration unit associates a first apparatus with a plurality of second apparatuses as the control targets thereof, and registers the first apparatus and the plurality of second apparatuses associated. The constant connection session establishment unit establishes a constant connection session with each of the plurality of second apparatuses. The request reception unit receives from the first apparatus a first request to transfer data between the plurality of second apparatuses. The request transmission unit transmits a second request to directly transfer data between the plurality of second apparatuses to one of the plurality of second apparatuses through the constant connection session in response to the received first request.

According to the embodiments of the present invention, the data can be transferred from the one of the controlled apparatuses to the other through the operation using the controller, and therefore the data transfer can be effectively performed between the controlled apparatuses.

These and other objects, features and advantages of the present invention will become more apparent in light of the following detailed description of best mode embodiments thereof, as illustrated in the accompanying drawings.

BRIEF DESCRIPTION OF DRAWINGS

FIG. 3 is a table showing functions of interfaces relating to the registration of the combination of the controller and the service and the registration of the controlled apparatus;

FIG. 10 is a table showing functions of interfaces at the time of the XMPP login of the controlled apparatus;

FIG. 15 is a table showing functions of interfaces at the time of a processing of obtaining the content list through the direct access;

FIG. 16 is a table showing functions of interfaces at the time of a processing of obtaining the content list through the direct access;

FIG. 26 is a table showing functions of interfaces relating to the copy processing of content data;

FIG. 27 is a table showing functions of interfaces relating to the copy processing of content data;

FIG. 28 is a table showing functions of interfaces relating to the copy processing of content data;

FIG. 29 is a table showing functions of interfaces relating to the copy processing of content data;

FIG. 53 is a diagram showing a structure of a Full JID(D); and

FIG. 54 is a diagram showing another structure of a Full JID(D).

DESCRIPTION OF PREFERRED EMBODIMENTS

Hereinafter, an embodiment of the present invention will be described with reference to the drawings.

Figure 1:
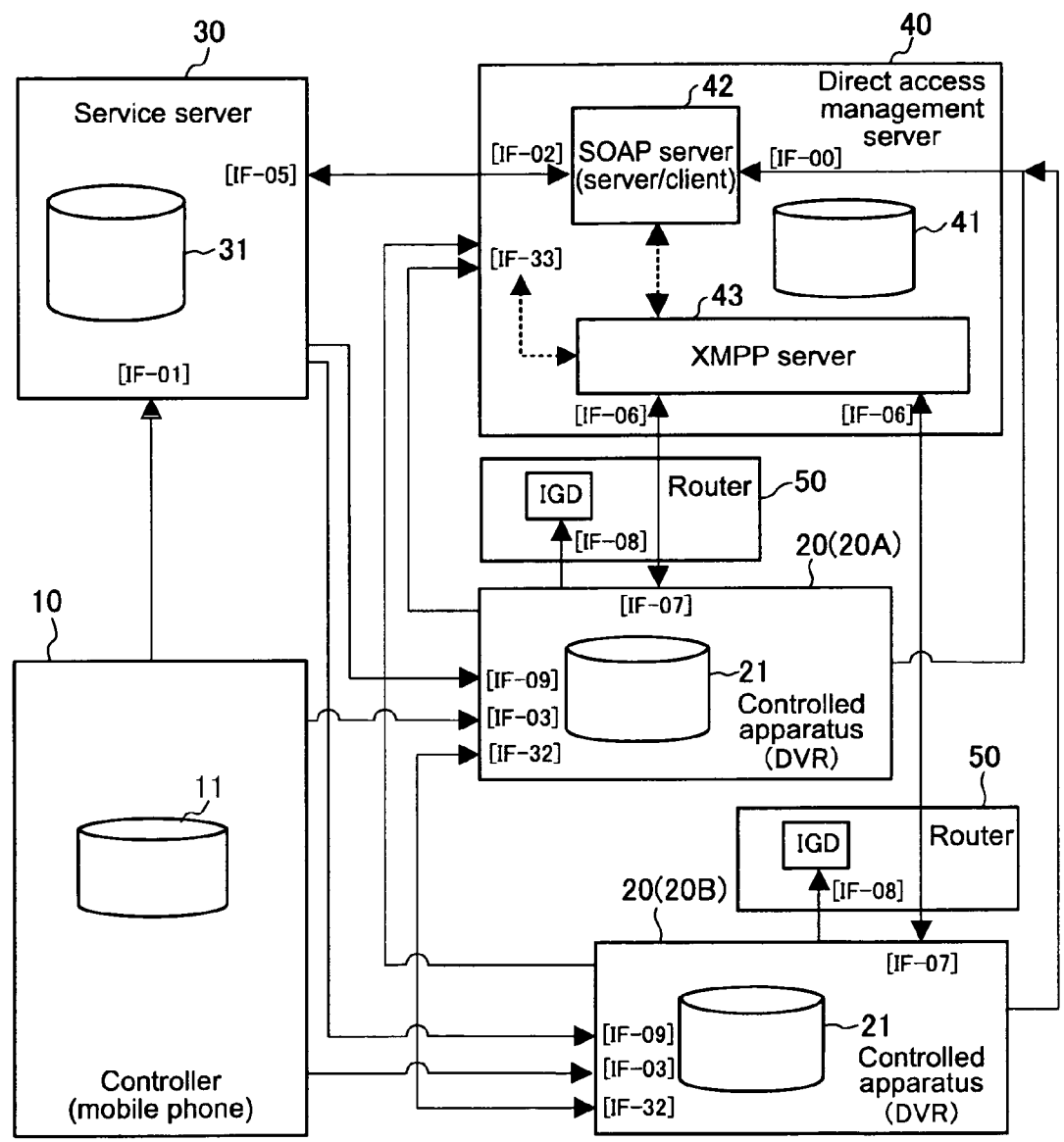
FIG. 1 is a diagram showing an overall structure of a network system according to an embodiment of the present invention.

FIG. 1 is a diagram showing an overall structure of a network system according to an embodiment of the present invention.

The network system includes a controller 10 such as a mobile phone, controlled apparatuses 20 (20A, 20B) as network electric appliances such as a DVR (Digital Video Recorder), a service server 30, a direct access management server 40, and a router 50. The controlled apparatuses 20 (20A, 20B) can be connected via the same LAN or the Internet. It should be noted that FIG. 1 shows a case where the controlled apparatuses 20 (20A, 20B) can be respectively connected to the Internet via the router 50. Hereinafter, for specifying individual controlled apparatuses, descriptions of "controlled apparatus 20A" and "controlled apparatus 20B" will be used. Otherwise, the description of "controlled apparatus 20" will be used.

The controller 10 operates for controlling the controlled apparatus 20. Any apparatus such as a mobile phone, a PC (Personal Computer), and a PDA (Personal Digital Assistance) may serve as the controller 10, as long as the controller 10 can control the controlled apparatus 20.

The controller 10 includes a main memory for storing a program and the like, a CPU (Central Processing Unit) for performing various arithmetic processings by executing the program stored in the main memory, an interface portion for interfacing with the network, an interface portion for interfacing with the DVR 20, a user interface portion such as a key input portion and a display portion, a nonvolatile storage portion 11, and the like. The storage portion 11 stores user identification information registered in the controller 10. The main memory stores a program and the like for performing a processing relating to a direct access between the controller 10 and the controlled apparatus 20.

The controlled apparatus 20 includes a recording/reproducing functional portion for recording/reproducing a content such as a broadcast program (moving image), music, an image, and application data on/from a medium, a main memory for storing a program and the like, a CPU for performing various arithmetic processings by executing the program stored in the main memory, an interface portion for interfacing with a network such as a LAN and the Internet, an interface portion for interfacing with the controller 10, a nonvolatile storage portion 21, a remote control reception portion, an interface portion for connecting a TV and the like. The storage portion 21 previously stores apparatus authentication information fixedly allocated to the controlled apparatus 20. The main memory stores a program for controlling the recording/reproducing functional portion of the controlled apparatus 20, a program for performing a processing relating to a direct access between the controlled apparatus 20 and the service server 30, and the like.

The service server 30 provides to the controller 10 various services for accessing the controlled apparatus 20 via the network. The service server 30 is implemented by using, for example, a typical computer system including an input portion such as a keyboard and a mouse, a display portion, a main memory for storing a program and the like, a CPU for performing various arithmetic processings by executing the program stored in the main memory, a communication portion for communicating with the network, a storage portion 31, and the like. The main memory stores a basic program required for causing a computer system to operate, a program required for executing the service, and the like. The storage portion 31 stores a service ID for identifying a service server and a kind of the service for each service provided by the service server 30.

The direct access management server 40 manages a combination of the controller 10 and a service of the service server 30 and a correspondence between the combination and the controlled apparatus 20. The direct access management server 40 is implemented by, for example, a typical computer system including an input portion such as a keyboard and a mouse, a display portion, a main memory for storing a program, a CPU for performing various arithmetic processings by executing the program stored in the main memory, an interface portion for interfacing with the network, a storage portion 41, and the like. The main memory stores a basic program required for causing a computer system to operate, a program required for causing the computer system to function as the direct access management server, and the like.

The direct access management server 40 is provided with an SOAP (Simple Object Access Protocol) server 42 and an XMPP (eXtensible Messaging and Presence Protocol) server 43. The SOAP server 42 performs registration of the combination of the controller 10 and the service, registration of the controlled apparatus 20, and a processing relating to the direct access between the service server 30 and the controlled apparatus 20. The XMPP server 43 sets a bidirectional constant connection session with the controlled apparatus 20. It should be noted that the SOAP server 42 and the XMPP server 43 are mere examples. In place of the SOAP server 42 and the XMPP server 43, another server using an API calling system and another server using an IM system may be used, respectively.

Next, the interfaces of the respective apparatuses will be described. In FIG. 1, [IF-**] denotes an interface number.

The SOAP server 42 in the direct access management server 40 includes an interface [IF-02] accessed by the service server 30 and an interface [IF-00] accessed by the controlled apparatus 20. The SOAP server 42 also has an SOAP client function, and accesses an interface [IF-05] of the service server 30. An interface of the XMPP server 43 is accessed by an XMPP client when an XMPP session is established. In this system configuration example, an interface [IF-06] accessed by the controlled apparatus 20 corresponds to the interface of the XMPP server 43. After the XMPP session is established, a massage can be bidirectionally exchanged through the interface [IF-06], and therefore an interface [IF-07] of the controller 20 can be accessed by the XMPP server 43.

The service server 30 includes an interface [IF-01] accessed by the controller 10 and an interface [IF-05] accessed by the direct access management server 40.

It should be noted that in this system configuration example, the service server 30 is not directly interfaced with the XMPP server 43 in the direct access management server 40 but may of course be directly interfaced with the XMPP server 43.

The controlled apparatus 20 includes the interface [IF-07] after the XMPP session is established, which is accessed by the direct access management server 40, an interface [IF-03] for transmitting/receiving data to/from the controller 10 by using, e.g., infrared light and a USB (Universal Serial Bus), an interface [IF-09] corresponding to a URI for direct access, which is accessed by the service server 30 or the controller 10, and an interface [IF-32] for transmitting/receiving data between the controlled apparatuses 20, namely, in the example shown in FIG. 1, between the controlled apparatuses 20A and 20B.

The router 50 includes an interface [IF-08] having a function of UPnP (Universal Plug and Play) IGD (Internet Gateway Device), which is accessed by the controlled apparatus 20.

Next, an operation of the network system according to this embodiment will be described. In the following description, <X-XX> represents a request, and <X-XXR> represents a response to the <X-XX>.

[1. Registration of Controller/Service and Controlled Apparatus]

First, a description will be given on an operation of associating a controller/service management ID with a controlled apparatus management ID. The controller/service management ID is issued for each combination of the controller 10 and the service, and the controlled apparatus management ID is uniquely issued to the respective controlled apparatuses 20 in the direct access management server 40.

Figure 2:
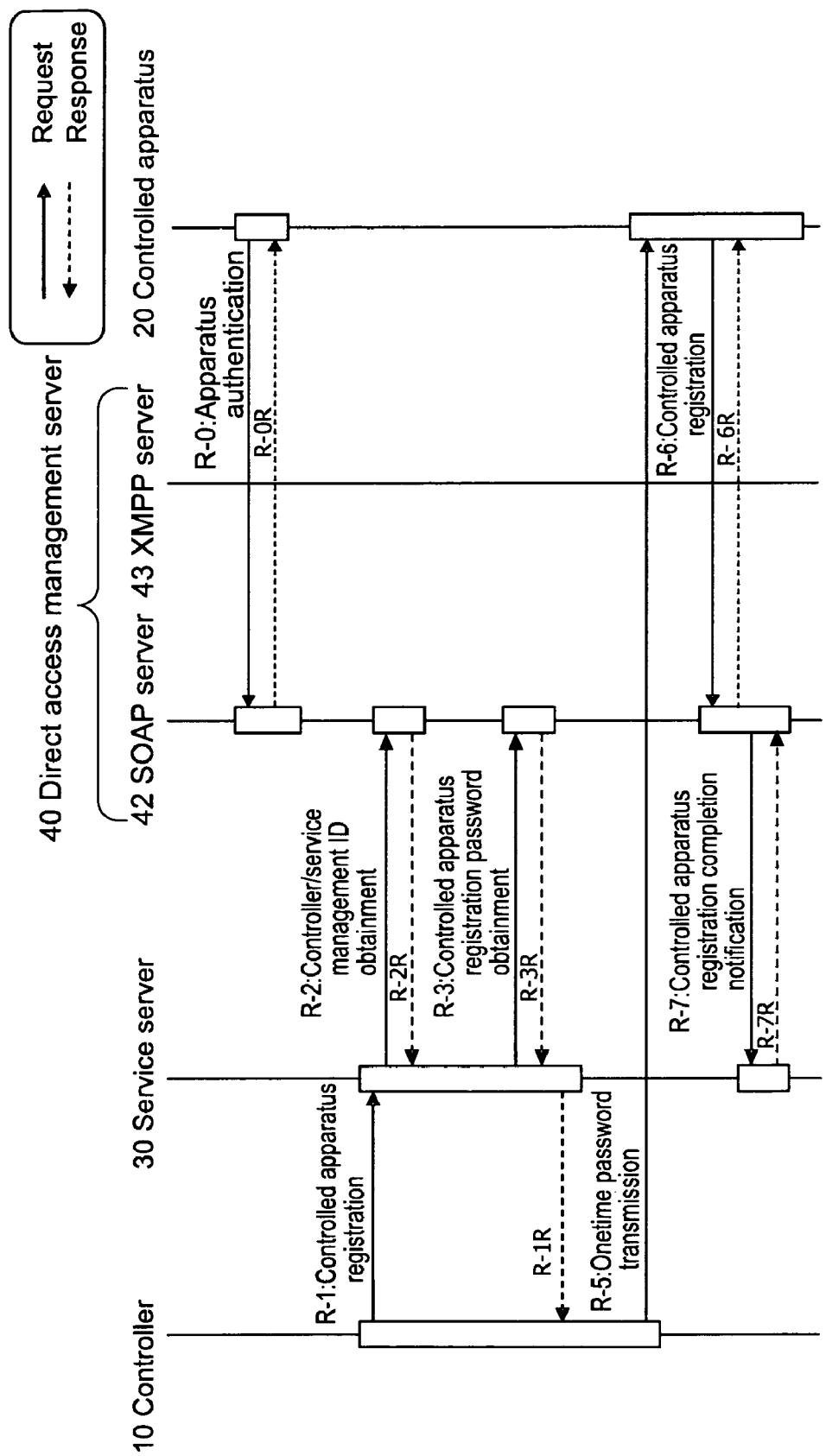
FIG. 2 is a sequence diagram of an entire system showing a flow of information when a combination of a controller and a service is registered and a controlled apparatus is registered.
Figure 4:
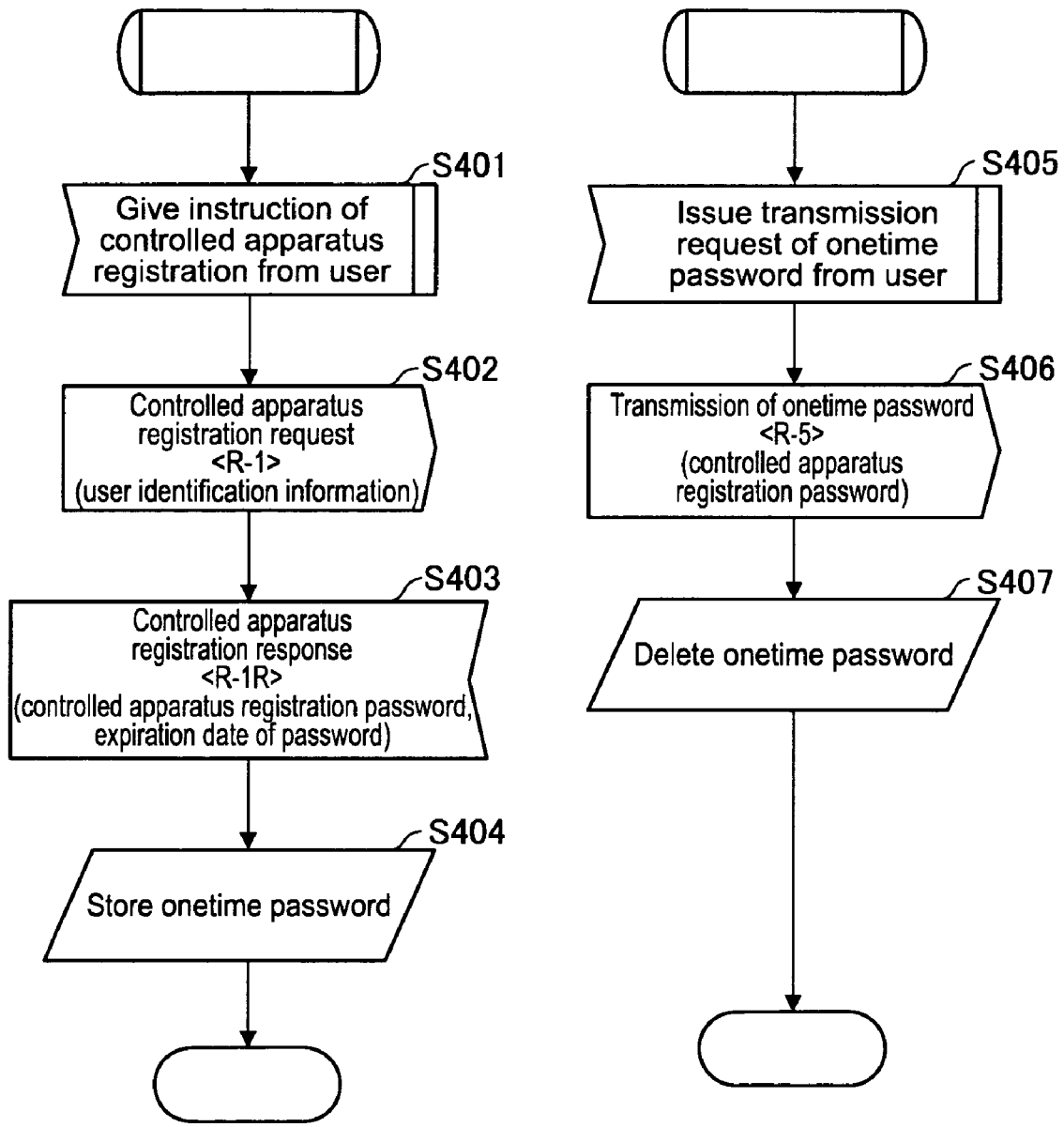
FIG. 4 is a flowchart of the controller at the time of the registration of the combination of the controller and the service and the registration of the controlled apparatus.
Figure 5:
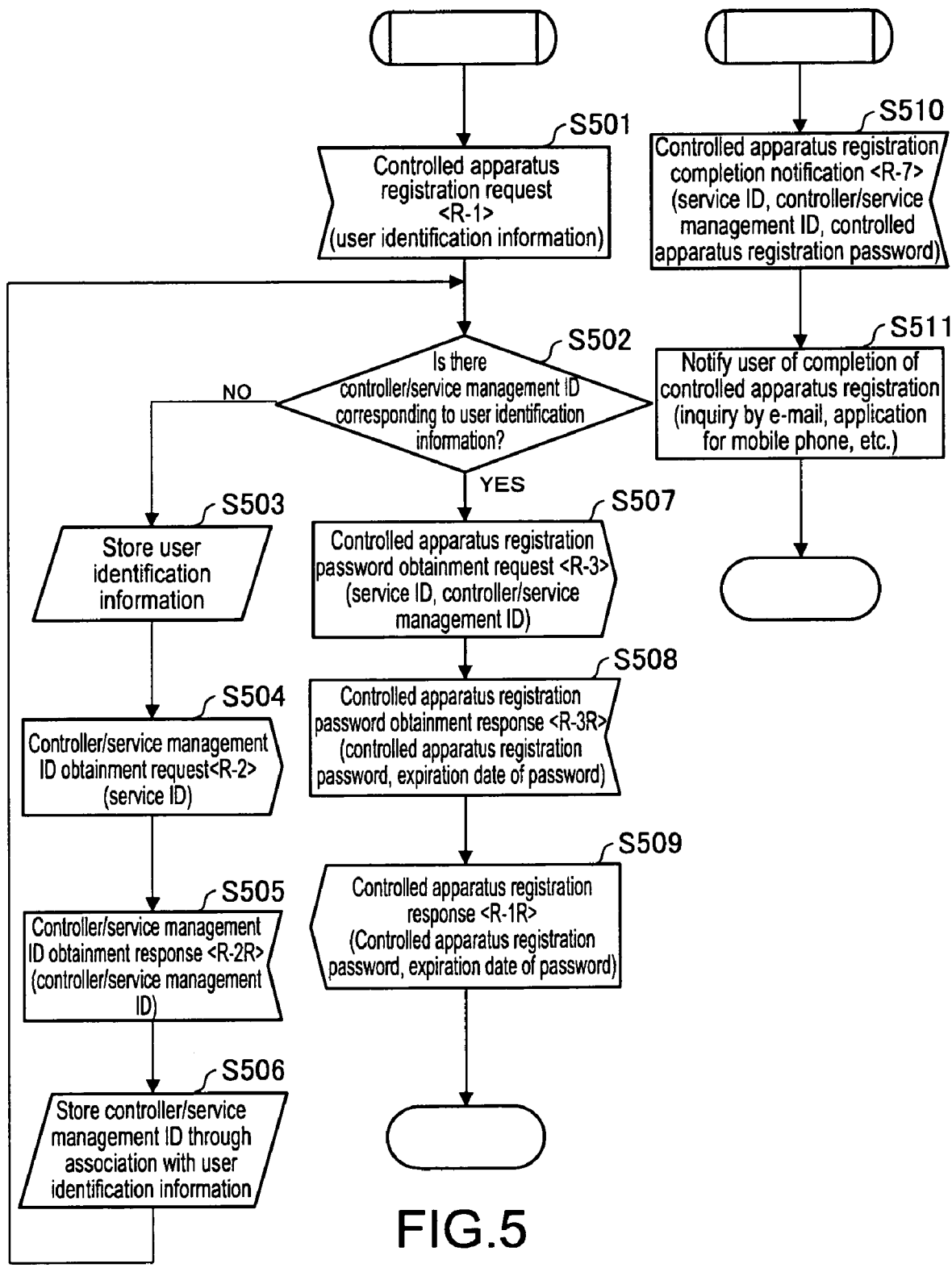
FIG. 5 is a flowchart of a service server at the time of the registration of the combination of the controller and the service and the registration of the controlled apparatus.
Figure 6:
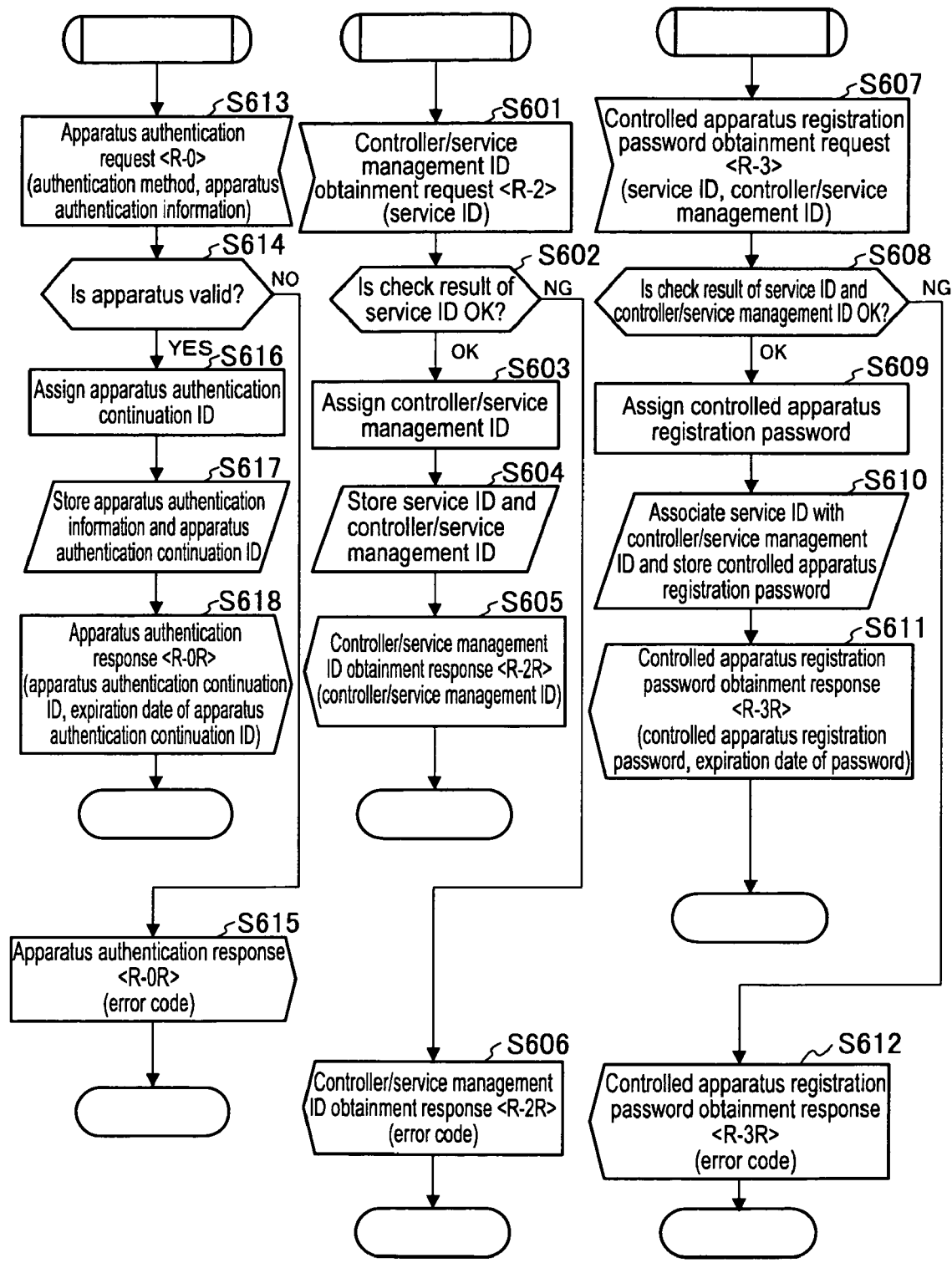
FIG. 6 is a flowchart of a direct access management server at the time of the registration of the combination of the controller and the service and the registration of the controlled apparatus.
Figure 7:
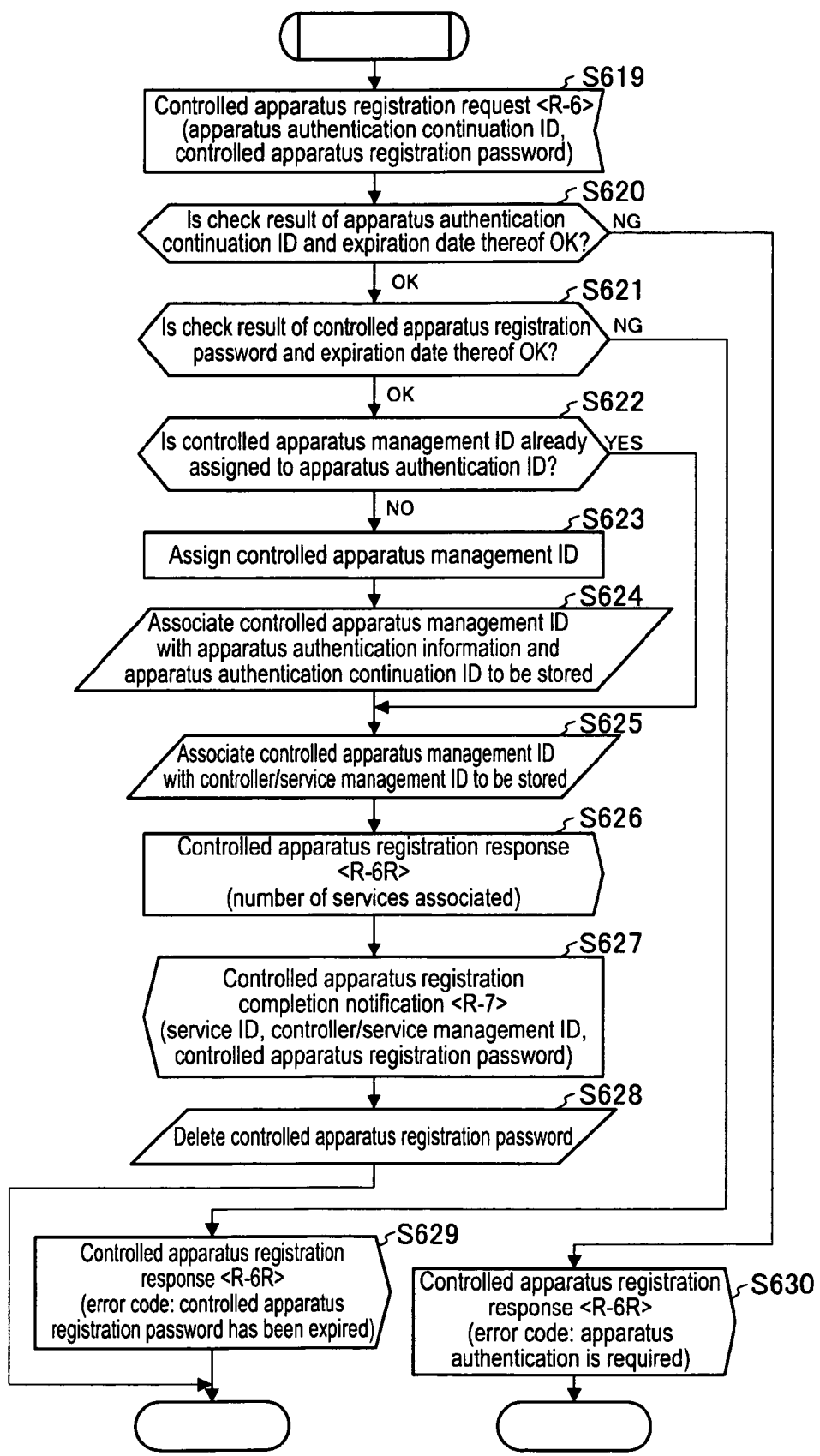
FIG. 7 is a flowchart of a direct access management server at the time of the registration of the controlled apparatus.
Figure 8:
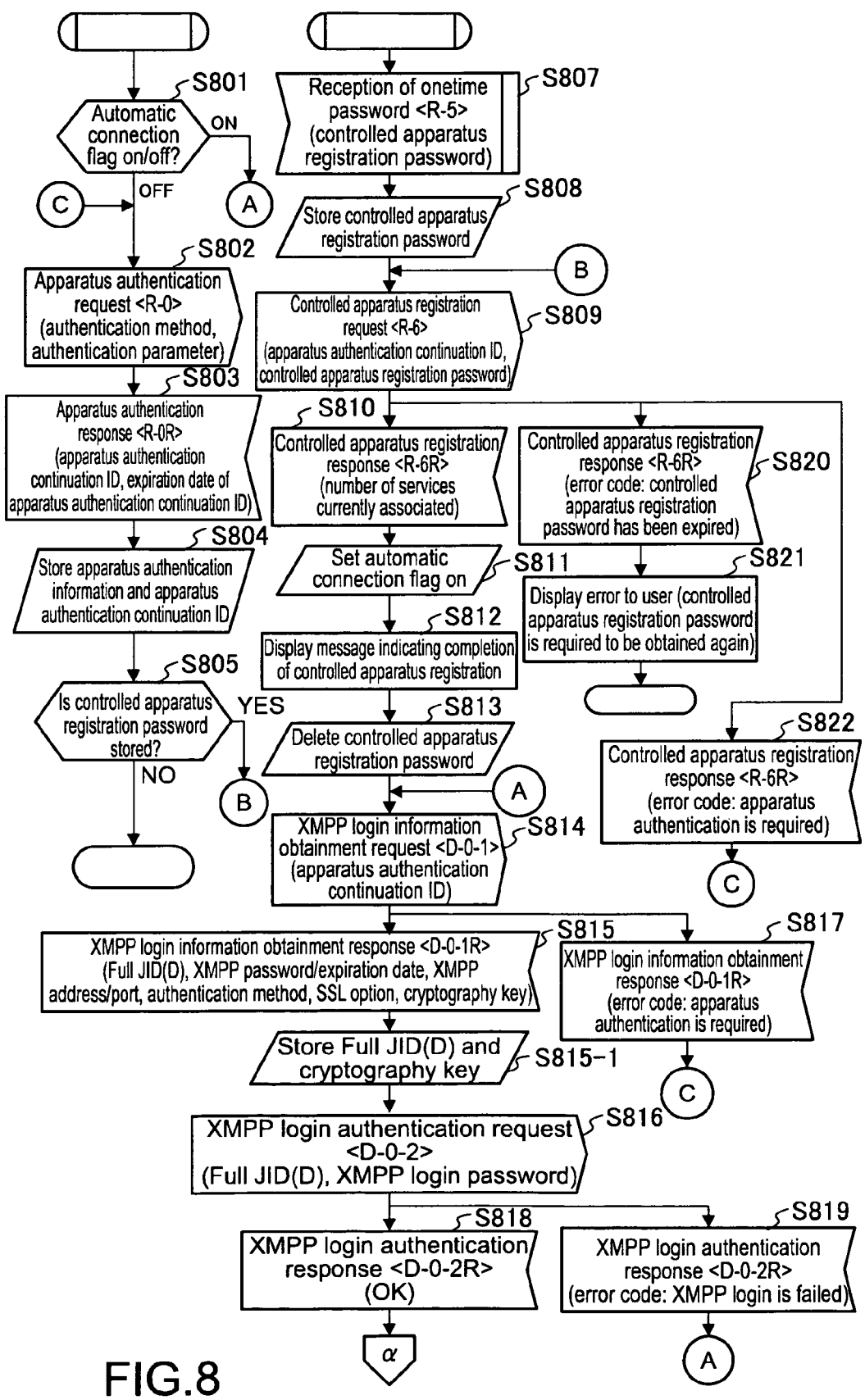
FIG. 8 is a flowchart of the controlled apparatus at the time of the controlled apparatus.

FIG. 2 is a sequence diagram of an entire system that shows a flow of information when a combination of the controller 10 and a service is registered and the controlled apparatus 20 is registered. FIG. 3 is a table showing functions of the interfaces at the time of the registrations. FIG. 4 is a flowchart of the controller 10 at the time of the registrations. FIG. 5 is a flowchart of the service server 30 at the time of the registrations. FIGS. 6 and 7 are flowcharts of the direct access management server 40 at the time of the registrations. FIG. 8 is a flowchart of the controlled apparatuses 20 at the time of the registrations.

[1-1. Registration of Combination of Controller and Service]

First, when receiving from a user an instruction to register the controlled apparatus (Step S401 of FIG. 4), the controller 10 issues to the service server 30 a controlled apparatus registration request <R-1> including user identification information (Step S402 of FIG. 4).

Upon reception of the controlled apparatus registration request <R-1> including the user identification information (Step S501 of FIG. 5), the service server 30 judges whether the controller/service management ID corresponding to the user identification information is stored in the storage portion 31 (Step S502 of FIG. 5).

When the controller/service management ID corresponding to the user identification information is not stored, the service server 30 stores the user identification information in the storage portion 31 (Step S503 of FIG. 5), and issues to the SOAP server 42 in the direct access management server 40 a controller/service management ID obtainment request <R-2> including a service ID previously assigned to the service server 30 itself (Step S504 of FIG. 5). The controller/service management ID is uniquely assigned to each combination of the controller and individual services provided by a service provider.

Upon reception of the controller/service management ID obtainment request <R-2> (Step S601 of FIG. 6), the SOAP server 42 checks whether the service ID included therein coincides with the service ID previously stored in the storage portion 41 of the direct access management server 40 (Step S602 of FIG. 6). When the service IDs do not coincide, an error code indicating that the service ID is not registered yet in the service server 30 is transmitted as a controller/service management ID obtainment response <R-2R> (Step S606 of FIG. 6). When the service IDs coincide, the SOAP server 42 issues a new controller/service management ID (Step S603 of FIG. 6), registers a correspondence between the controller/service management ID and the service ID in the storage portion 41 (Step S604 of FIG. 6), and transmits to the service server 30 the controller/service management ID as the controller/service management ID obtainment response <R-2R> (Step S605 of FIG. 6). As a result, the direct access management server 40 can identify a control side for the direct access management server 40 based on the combination of the controller 10 and the service of the service server 30 used by the controller 10.

It should be noted that the direct access management server 40 associates the controller/service management ID with the service ID, and stores in the storage portion 41 and manages positional information such as the URI of the service server 30.

Upon reception of the controller/service management ID as the controller/service management ID obtainment response <R-2R> (Step S505 of FIG. 5), the service server 30 registers in the storage portion 31 the controller/service management ID through association with the user identification information (Step S506 of FIG. 5). When the controller/service management ID is associated with the user identification information and is stored, the service server 30 thereafter uses the controller/service management ID corresponding to the user identification information of the controller 10 to request the direct access management server 40 to perform a processing when accessed by the controller 10, which enables the direct access management server 40, as the control side of the combination of the controller 10 and the service of the service server 30, to uniquely identify a control request source.

After the controller/service management ID is registered in the storage portion 31 through association with the user identification information, or when the controller/service management ID corresponding to the user identification information included in the controlled apparatus registration request <R-1> received from the controller 10 is registered in the storage portion 31, the service server 30 issues a controlled apparatus registration password obtainment request <R-3> including the controller/service management ID and the service ID to the SOAP server 42 in the direct access management server 40 (Step S507 of FIG. 5).

Upon reception of the controlled apparatus registration password obtainment request <R-3> (Step S607 of FIG. 6), the SOAP server 42 in the direct access management server 40 judges whether the combination of the controller/service management ID and the service ID included therein is registered in the storage portion 41 (Step S608 of FIG. 6). When the combination is not registered, the SOAP server 42 transmits to the service server 30 an error code indicating that the combination of the controller/service management ID and the service ID is not registered yet as a controlled apparatus registration password obtainment response <R-3R> (Step S612 of FIG. 6). Meanwhile, when the combination of the service ID and the controller/service management ID included in the controlled apparatus registration password obtainment request <R-3> is already registered in the storage portion 41, the SOAP server 42 creates a new controlled apparatus registration password (Step S609 of FIG. 6), and associates information on the new controlled apparatus registration password and an expiration date determined for the controlled apparatus registration password with the controller/service management ID and the service ID included in the controlled apparatus registration password obtainment request <R-3>, to be registered in the storage portion 41 (Step S610 of FIG. 6). After that, the SOAP server 42 transmits to the service server 30 the controlled apparatus registration password and the information on the expiration date of the controlled apparatus registration password as the controlled apparatus registration password obtainment response <R-3R> (Step S611 of FIG. 6).

Upon reception of the controlled apparatus registration password obtainment response <R-3R> (Step S508 of FIG. 5), the service server 30 transmits to the controller 10 the information on the controlled apparatus registration password and the expiration date thereof included in the controlled apparatus registration password obtainment response <R-3R> as a controlled apparatus registration response <R-1R> (Step S509 of FIG. 5).

Upon reception of the controlled apparatus registration response <R-1R>, the controlled apparatus 10 stores in the storage portion 11 the information on the controlled apparatus registration password and the expiration date thereof included in the controlled apparatus registration response <R-1R> (Step S404 of FIG. 4).

In this way, the registration processing of the controller/service management ID with respect to the combination of the controller 10 and the service and the issue processing of the controlled apparatus registration password used for associating the controlled apparatus 20 with the controller 10 are completed.

[1-2. Registration of Controlled Apparatus]

Next, an operation at the time of registration of the controlled apparatus 20 will be described.

The controlled apparatus 20 performs apparatus authentication on itself in the direct access management server 40 before used by a user as follows.

First, the controlled apparatus 20 checks a value of an automatic connection flag (Step S801 of FIG. 8). Before registration of the controlled apparatus in the direct access management server 40, the value of the automatic connection flag is off. In this case, the controlled apparatus 20 transmits an apparatus authentication request <R-0> including information on an authentication method preset thereto and apparatus authentication information to the SOAP server 42 in the direct access management server 40 (Step S802 of FIG. 8).

Upon reception of the apparatus authentication request <R-0> from the controlled apparatus 20 (Step S613 of FIG. 6), the SOAP server 42 in the direct access management server 40 judges whether the controlled apparatus 20 is valid based on the information on the authentication method and the apparatus authentication information included in the apparatus authentication request <R-0> (Step S614 of FIG. 6). When it is judged that the apparatus is invalid, that is, for example, when the authentication method is different from a predetermined authentication method, or when the apparatus authentication information is different from a predetermined form of the authentication method, the SOAP server 42 transmits to the controlled apparatus 20 information that an error code is indicated to the direct access management server 40 as an apparatus authentication response <R-0R> (Step S615 of FIG. 6). When it is judged that the apparatus is valid, that is, when the authentication method is the same as the predetermined authentication method and when the apparatus authentication information is the same as the predetermined form of the authentication method, the SOAP server 42 creates an apparatus authentication continuation ID to be assigned to the controlled apparatus 20 (Step S616 of FIG. 6), and associates the apparatus authentication continuation ID with the apparatus authentication information included in the apparatus authentication request <R-0>, to be stored in the storage portion 41 (Step S617 of FIG. 6). After that, the SOAP server 42 transmits to the controlled apparatus 20 the apparatus authentication response <R-0R> including information on the created apparatus authentication continuation ID and an expiration date thereof (Step S618 of FIG. 6). The apparatus authentication continuation ID is identification information assigned to an apparatus that has been subjected to apparatus authentication in the direct access management server 40. Based on the identification information, the direct access management server 40 can check a condition of the apparatus authentication of the controlled apparatus 20.

Upon reception of the apparatus authentication response <R-0R> including the information on the apparatus authentication continuation ID and the expiration date thereof (Step S803 of FIG. 8), the controlled apparatus 20 associates the information on the apparatus authentication continuation ID and the expiration date thereof included in the apparatus authentication response <R-0R> with the apparatus authentication information, to be stored in the storage portion 21 (Step S804 of FIG. 8).

After that, the controlled apparatus 20 judges whether the controlled apparatus registration password is stored in the storage portion 21 (Step S805 of FIG. 8). When the controlled apparatus registration password is not stored, the operation is terminated. When the controlled apparatus registration password is stored, the processing proceeds to Step S809. Immediately after the apparatus authentication continuation ID is obtained, the controlled apparatus registration password is not stored, and therefore the operation is terminated in this case.

Through the above-described processing, the combination of the information on the apparatus authentication continuation ID and expiration date thereof and the apparatus authentication information is stored in the storage portion 21 of the controlled apparatus 20. Further, the combination of the apparatus authentication continuation ID and the apparatus authentication information is stored in the storage portion 41 of the direct access management server 40. As a result, the registration of the controlled apparatus 20 into the direct access management server 40 is completed.

The processing above for the registration of the controlled apparatus 20 is performed on each of the controlled apparatuses 20A and 20B.

[1-3. Associating Controller/Service Management ID with Controlled Apparatus Management ID]

Next, performed is an operation for associating the controller/service management ID with the controlled apparatus management ID to register in the direct access management server 40 the associated controller/service management ID and controlled apparatus management ID. To the controller 10, a user inputs a onetime password transmission request (Step S405 of FIG. 4). Upon reception of the onetime password transmission request from the user, the controller 10 sends to the controlled apparatus 20 the controlled apparatus registration password stored in the storage portion 11 as a onetime password <R-5> by using the interface [IF-03] such as infrared light and a USB (Step S406 of FIG. 4). In addition to this, various methods using a contactless IC card, Bluetooth (trademark), a wireless LAN, or the like may be used for sending the controlled apparatus registration password. Any sending method can be used, as long as the controller 10 can send the controlled apparatus registration password to the controlled apparatus 20. After that, the controller 10 deletes the controlled apparatus registration password from the storage portion 11 (Step S407 of FIG. 4).

Upon reception of the controlled apparatus registration password <R-5> from the controller 10 (Step S807 of FIG. 8), the controlled apparatus 20 stores the controlled apparatus registration password in the storage portion 21 (Step S808 of FIG. 8). Subsequently, the controlled apparatus 20 transmits to the SOAP server 42 in the direct access management server 40 a controlled apparatus registration request <R-6> including the apparatus authentication continuation ID stored in the storage portion 21 and the controlled apparatus registration password received from the controller 10 (Step S809 of FIG. 8). In this way, the controlled apparatus 20 requests the direct access management server 40 to associate the controlled apparatus 20 with the controller 10 that has transmitted the controlled apparatus registration password and register it.

Upon reception of the controlled apparatus registration request <R-6> from the controlled apparatus 20 (Step S619 of FIG. 7), the SOAP server 42 in the direct access management server 40 checks whether the apparatus authentication continuation ID included in the controlled apparatus registration request <R-6> coincides with the ID stored in the storage portion 41 and checks the expiration date of the apparatus authentication continuation ID (Step S620 of FIG. 7). In a case where the check result shows NG, that is, in a case where the apparatus authentication continuation ID does not coincide with the stored ID or has expired, a controlled apparatus registration response <R-6R> including an error code indicating that apparatus authentication is required is transmitted to the controlled apparatus 20 (Step S630 of FIG. 7). Upon reception of the controlled apparatus registration response <R-6R> including the error code (Step S822 of FIG. 8), the processing is returned to the Step S802, and the processing for the apparatus authentication is performed again.

On the other hand, in a case where the check result of Step S620 shows OK, that is, in a case where the apparatus authentication continuation ID coincides with the ID stored in the storage portion 41 and does not expire yet, the SOAP server 42 checks whether the controlled apparatus registration password included in the controlled apparatus registration request <R-6> received from the controlled apparatus 20 coincides with the password stored in the storage portion 41 and checks the expiration date of the controlled apparatus registration password (Step S621 of FIG. 7). In a case where the check result shows NG, that is, in a case where the controlled apparatus registration password does not coincide with the stored password or has expired, the SOAP server 42 transmits to the controlled apparatus 20 an error code indicating that the controlled apparatus registration password included in the controlled apparatus registration request <R-6> is invalid, as the controlled apparatus registration response <R-6R> (Step S629 of FIG. 7). Upon reception of the controlled apparatus registration response <R-6R> as the error code (Step S820 of FIG. 8), the controlled apparatus 20 displays an error massage to urge the user to obtain a controlled apparatus registration password again on a screen or the like of a TV connected to the controlled apparatus 20 (Step S821 of FIG. 8), and then terminates the processing.

On the other hand, in a case where the check result of Step S621 shows OK, that is, in a case where the controlled apparatus registration password coincides with the password stored in the storage portion 41 and does not expire yet, the SOAP server 42 makes reference to the information stored in the storage portion 41 to judge whether the controlled apparatus management ID is assigned to the apparatus authentication continuation ID included in the controlled apparatus registration request <R-6> (Step S622 of FIG. 7). In a case where the controlled apparatus management ID corresponding to the apparatus authentication continuation ID is not assigned yet, the SOAP server 42 assigns the controlled apparatus management ID to the controlled apparatus 20 (Step S623 of FIG. 7), and associates the controlled apparatus management ID thus assigned with the apparatus authentication continuation ID and the apparatus authentication information on the controlled apparatus 20, to be stored in the storage portion 41 (Step S624 of FIG. 7). On the other hand, in a case where the controlled apparatus management ID has already been assigned to the apparatus authentication continuation ID included in the controlled apparatus registration request <R-6>, the SOAP server 42 stores in the storage portion 41 the controlled apparatus management ID through association with the controller/service management ID that is corresponded to the controlled apparatus registration password and stored in the storage portion 41 (Step S625 of FIG. 7). The controlled apparatus management ID means identification information uniquely assigned to the controlled apparatus in the direct access management server 40. By using this, the controller/service management ID assigned to the combination of the controller and the service is associated with the controlled apparatus management ID assigned to the controlled apparatus. A plurality of controlled apparatus management IDs may be associated with one controller/service management ID. Conversely, a plurality of controller/service management IDs may be associated with one controlled apparatus management ID.

Next, the SOAP server 42 transmits to the controlled apparatus 20 the number of services that have already been associated, as the controlled apparatus registration response <R-6R> (Step S626 of FIG. 7). Next, the SOAP server 42 transmits to the service server 30 a controlled apparatus registration completion notification <R-7> including the service ID, the controller/service management ID, and the controlled apparatus registration password which are stored in the storage portion 41 (Step S627 of FIG. 7). After that, the SOAP server 42 deletes the controlled apparatus registration password stored in the storage portion 41 (Step S628 of FIG. 7), and terminates the processing. Upon reception of the controlled apparatus registration completion notification <R-7> from the SOAP server 42 (Step S510 of FIG. 5), the service server 30 notifies the user of the controller 10 of the completion of the registration of the controlled apparatus by e-mail or the like (Step S511 of FIG. 5).

Upon reception of the number of services that have been associated as the controlled apparatus registration response <R-6R> from the SOAP server 42 (Step S810 of FIG. 8), the controlled apparatus 20 sets the automatic connection flag on (Step S811 of FIG. 8), and displays a massage indicating that the registration of the controlled apparatus is completed (Step S812 of FIG. 8). Subsequently, the controlled apparatus 20 deletes the controlled apparatus registration password stored in the storage portion 21 (Step S813 of FIG. 8). After that, in order to establish a constant connection session with the XMPP server 43 in the direct access management server 40, the controlled apparatus 20 transmits to the SOAP server 42 in the direct access management server 40 an XMPP login information obtainment request <D-0-1> including the apparatus authentication continuation ID (Step S814 of FIG. 8).

The processing for associating the controller/service management ID with the controlled apparatus management ID described above is performed on each of the controlled apparatuses 20A and 20B.

[2. XMPP Login of the Controlled Apparatus]

In the network system, the direct access management server 40 is provided with the XMPP server 43 for establishing a bidirectional constant connection session with the controlled apparatus 20. To access the controlled apparatus 20 from the controller 10 via the network, the controlled apparatus 20 logs in the XMPP server 43 and establishes the constant connection session with the XMPP server 43 in advance. Thus, the service server 30 and the controller 10 can obtain required information from the controlled apparatus 20 as necessary. Further, to simplify a design of the service server 30 in this case, the XMPP protocol is concealed in the direct access management server 40, which allows an exchange of information with the XMPP server 43 that has established the bidirectional constant connection session with the controlled apparatus 20

Figure 9:
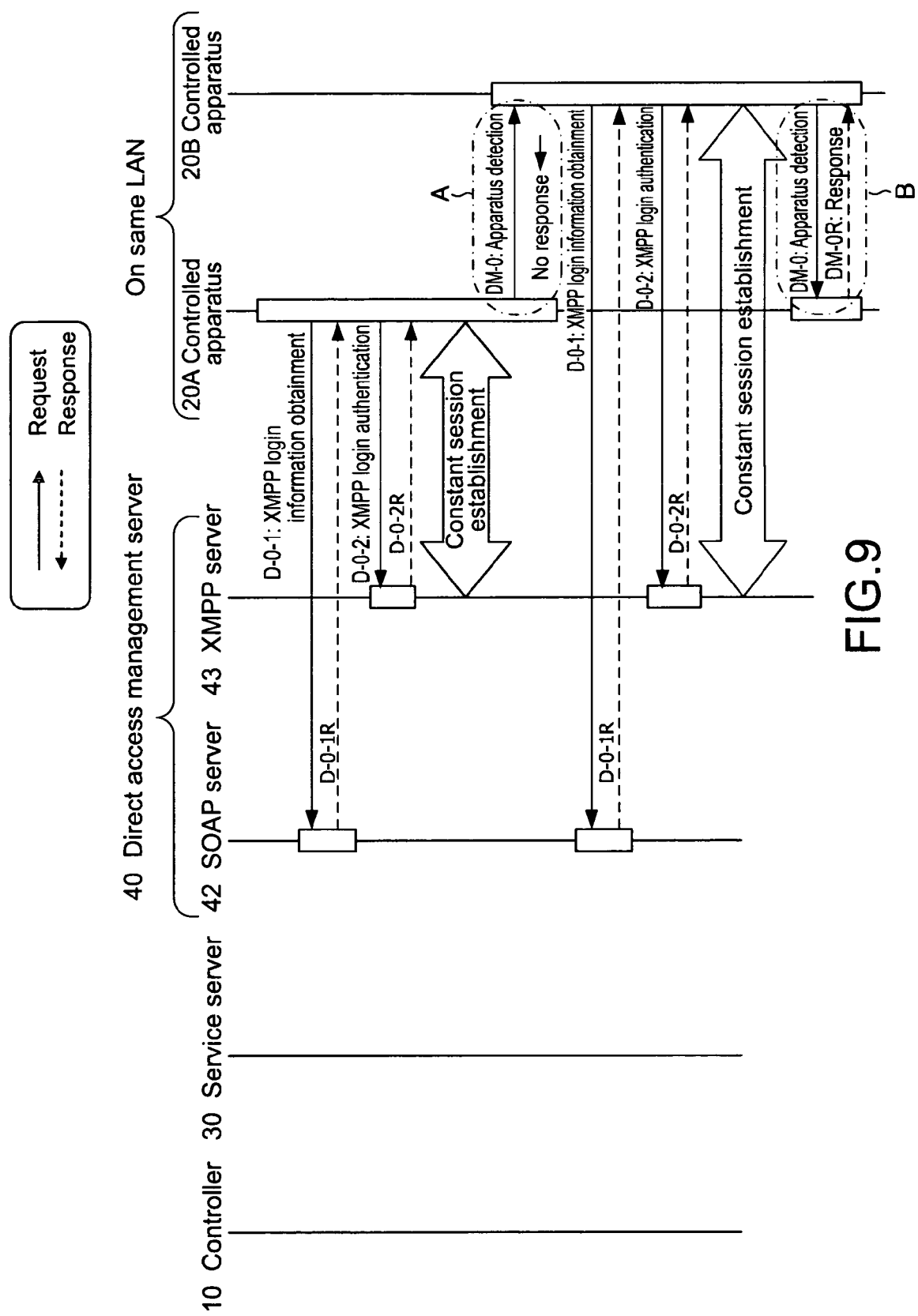
FIG. 9 is a sequence diagram of an entire system showing a flow of information relating to an XMPP login of the controlled apparatus in a case where the controlled apparatuses are connected via the same LAN.
Figure 11:
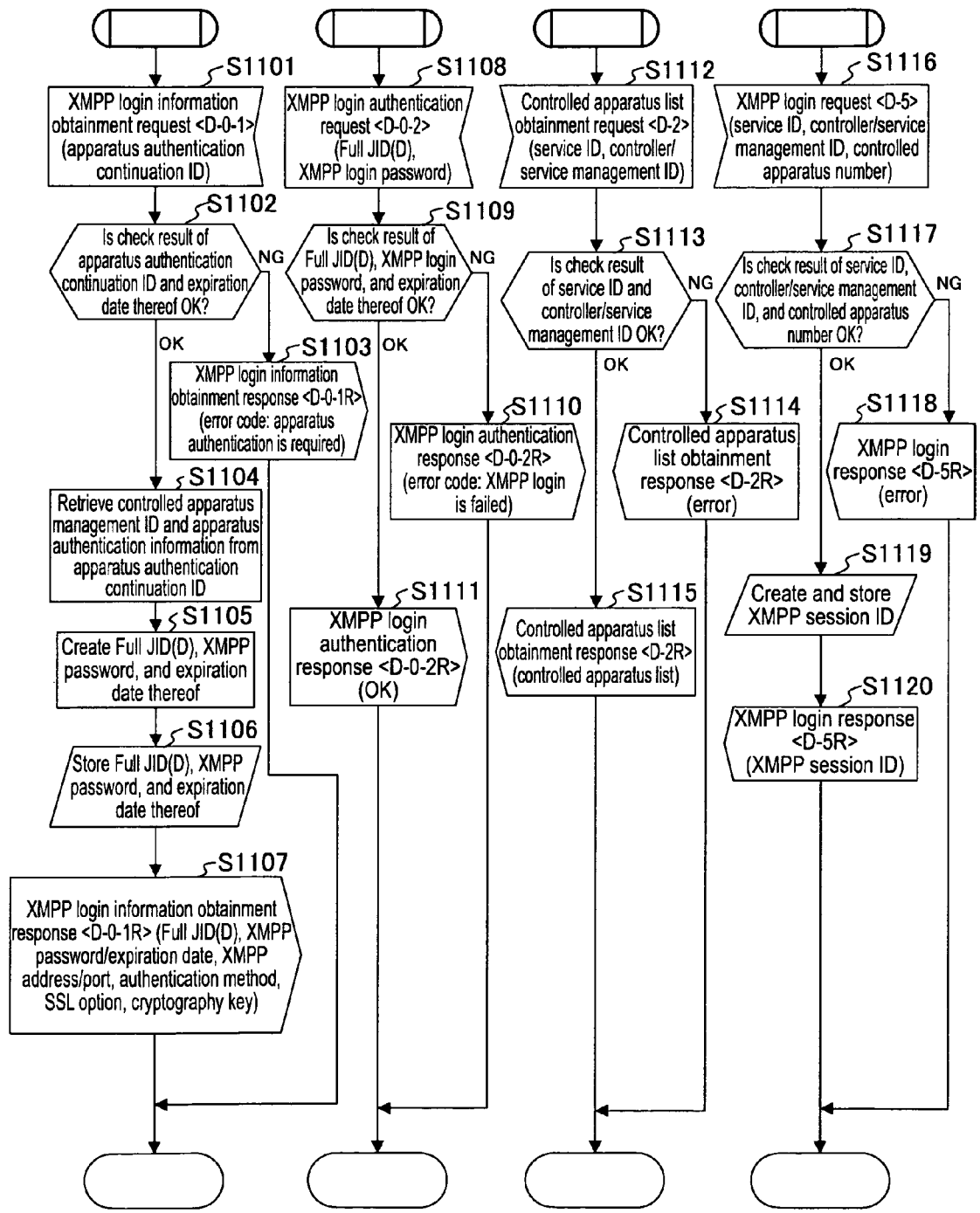
FIG. 11 is a flowchart showing an operation of the direct access management server at the time of the XMPP login of the controlled apparatus.

FIG. 9 is a sequence diagram of an entire system showing a flow of information relating to the XMPP login of the controlled apparatus 20. FIG. 10 is a table showing functions of interfaces at the time of XMPP login of the controlled apparatus 20. FIG. 11 is a flowchart showing an operation of the direct access management server 40 at the time of the XMPP login of the controlled apparatus 20.

First, it is supposed that the controlled apparatus 20A has transmitted the XMPP login information obtainment request <D-0-1> including the apparatus authentication continuation ID to the direct access management server 40. Upon reception of the XMPP login information obtainment request <D-0-1> including the apparatus authentication continuation ID from the controlled apparatus 20A (Step S1101 of FIG. 11), the direct access management server 40 checks the apparatus authentication continuation ID included in the XMPP login information obtainment request <D-0-1> and the expiration date thereof (Step S1102 of FIG. 11). When the check result shows that the apparatus authentication continuation ID included in the XMPP login information obtainment request <D-0-1> does not coincide with the ID stored in the storage portion 41 of the direct access management server 40 or has expired, the controlled apparatus 20A is not normally registered in the direct access management server 40, or the apparatus authentication continuation ID previously registered has expired. Therefore, an error code indicating that an apparatus authentication is required is transmitted to the controlled apparatus 20 as an XMPP login information obtainment response <D-0-1R> (Step S1103 of FIG. 11). On the other hand, when the apparatus authentication continuation ID is stored in the storage portion 41 and does not expire, the direct access management server 40 retrieves from the storage portion 41 the apparatus authentication information and the controlled apparatus management ID associated with the apparatus authentication continuation ID (Step S1104 of FIG. 11), creates, based on the controlled apparatus management ID and apparatus authentication information, information of a Full JID(D), the XMPP login password, and the expiration date of the XMPP login password (Step S1105 of FIG. 11), and stores the information in the storage portion 41 (Step S1106 of FIG. 11). The Full JID(D) is an XMPP login ID required for the controlled apparatus 20A to log in the XMPP server 43. Then, the direct access management server 40 transmits to the controlled apparatus 20A information of an XMPP address, a port number, an authentication method, an SSL (Secure Socket Layer) option, and a cryptography key, in addition to the information of the Full JID(D), the XMPP login password, and the expiration date thereof thus generated, as the XMPP login information obtainment response <D-0-1R> (Step S1107 of FIG. 11).

Upon reception of the XMPP login information obtainment response <D-0-1R> including the Full JID(D), the XMPP login password, the cryptography key, and the like from the SOAP server 42 in the direct access management server 40 (Step S815 of FIG. 8), the controlled apparatus 20A stores the Full JID(D) and the cryptography key in the storage portion 21 (Step S815-1), and transmits to the XMPP server 43 in the direct access management server 40 an XMPP login authentication request <D-0-2> including the Full JID(D) and the XMPP login password (Step S816 of FIG. 8).

Upon reception of the XMPP login authentication request <D-0-2> from the controlled apparatus 20A (Step S1108 of FIG. 11), the XMPP server 43 in the direct access management server 40 checks the Full JID(D), the XMPP login password, and the expiration date thereof included in the XMPP login authentication request <D-0-2> (Step S1109 of FIG. 11). In a case where the Full JID(D) does not coincide with the ID stored in the storage portion 41, or the XMPP login password does not coincide with the password stored in the storage portion 41 or has expired, an error code indicating that the XMPP login is failed is transmitted to the controlled apparatus 20 as an XMPP login authentication response <D-0-2R> (Step S1110 of FIG. 11). On the other hand, in a case where the check result of the Full JID(D), the XMPP login password, and the expiration date thereof shows OK, the XMPP server 43 in the direct access management server 40 transmits to the controlled apparatus 20A a code indicating that the XMPP login is permitted as the XMPP login authentication response <D-0-2R> (Step S1111 of FIG. 11).

Upon reception of the error code indicating that the XMPP login has been failed from the direct access management server 40 as the XMPP login authentication response <D-0-2R> (Step S819 of FIG. 8), the processing returns to Step S814 and the controlled apparatus 20A issues an obtainment request of the XMPP login information again. That is, because the XMPP login password might have expired, the obtainment request processing of the XMPP login information is performed again. Upon reception of the code indicating that the XMPP login is permitted as the XMPP login authentication response <D-0-2R> from the direct access management server 40 (Step S818 of FIG. 8), the XMPP login processing of the controlled apparatus 20A is completed.

Upon reception of the error code indicating that the apparatus authentication is required as the XMPP login information obtainment response <D-0-1R> from the SOAP server 42 in the direct access management server 40 (Step S817 of FIG. 8), because the controlled apparatus 20A may not be normally registered in the direct access management server 40 or the apparatus authentication continuation ID might have expired, the controlled apparatus 20A transmits again to the SOAP server 42 in the direct access management server 40 the apparatus authentication request <R-0> including the apparatus authentication information and the information on the authentication method preset thereto, and performs the apparatus authentication on itself again (Step S802 of FIG. 8).

As described above, in the direct access management server 40 in the network system, the XMPP login ID and the XMPP login password necessary for the controlled apparatus 20 to log in the XMPP server 43 are generated and distributed to the controlled apparatus 20. Herein, for the XMPP login ID, the Full JID(D) or the like is used. The Full JID(D) is constituted of a Bare JID portion and a Resource portion as shown in FIG. 53. For the Bare JID portion, the controlled apparatus management ID assigned to the controlled apparatus is used, and for the Resource portion, a product code and a serial number obtained from the apparatus authentication information are used. Further, as shown in FIG. 54, the controller/service management ID for identifying the combination of the controller and the service may also be used for the Resource portion.

Incidentally, by setting the automatic connection flag on in Step S811 of FIG. 8, at the time of next connection, for example, when the controlled apparatus 20 is turned on after once turned off, or when the session with the XMPP server 43 is established after disconnected, the automatic connection flag is checked in Step S801 of FIG. 8, and then the processing proceeds to Step S814 to start processing from the transmission of the XMPP login information obtainment request <D-0-1>. That is, at the time of reconnection, the controlled apparatus 20 skips a processing for the apparatus authentication, obtainment of the controlled apparatus registration password from the controller 10, a processing for the controlled apparatus registration, and performs a processing for the XMPP login. As a result, at the time of reconnection, the controlled apparatus 20A can establish the connection session with the XMPP server 43 only by performing the processing for the XMPP login.

Upon reception of the code indicating that the XMPP login is permitted as the XMPP login authentication response <D-0-2R> from the direct access management server 40 (Step S818 of FIG. 8), the controlled apparatus 20A starts to search another controlled apparatus 20 connected to the LAN to which the controlled apparatus 20A itself is connected.

Figure 12:
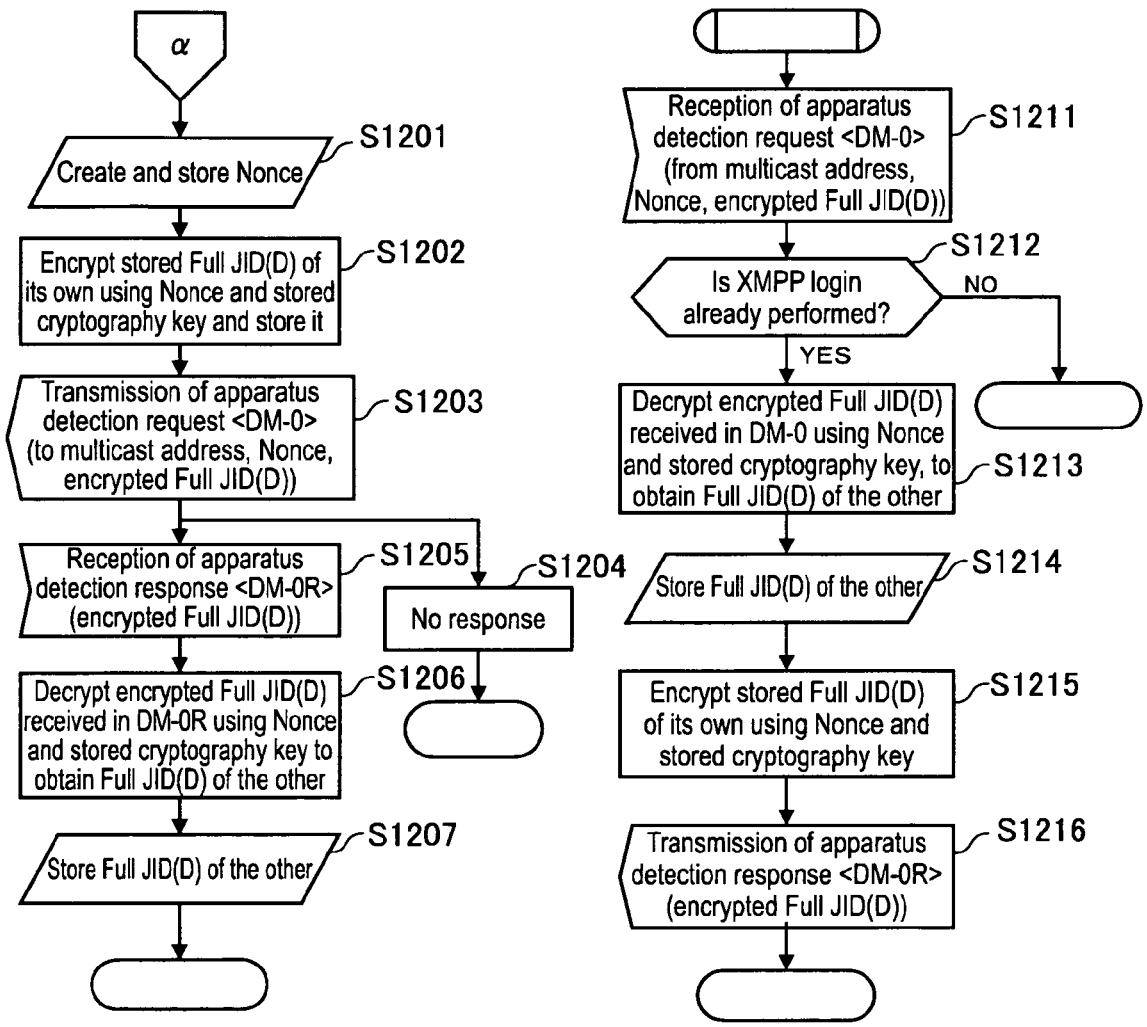
FIG. 12 is a flowchart showing a processing of an apparatus detection request transmission side and an apparatus detection request reception side of the controlled apparatus.

FIG. 12 is a flowchart showing processings of an apparatus detection request transmission side and an apparatus detection request reception side of the controlled apparatus 20.

Herein, a description will be given on the assumption that the controlled apparatus 20A is on the apparatus detection request transmission side and the controlled apparatus 20B is on the apparatus detection request reception side.

First, the controlled apparatus 20A on the apparatus detection request transmission side generates a nonce at random, and stores it in the storage portion 21 (Step S1201 of FIG. 12). The nonce refers to a character string or a number string used for preventing spoofing in authentication using a hash. Next, the controlled apparatus 20A uses the nonce stored in the storage portion 21 and the cryptography key previously stored in the storage portion 21, to encrypt and store its own Full JID(D) previously stored in the storage portion 21 (Step S1202 of FIG. 12). Subsequently, the controlled apparatus 20A transmits an apparatus detection request <DM-0> including the nonce and the Full JID(D) thus encrypted to a multicast address preset in the LAN to which the controlled apparatus 20A is currently connected (Step S1203 of FIG. 12).

On the other hand, upon reception of the apparatus detection request <DM-0> that has been subjected to multicast transmission to the LAN (Step S1211 of FIG. 12), the controlled apparatus 20B on the apparatus detection request reception side judges whether the controlled apparatus 20B itself is in the XMPP login state (Step S1212 of FIG. 12). When not in the XMPP login state, the controlled apparatus 20B terminates the processing as the apparatus detection request reception side. The part "A" of FIG. 9 indicates a case where the controlled apparatus 20A cannot receive a response from the controlled apparatus 20B because the controlled apparatus 20B is not in the XMPP login state at the time when the controlled apparatus 20B receives the apparatus detection request <DM-0> from the controlled apparatus 20A.

If there is no response from the controlled apparatus 20B during a certain time period (Step S1204), the controlled apparatus 20A on the apparatus detection request transmission side terminates the processing as the apparatus detection request transmission side.

In the processing described above, the controlled apparatus 20A is on the apparatus detection request transmission side and the controlled apparatus 20B is on the apparatus detection request reception side. However, after getting in the XMPP login state, the controlled apparatus 20B changes to be on the apparatus detection request transmission side, and the controlled apparatus 20A changes to be on the apparatus detection request reception side.

In this case, as indicated by the part "B" of FIG. 9, in a case where the controlled apparatus 20A is in the XMPP login state, the controlled apparatus 20A uses the nonce included in the apparatus detection request <DM-0> received from the controlled apparatus 20B and the cryptography key stored in the storage portion 21, to decrypt the encrypted Full JID(D) included in the apparatus detection request <DM-0> and thus obtain the Full JID(D) of the controlled apparatus 20B as the transmission source of the apparatus detection request (Step S1213 of FIG. 12). After that, the controlled apparatus 20A stores in the storage portion 21 the obtained Full JID(D) of the controlled apparatus 20B (Step S1214 of FIG. 12). After that, the controlled apparatus 20A uses the nonce and the cryptography key stored in the storage portion 21, to encrypt its own Full JID(D) stored in the storage portion 21 (Step S1215 of FIG. 12) and transmit the Full JID(D) thus encrypted, as an apparatus detection response <DM-0R>, to the controlled apparatus 20B via the LAN (Step S1216 of FIG. 12).

Upon reception of the apparatus detection response <DM-0R> from the controlled apparatus 20A on the apparatus detection request reception side (Step S1205 of FIG. 12), the controlled apparatus 20B on the apparatus detection request transmission side decrypts the encrypted Full JID(D) included in the apparatus detection response <DM-0R> by using the nonce and the cryptography key that are stored in the storage portion 21 (Step S1206 of FIG. 12), and stores in the storage portion 21 the decrypted Full JID(D) as the Full JID(D) of the controlled apparatus 20A that is the other controlled apparatus connected to the LAN to which the controlled apparatus 20B is connected (Step S1207 of FIG. 12).

Through the above processings, in each of the controlled apparatuses 20A and 20B connected to the same LAN, the Full JID(D) of the other controlled apparatus that is connected to the same LAN and is in the XMPP login state is stored.

Figure 13:
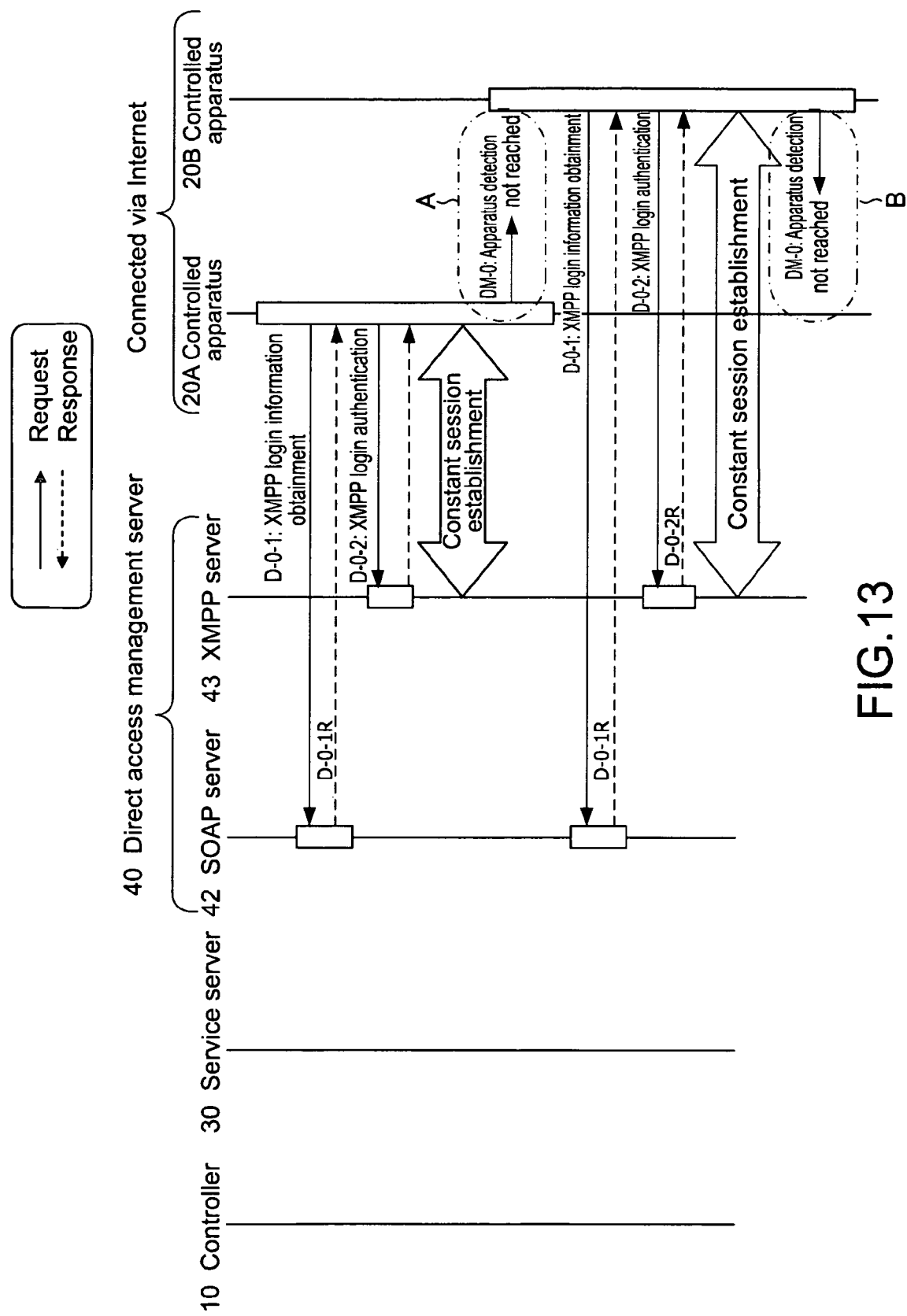
FIG. 13 is a sequence diagram of an entire system showing a flow of information on the XMPP login of the controlled apparatus in a case where the controlled apparatuses are connected via the Internet.

FIG. 13 is a sequence diagram of an entire system showing a flow of information on an XMPP login of the controlled apparatus 20 in a case where the controlled apparatuses 20A and 20B are not connected via the same LAN but connected via the Internet. In this case, the apparatus detection request <DM-0> of each of the controlled apparatuses 20 does not reach the other controlled apparatus 20. Therefore, the controlled apparatuses 20A and 20B each cannot obtain the Full JID(D) of the other controlled apparatus.

Thus, the processing for associating the controller 10 with the controlled apparatuses 20A and 20B as the control targets of the controller 10 is completed.

Next, a description will be given on a specific processing when the controller 10 obtains data of a content from the controlled apparatus 20 through a direct access.

[3. Processing of Obtaining Content List from Controlled Apparatus 20 by Service Server 30 through Direct Access]

Figure 14:
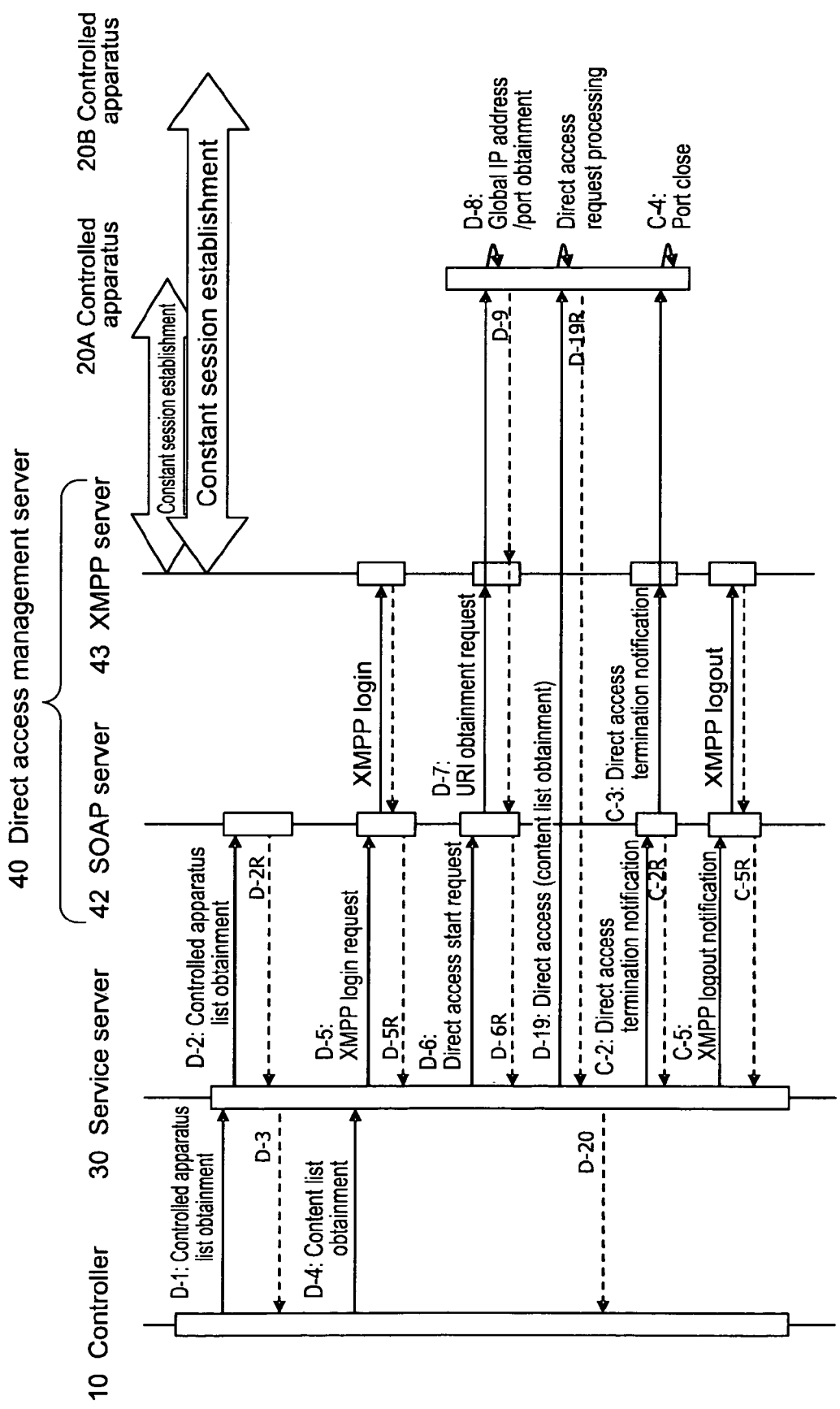
FIG. 14 is a sequence diagram of an entire system relating to such a processing that the service server obtains a content list from the controlled apparatus through a direct access.
Figure 17:
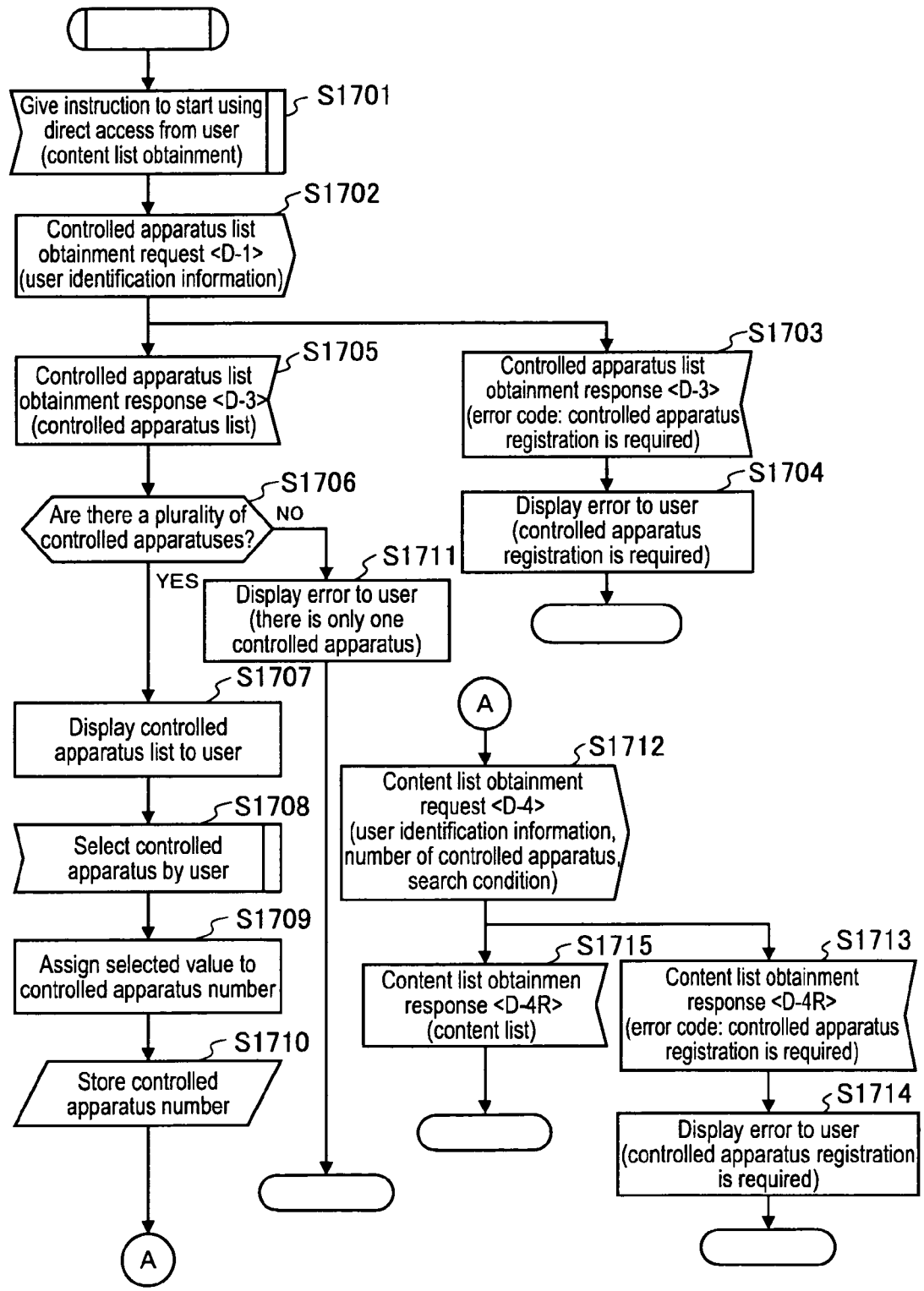
FIG. 17 is a flowchart showing an operation of the controller at the time of the processing of obtaining the content list.
Figure 18:
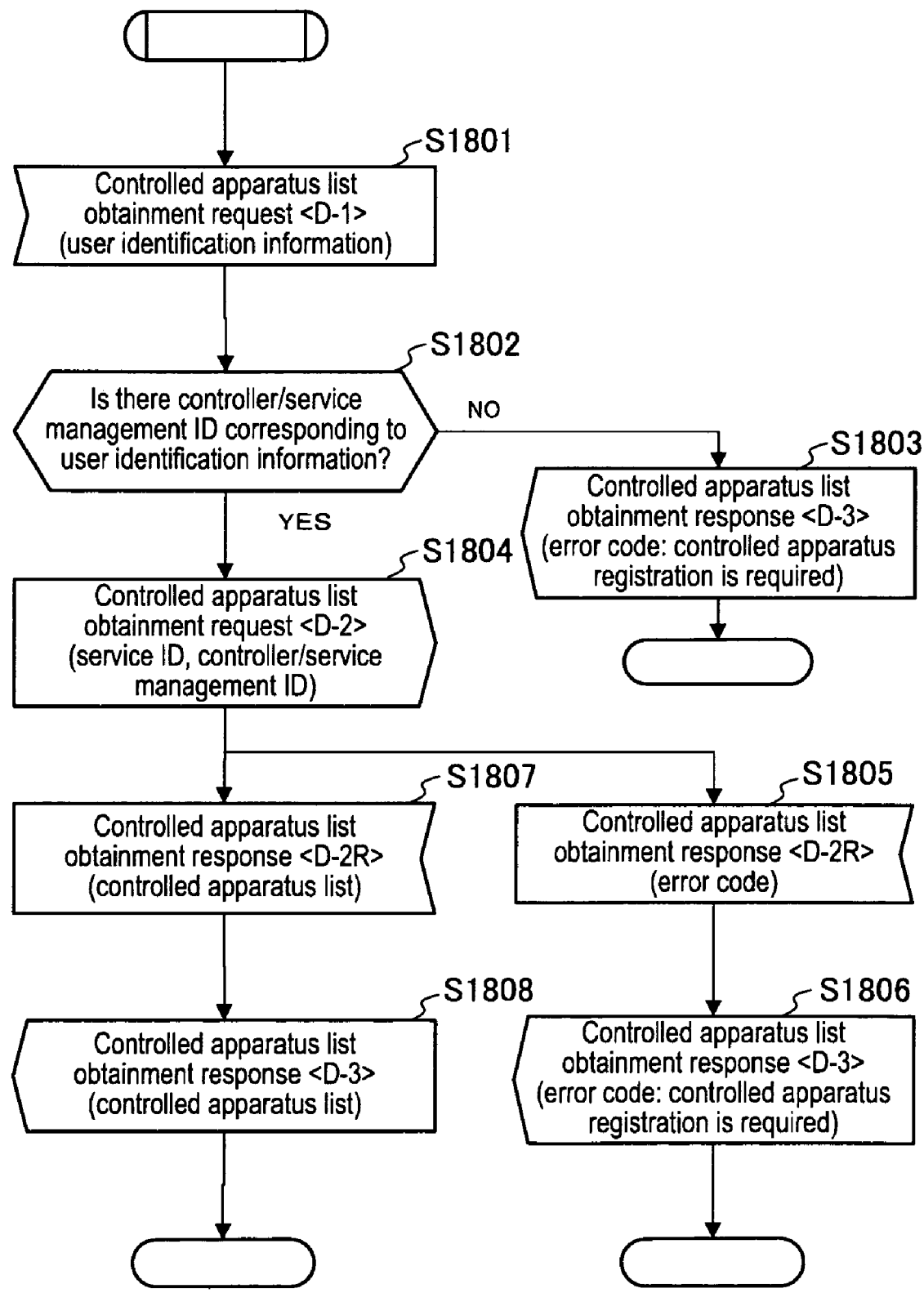
FIG. 18 is a flowchart showing an operation of the service server at the time of the processing of obtaining the content list.
Figure 19:
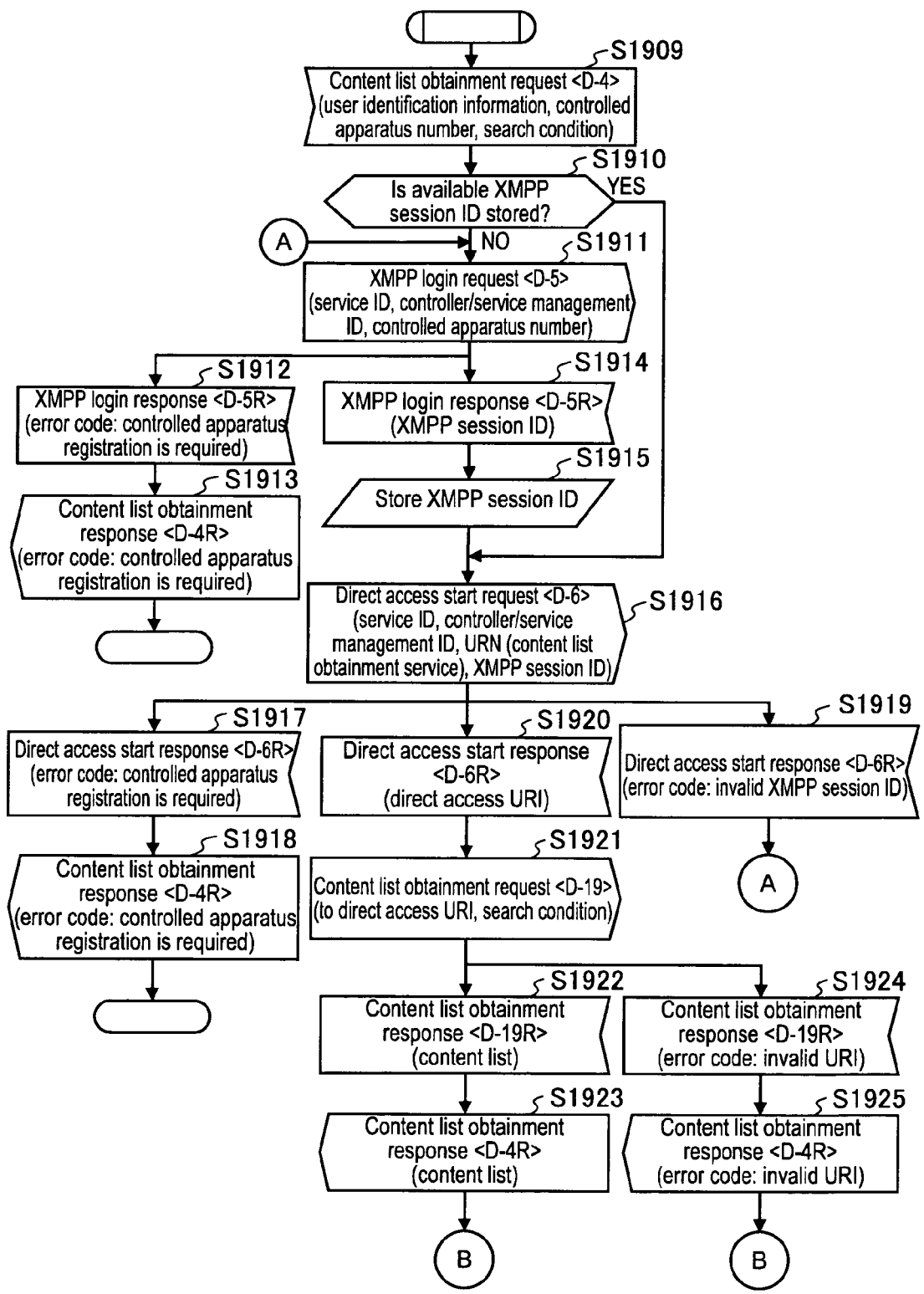
FIG. 19 is a flowchart showing an operation of the service server at the time of the processing of obtaining the content list.
Figure 20:
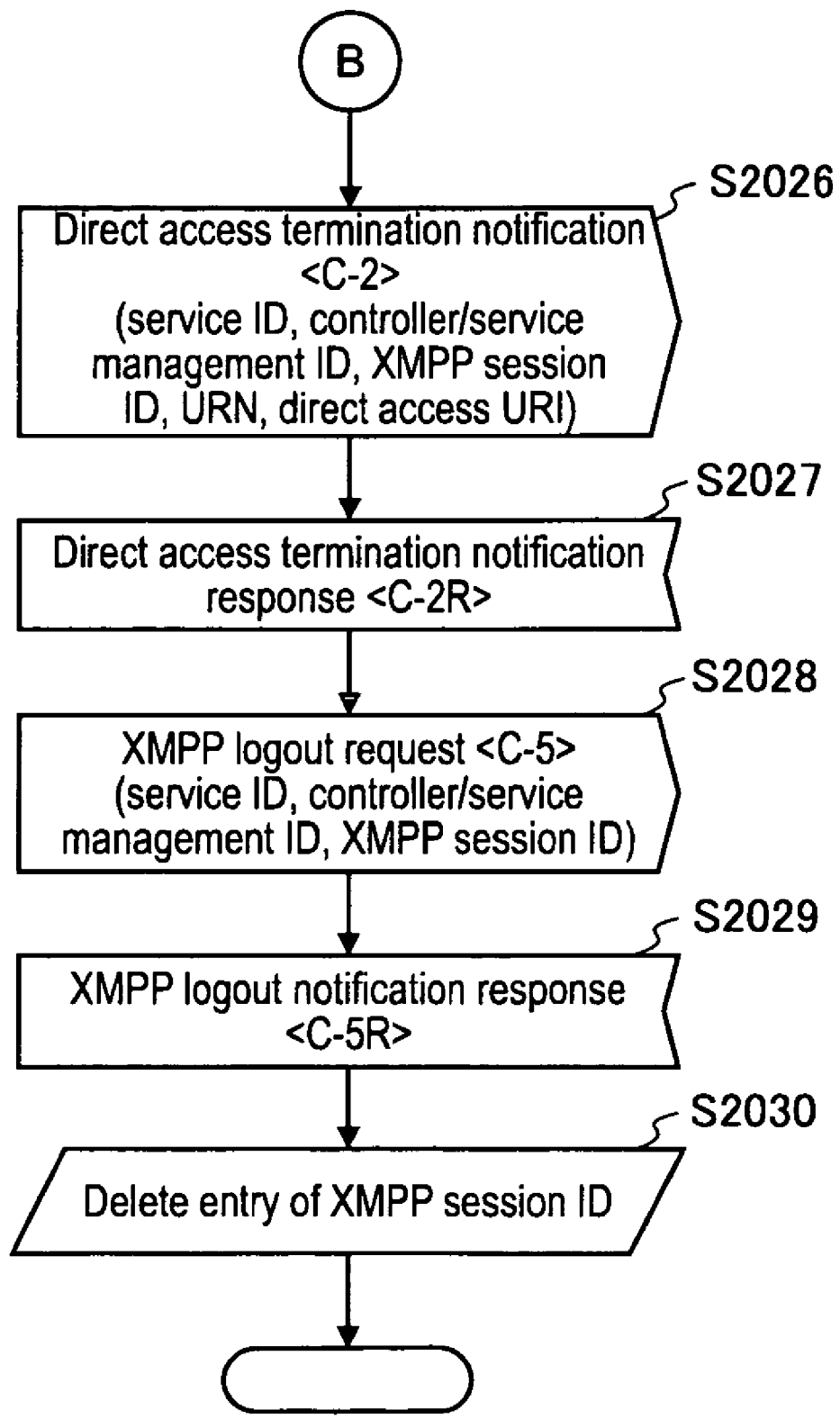
FIG. 20 is a flowchart showing an operation of the service server at the time of the processing of obtaining the content list.
Figure 21:
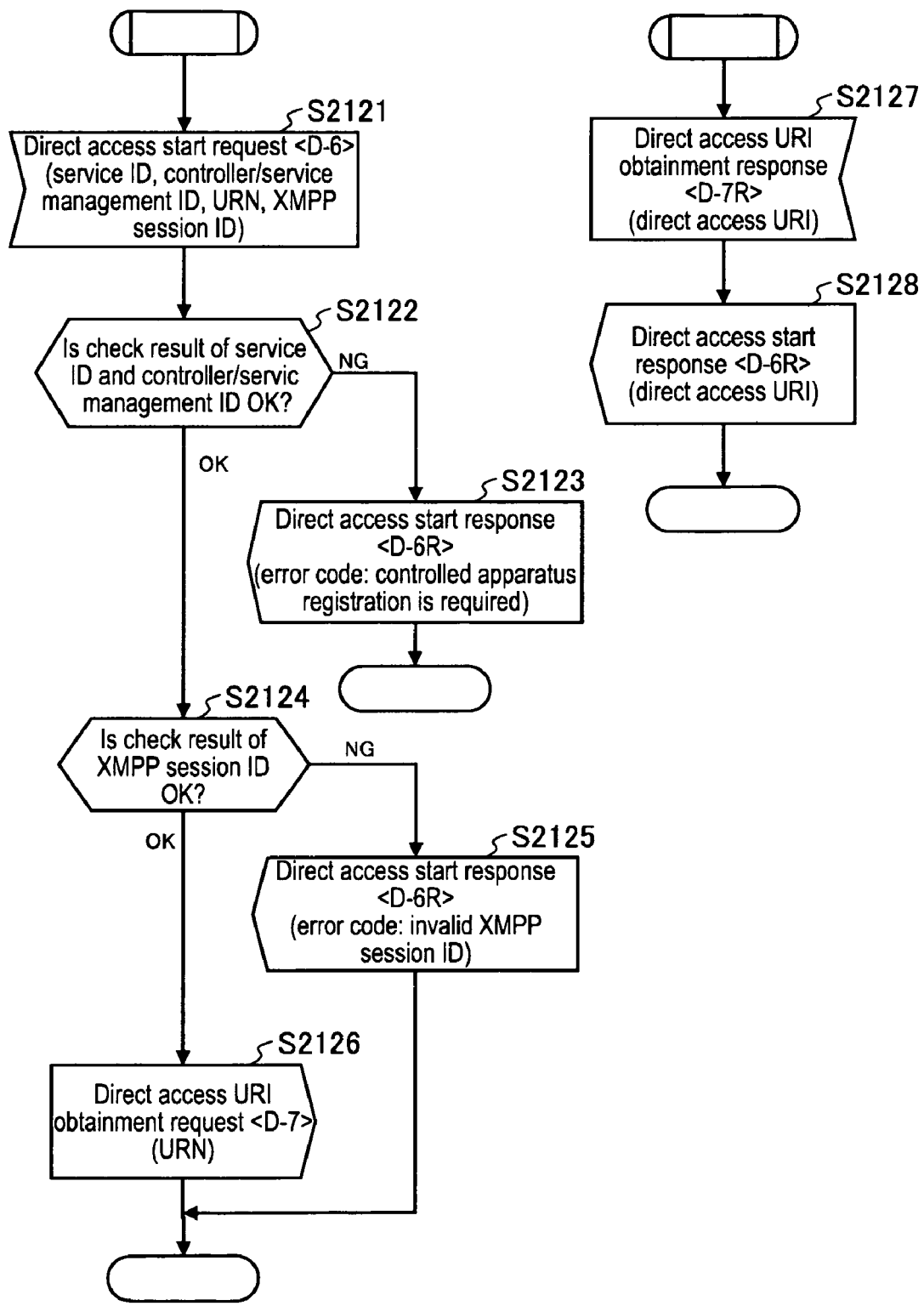
FIG. 21 is a flowchart showing an operation of the direct access management server at the time of the processing of obtaining the content list.
Figure 22:
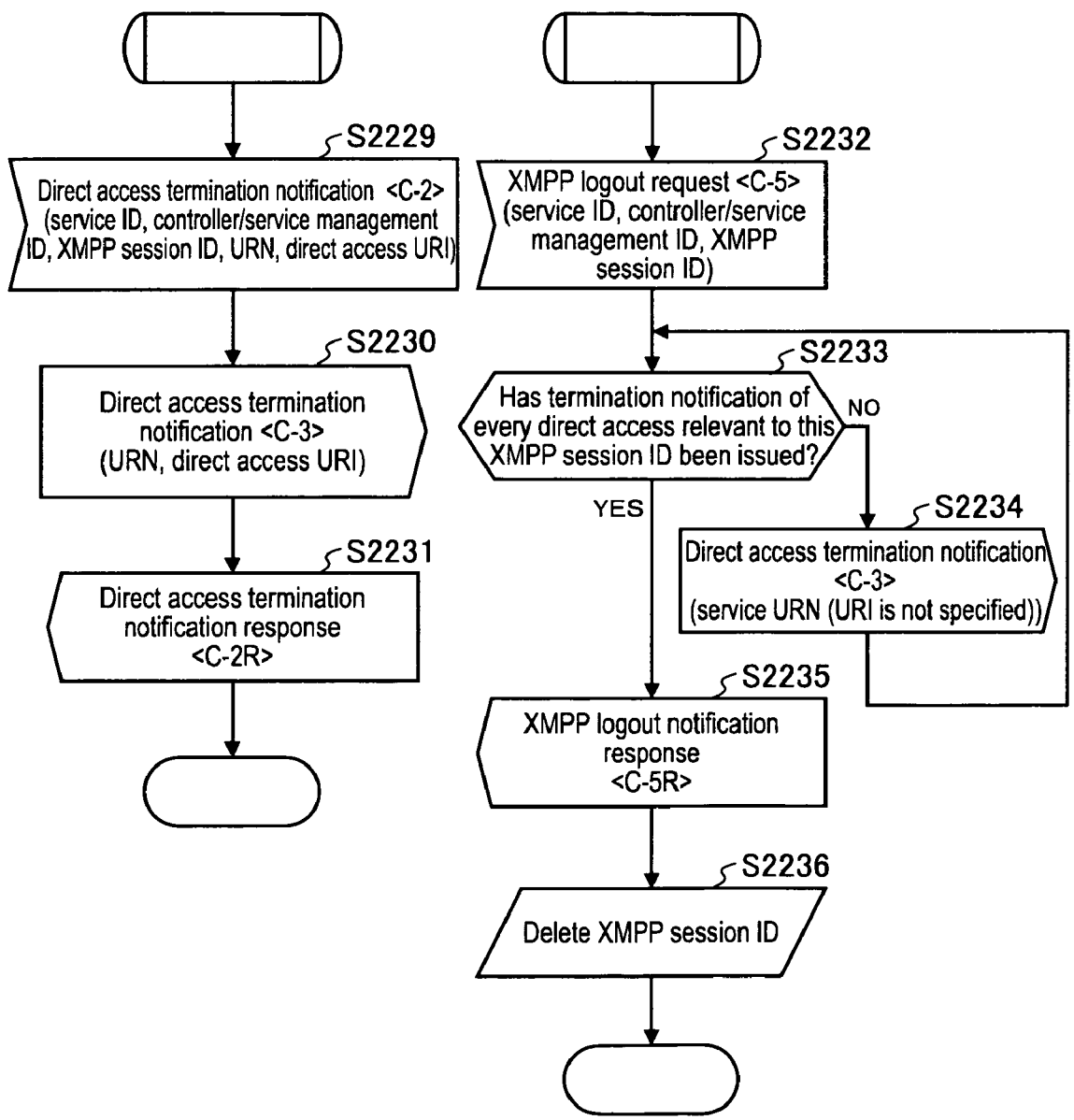
FIG. 22 is a flowchart showing an operation of the direct access management server at the time of the processing of obtaining the content list.
Figure 23:
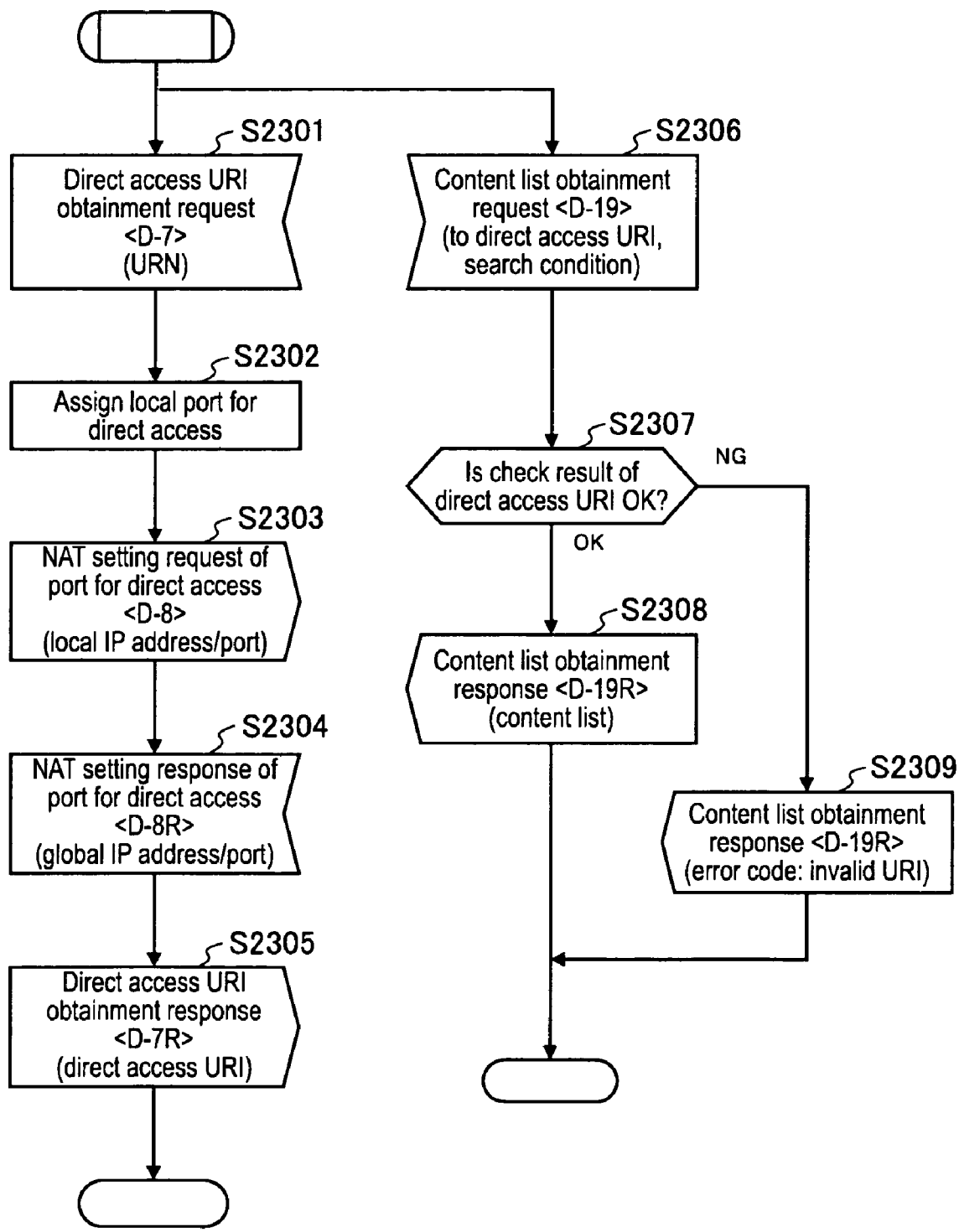
FIG. 23 is a flowchart showing an operation of the controlled apparatus at the time of a processing of obtaining the content list.
Figure 24:
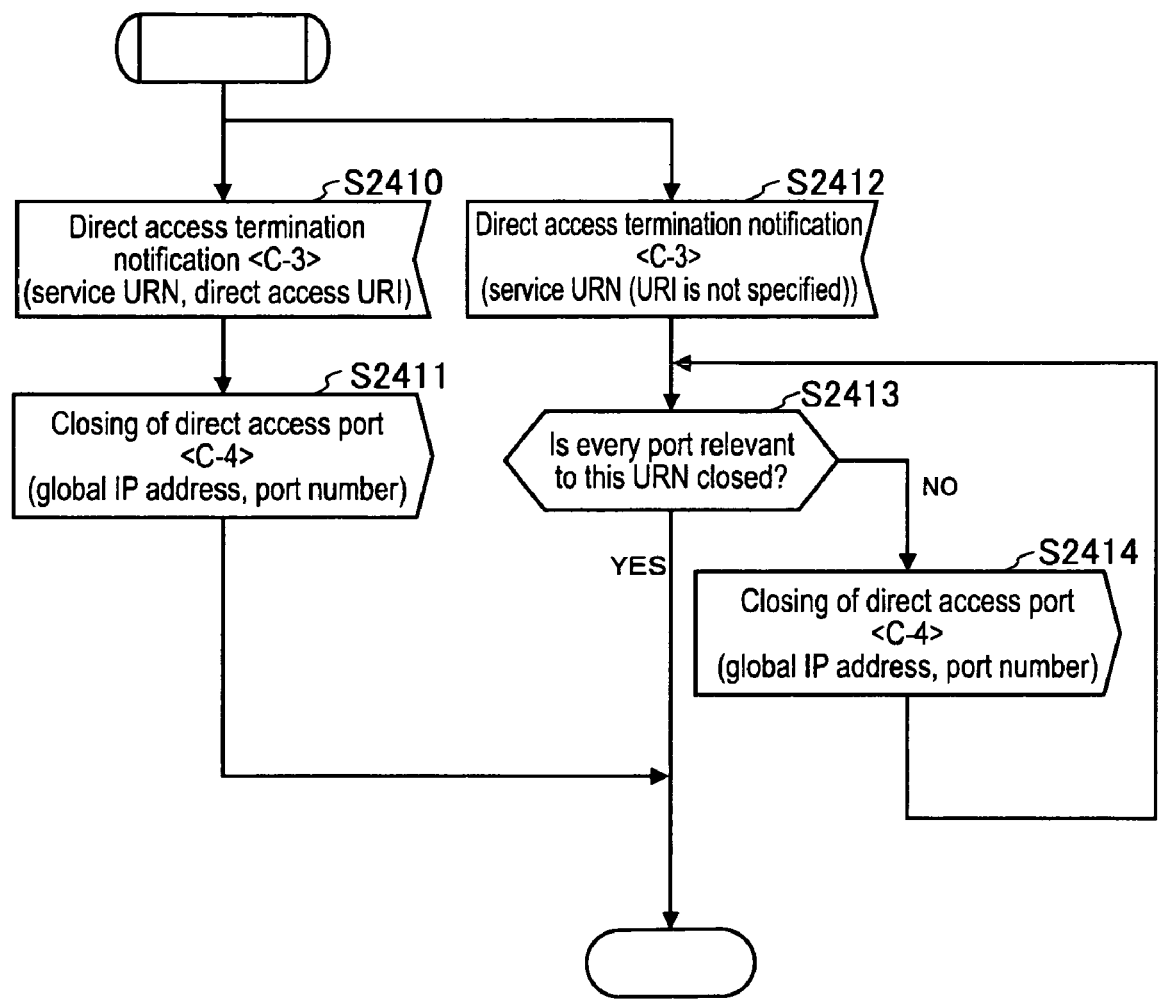
FIG. 24 is a flowchart showing an operation of the controlled apparatus at the time of a processing of obtaining the content list.

FIG. 14 is a sequence diagram of an entire system relating to such a processing that the service server 30 obtains a content list from the controlled apparatus 20 through a direct access. FIGS. 15 and 16 are tables each showing functions of interfaces at the time of processing of obtaining the content list. FIG. 17 is a flowchart showing an operation of the controller 10 at the time of processing of obtaining the content list. FIGS. 18, 19, and 20 are flowcharts each showing an operation of the service server 30 at the time of processing of obtaining the content list. FIGS. 11, 21, and 22 are flowcharts each showing an operation of the direct access management server 40 at the time of processing of obtaining the content list. FIGS. 23 and 24 are flowcharts each showing an operation of the controlled apparatus 20 at the time of processing of obtaining the content list.

First, when the user of the controller 10 sends to the controller 10 an instruction to start using the direct access for obtaining the content list (Step S1701 of FIG. 17), the controller 10 transmits to the service server 30 a controlled apparatus list obtainment request <D-1> including user identification information preset to itself (Step S1702 of FIG. 17).

Upon reception of the controlled apparatus list obtainment request <D-1> from the controller 10 (Step S1801 of FIG. 18), the service server 30 judges whether a controller/service management ID corresponding to the user identification information included in the controlled apparatus list obtainment request <D-1> is stored in the storage portion 31 (Step S1802 of FIG. 18). In a case where the controller/service management ID corresponding to the user identification information is not stored in the storage portion 31, an error code indicating that the registration of the controlled apparatus is required is transmitted to the controller 10 as a controlled apparatus list obtainment response <D-3> (Step S1803 of FIG. 18).

On the other hand, in a case where the controller/service management ID corresponding to the user identification information included in the controlled apparatus list obtainment request <D-1> is stored in the storage portion 31, the service server 30 transmits to the SOAP server 42 in the direct access management server 40 a controlled apparatus list obtainment request <D-2> including the controller/service management ID and a service ID that functions as information for identifying the service (Step S1804 of FIG. 18).

Upon reception of the controlled apparatus list obtainment request <D-2> from the service server 30 (Step S1112 of FIG. 11), the SOAP server 42 in the direct access management server 40 judges whether the combination of the controller/service management ID and the service ID included in the controlled apparatus list obtainment request <D-2> is stored in the storage portion 41 in the direct access management server 40 (Step S1113 of FIG. 11). When the combination is not stored, the SOAP server 42 transmits to the service server 30 an error code indicating that the registration of the controlled apparatus is required as a controlled apparatus list obtainment response <D-2R> (Step S1114 of FIG. 11).

Upon reception of the error code as controlled apparatus list obtainment response <D-2R> from the SOAP server 42 in the direct access management server 40 (Step S1805 of FIG. 18), the service server 30 transmits to the controller 10 the error code as a controlled apparatus list obtainment response <D-3> (Step S1806 of FIG. 18). Upon reception of the error code as the controlled apparatus list obtainment response <D-3> from the service server 30 (Step S1703 of FIG. 17), the controller 10 causes to the display portion to display a massage corresponding to the error code to the user (Step S1704 of FIG. 17).

In Step S1113 of FIG. 11, when the SOAP server 42 in the direct access management server 40 judges that the combination of the controller/service management ID and the service ID included in the controlled apparatus list obtainment request <D-2> is stored in the storage portion 41 of the direct access management server 40, on the bases of a content of association between the controlled apparatus management ID and the controller/service management ID stored in the storage portion 41, a list including numbers obtained by renumbering the controlled apparatus management IDs of the controlled apparatuses capable of being controlled, apparatus names included in the apparatus authentication information of the controlled apparatus, and the like is created from the controller 10 as the controlled apparatus list. Then, the controlled apparatus list is associated with the controller/service management ID and stored in the storage portion 41 through association, and the controlled apparatus list obtainment response <D-2R> including the controlled apparatus list is transmitted to the service server 30 (Step S1115 of FIG. 11).

Upon reception of the controlled apparatus list obtainment response <D-2R> including the controlled apparatus list from the SOAP server 42 in the direct access management server 40 (Step S1807 of FIG. 18), the service server 30 transmits to the controller 10 the controlled apparatus list obtainment response <D-3> including the controlled apparatus list (Step S1808 of FIG. 18).

Upon reception of the controlled apparatus list obtainment response <D-3> including the controlled apparatus list (Step S1705 of FIG. 17), the controller 10 judges whether the controlled apparatus list has a plurality of numbers of the controlled apparatuses (Step S1706 of FIG. 17). In a case where the controlled apparatus list has the plurality of numbers of the controlled apparatuses, the controller 10 causes the display portion to display the content of the controlled apparatus list (Step S1707 of FIG. 17), and urges the user to select one from the plurality of the numbers of the controlled apparatuses (Step S1708 of FIG. 17). The controller 10 stores the selected number in the storage portion 11 (Steps S1709 and S1710 of FIG. 17). Here, it is supposed that the "controlled apparatus 20B" is selected and the number thereof is stored in the storage portion 11. On the other hand, in a case where it is judged that the list does not have the numbers of the plurality of controlled apparatuses in Step S1706 of FIG. 7, the controller 10 causes the display portion to display an error massage to this effect to the user (Step S1711 of FIG. 17).

Next, in order to obtain a content list including a content title, time, and a content ID stored in the controlled apparatus 20B, the controller 10 transmits to the service server 30 a content list obtainment request <D-4> including the user identification information, the controlled apparatus number (the number of the controlled apparatus 20B in this case), and a search condition that are stored in the storage portion 11 (Step S1712 of FIG. 17). Herein, the search condition refers to a condition specified by the user for narrowing contents which the user wants to transfer.

Upon reception of the content list obtainment request <D-4> from the controller 10 (Step S1909 of FIG. 19), the service server 30 stores in the storage portion 31 the user identification information, the controlled apparatus number, and the search condition included in the content list obtainment request <D-4>, and then checks whether the XMPP session ID is stored in the storage portion 31 (Step S1910 of FIG. 19). The XMPP session ID can be used by the service server 30 in directly accessing the controlled apparatus 20. When the XMPP session ID is not stored, the service server 30 transmits to the SOAP server 42 in the direct access management server 40 an XMPP login request <D-5> including the service ID, the controller/service management ID, and the number of the controlled apparatus in order to obtain the XMPP session ID (Step S1911 of FIG. 19).

Upon reception of the XMPP login request <D-5> from the service server 30 (Step S1116 of FIG. 11), the SOAP server 42 in the direct access management server 40 judges whether the combination of the service ID, the controller/service management ID, and the controlled apparatus number included in the XMPP login request <D-5> is stored in the storage portion 41 (Step S1117 of FIG. 11). When the combination is not stored, the SOAP server 42 in the direct access management server 40 transmits to the service server 30 an error code indicating that the registration of the controlled apparatus as a corresponding service target is required, as an XMPP login response <D-5R> (Step S1118 of FIG. 11). After that, the operation of the direct access management server 40 is terminated.

Upon reception of the error code indicating that the registration of the controlled apparatus as a corresponding service target is required as the XMPP login response <D-5R> from the SOAP server 42 in the direct access management server 40 (Step S1912 of FIG. 19), the service server 30 transmits to the controller 10 the error code as a content list obtainment response <D-4R> (Step S1913 of FIG. 19). Upon reception of the error code as the content list obtainment response <D-4R> (Step S1713 of FIG. 17), the controller 10 causes the display portion to display an error massage indicating that the registration of the controlled apparatus 20 as a service target is required to the user (Step S1714 of FIG. 17).

On the other hand, the SOAP server 42 in the direct access management server 40 judges that the combination of the service ID, the controller/service management ID, and the number of the controlled apparatus included in the XMPP login request <D-5> from the service server 30 is stored in the storage portion 41 in Step S1117 of FIG. 11, meaning that the controlled apparatus 20 as the service target has been registered. Therefore, the SOAP server 42 creates an XMPP session ID required for the service server 30 to directly access the controlled apparatus 20B by using the constant connection session established between the XMPP server 43 and the controlled apparatus 20B, and stores in the storage portion 41 the XMPP session ID thus generated through association with the service ID, the controller/service management ID, and the number of the controlled apparatus included in the XMPP login request <D-5> (Step S1119 of FIG. 11). Then, the SOAP server 42 transmits to the service server 30 the XMPP login response <D-5R> including the XMPP session ID (Step S1120 of FIG. 11). As a result, the XMPP login for the direct access to the controlled apparatus 20B by the service server 30 is completed with the use of the constant connection established between the XMPP server 43 and the controlled apparatus 20B.

Upon reception of the XMPP login response <D-5R> including the XMPP session ID from the SOAP server 42 in the direct access management server 40 (Step 1914 of FIG. 19), the service server 30 stores in the storage portion 31 the XMPP session ID included in the XMPP login response <D-5R> through association with the service ID, the controller/service management ID, and the number of the controlled apparatus (Step 1915 of FIG. 19).

After the XMPP session ID is stored, or when the judgment result in Step S1910 of FIG. 19 shows that the XMPP session ID that can be used is already stored, the service server 30 transmits to the SOAP server 42 in the direct access management server 40 a direct access start request <D-6> including the service ID, the controller/service management ID, the XMPP session ID, and a service URN (Uniform Resource Name) (Step 1916 of FIG. 19). Herein, the service URN refers to information that specifies one of the services (applications) that can be provided by the controlled apparatus 20. In this case, a content list obtainment service is specified.

Upon reception of the direct access start request <D-6> from the service server 30 (Step 2121 of FIG. 21), the SOAP server 42 in the direct access management server 40 judges whether the combination of the service ID and the controller/service management ID included in the direct access start request <D-6> is stored in the storage portion 41 (Step 2122 of FIG. 21). When the combination is not stored, an error code indicating that the registration of the controlled apparatus as a corresponding service target is required is transmitted to the service server 30 as a direct access start response <D-6R> (Step 2123 of FIG. 21).

Upon reception of the error code indicating that the registration of the controlled apparatus as a corresponding service target is required as a direct access start response <D-6R> from the SOAP server 42 in the direct access management server 40 (Step 1917 of FIG. 19), the service server 30 transmits to the controller 10 the error code as the content list obtainment response <D-4R> (Step 1918 of FIG. 19). The operation when the controller 10 receives the error code indicating that the registration of the controlled apparatus as a corresponding service target is required as the content list obtainment response <D-4R> is described above.

When the judgment result in Step S2122 of FIG. 21 shows that the combination of the service ID and the controller/service management ID included in the direct access start request <D-6> is stored in the storage portion 41, the SOAP server 42 in the direct access management server 40 checks the XMPP session ID included in the direct access start request <D-6>. This check is performed by judging whether the combination of the service ID, the controller/service management ID, and the XMPP session ID included in the direct access start request <D-6> is registered in the storage portion 41 (Step S2124 of FIG. 21). When the check result shows NG, the SOAP server 42 in the direct access management server 40 transmits to the service server 30 an error code indicating that an invalid XMPP session ID is used as the direct access start response <D-6R> (Step S2125 of FIG. 21), and terminates the processing.

Upon reception of the error code indicating that the invalid XMPP session ID is used as the direct access start response <D-6R> (Step S1919 of FIG. 19), the service server 30 performs again the processing of transmitting the XMPP login request <D-5> to the XMPP server 43 in the direct access management server 40 and the subsequent processing.

In a case where the check result by the SOAP server 42 in the direct access management server 40 shows OK in Step S2124 of FIG. 21, the service URN (content list obtainment) is extracted from the direct access start request <D-6> received from the service server 30, and a direct access URI obtainment request <D-7> including the service URN is transmitted to the controlled apparatus 20 through the constant connection session established between the XMPP server 43 in the direct access management server 40 and the controlled apparatus 20 (Step S2126 of FIG. 21).

Upon reception of the direct access URI obtainment request <D-7> from the XMPP server 43 in the direct access management server 40 (Step S2301 of FIG. 23), the controlled apparatus 20B assigns a local port for the direct access (Step S2302 of FIG. 23). Next, the controlled apparatus 20B transmits to the router 50 a NAT (Network Address Translation) setting request <D-8> of a port for direct access, including a local IP address and a port number of the local port for the direct access that are assigned to the controlled apparatus 20B in advance, and requests the router 50 to perform mapping of a global IP address and the port number accessible via the Internet with respect to the local IP address and the port number (Step S2303 of FIG. 23). For example, the controlled apparatus 20B accesses the router 50 using the UPnP IGD DCP (Device Control Protocol) or the like in order to assign the URI for the direct access, and previously secures the global IP address and the port number accessible via the Internet.

Upon reception of the global IP address and the port number that are respectively corresponded to the local IP address and the port number of the controlled apparatus 20B from the router 50 as the NAT setting response <D-8R> to the NAT setting request <D-8> of the port for the direct access in Step S2303 of FIG. 23 (Step S2304 of FIG. 23), the controlled apparatus 20B creates a direct access URI based on the global IP address and the port number, and transmits to the direct access management server 40 the direct access URI as a direct access URI obtainment response <D-7R> (Step S2305 of FIG. 23). The direct access URI refers to a URI for directly accessing the controlled apparatus from the service server 30 or the controller 10 via the network. Herein, the URI of the controlled apparatus 20B is the direct access URI.

Upon reception of the direct access URI list as the direct access URI obtainment response <D-7R> through the constant connection session established between the XMPP server 43 and the controlled apparatus 20B (Step S2127 of FIG. 21), the SOAP server 42 in the direct access management server 40 transmits to the service server 30 the direct access URI as the direct access start response <D-6R> (Step S2128 of FIG. 21).

Upon reception of the direct access URI list as the direct access start response <D-6R> from the SOAP server 42 in the direct access management server 40 (Step S1920 of FIG. 19), the service server 30 transmits to the controlled apparatus 20B a content list obtainment request <D-19> including a search condition stored in the storage portion 31 at the time of the reception of the content list obtainment request <D-4> from the controller 10, based on the direct access URI included in the direct access start response <D-6R> (Step S1921 of FIG. 19).

Upon reception of the content list obtainment request <D-19> from the service server 30 (Step S2306 of FIG. 23), the controlled apparatus 20B checks whether the direct access URI included in the content list obtainment request <D-19> is valid (Step S2307 of FIG. 23). When the direct access URI is invalid, the controlled apparatus 20B transmits an error code indicating that the direct access URI is invalid as a content list obtainment response <D-19R> to the service server 30 (Step S2309 of FIG. 23). On the other hand, when the direct access URI is valid, the controlled apparatus 20B reads a corresponding content list from the storage portion 21 based on the search condition included in the content list obtainment request <D-19>, and transmits the content list as the content list obtainment response <D-19R> to the service server 30 through the direct access session (Step S2308 of FIG. 23).

For checking the validity of the direct access URI, a method of adding an inimitable random number at the time of issuing the direct access URI and checking whether the random number is included in the direct access URI in the content list obtainment request <D-19> can be used, for example.

Upon reception of the content list obtainment response <D-19R> including the content list (Step S1922 of FIG. 19), the service server 30 transmits to the controller 10 the content list as the content list obtainment response <D-4R> (Step S1923 of FIG. 19). Upon reception of the error code indicating that the URI is invalid as the content list obtainment response <D-19R> (Step S1924 of FIG. 19), the service server 30 transmits to the controller 10 the error code as the content list obtainment response <D-4R> (Step S1925 of FIG. 19).

After that, the service server 30 transmits to the SOAP server 42 in the direct access management server 40 a direct access termination notification <C-2> including the service ID, the controller/service management ID, the XMPP session ID, the service URN, and the direct access URI (Step S2026 of FIG. 20). Upon reception of the direct access termination notification <C-2> from the service server 30 (Step S2229 of FIG. 22), the SOAP server 42 in the direct access management server 40 transmits a direct access termination notification <C-3> including the service URN and the direct access URI in the direct access termination notification <C-2> to the controlled apparatus 20B through the constant connection session established between the XMPP server 43 and the controlled apparatus 20 (Step S2230 of FIG. 22).

Upon reception of the direct access termination notification <C-3> from the direct access management server 40 (Step S2410 of Step 24), the controlled apparatus 20B closes the direct access port including the global IP address and the port number relevant to the direct access URI included in the direct access termination notification <C-3> (<C-4>: Step S2411 of Step 24).

On the other hand, after transmitting the direct access termination notification <C-3>, the SOAP server 42 in the direct access management server 40 transmits a direct access termination notification response <C-2R> to the service server 30 (Step S2231 of Step 22). Upon reception of the direct access termination notification response <C-2R> (Step S2027 of Step 20), the service server 30 transmits to the SOAP server 42 in the direct access management server 40 an XMPP logout request <C-5> including the service ID, the controller/service management ID, the XMPP session ID (Step S2028 of Step 20).

Upon reception of the XMPP logout request <C-5> from the service server 30 (Step S2232 of Step 22), the SOAP server 42 in the direct access management server 40 judges whether the termination notification of the direct access of every service URN relevant to the XMPP session ID is issued to the controlled apparatus 20B (Step S2233 of Step 22). In a case where there remains the service URN the direct access termination of which is to be notified of, the SOAP server 42 in the direct access management server 40 transmits the direct access termination notification <C-3> in which only the service URN is specified (the URI for the direct access is not specified) to the controlled apparatus 20B through the constant connection session established between the XMPP server 43 and the controlled apparatus 20B (Step S2234 of Step 22). When every direct access termination notification is issued, an XMPP logout notification response <C-5R> is transmitted to the service server 30 (Step S2235 of Step 22). After that, the SOAP server 42 in the direct access management server 40 deletes the XMPP session ID stored in the storage portion 41 (Step S2236 of Step 22).

Upon reception of the XMPP logout notification response <C-5R> from the SOAP server 42 in the direct access management server 40 (Step S2029), the service server 30 deletes from the storage portion 31 the entry of the XMPP session ID required for the direct access to the controlled apparatus 20B (Step S2030).

Upon reception of the direct access termination notification <C-3> in which the URI for the direct access is not specified from the direct access management server 40 (Step S2412 of Step 24), the controlled apparatus 20B closes every direct access port relevant to the service URN specified in the direct access termination notification <C-3> (Steps S2413 and S2414 of Step 24).

Described above is the operation when the controller 10 obtains the content list stored in the controlled apparatus 20B by performing the direct access thereto via the service server 30.

[4. Copy Processing of Content Data (1)]

Next, a description will be given on an operation when the content data recorded on the controlled apparatus 20B is copied to the controlled apparatus 20A based on an instruction from the controller 10 in a case where the controlled apparatuses 20A and 20B are connected to the same LAN.

Figure 25:
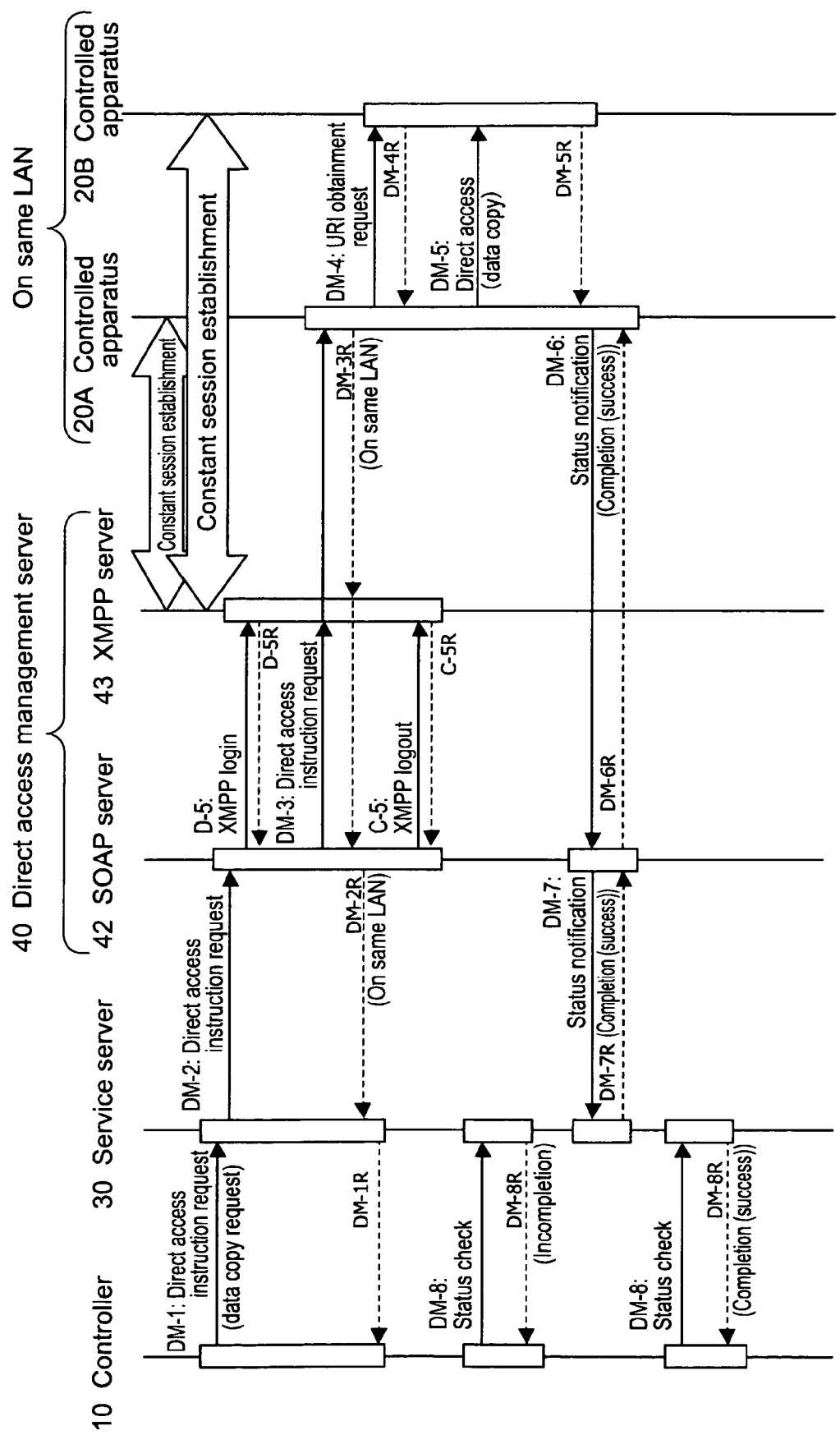
FIG. 25 is a sequence diagram of an entire system relating to a copy processing of content data (1)
Figure 30:
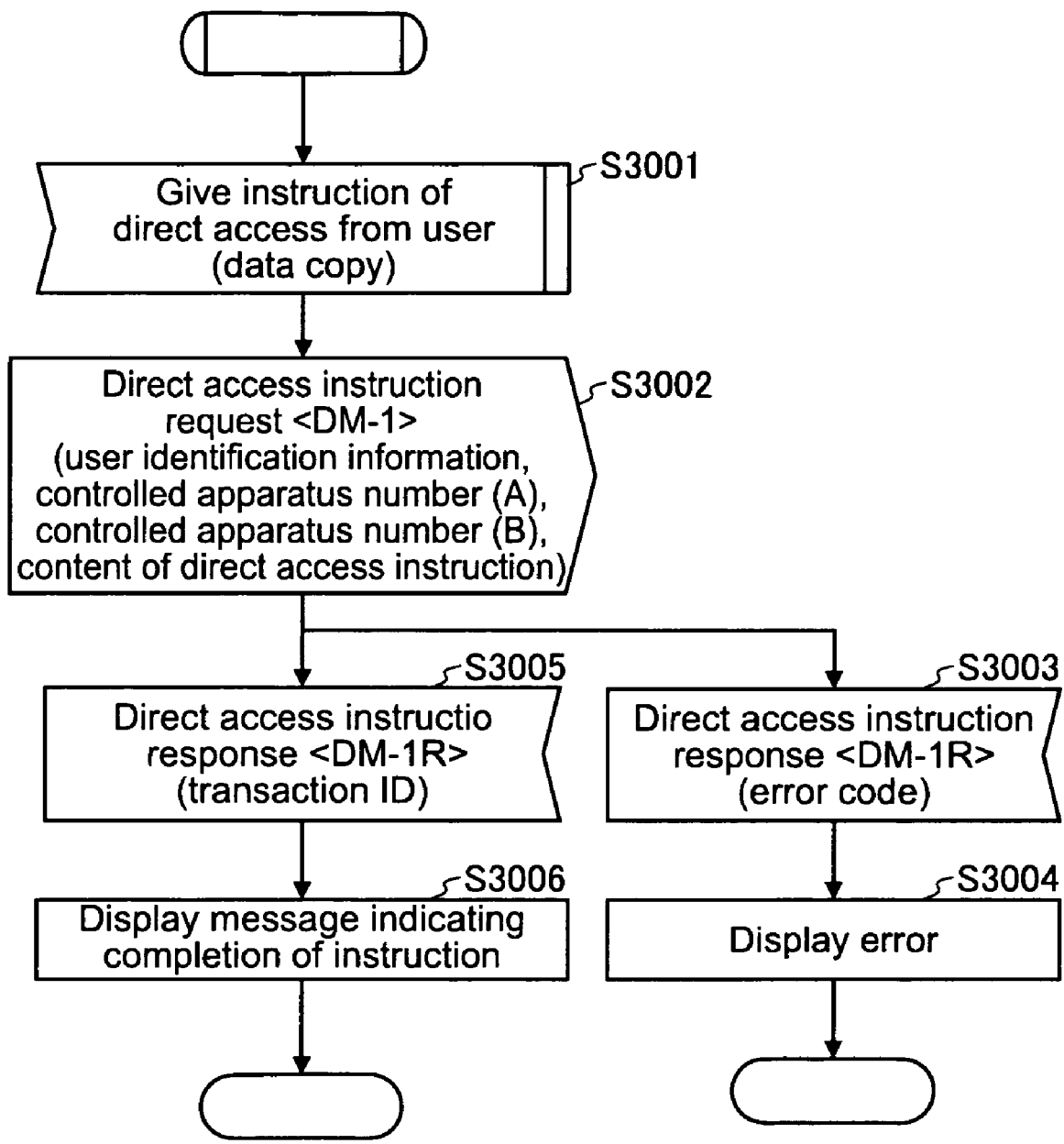
FIGS. 30 and 31 are flowcharts each showing an operation of the controller relating to the copy processing of content data.
Figure 31:
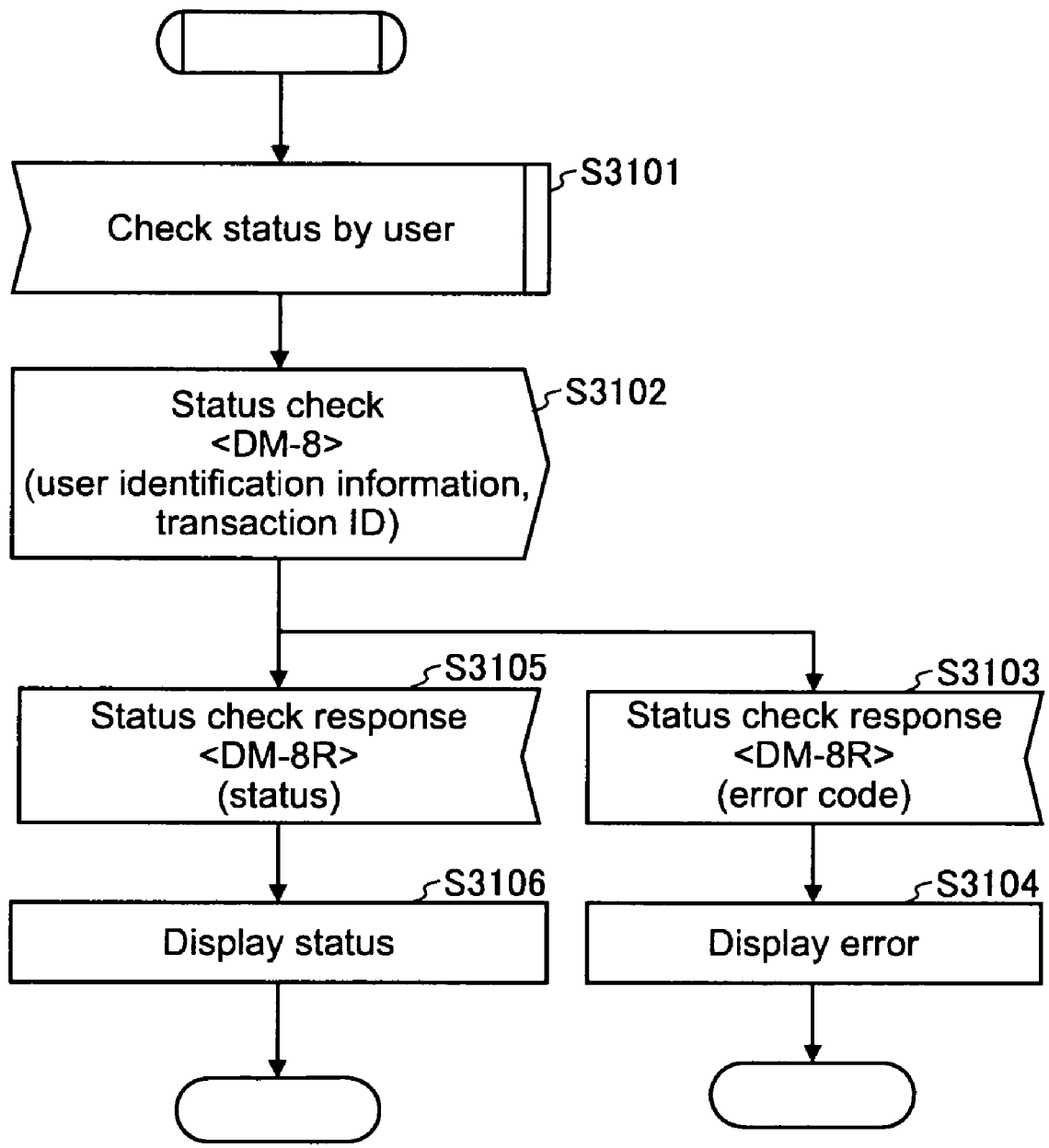
Figure 32:
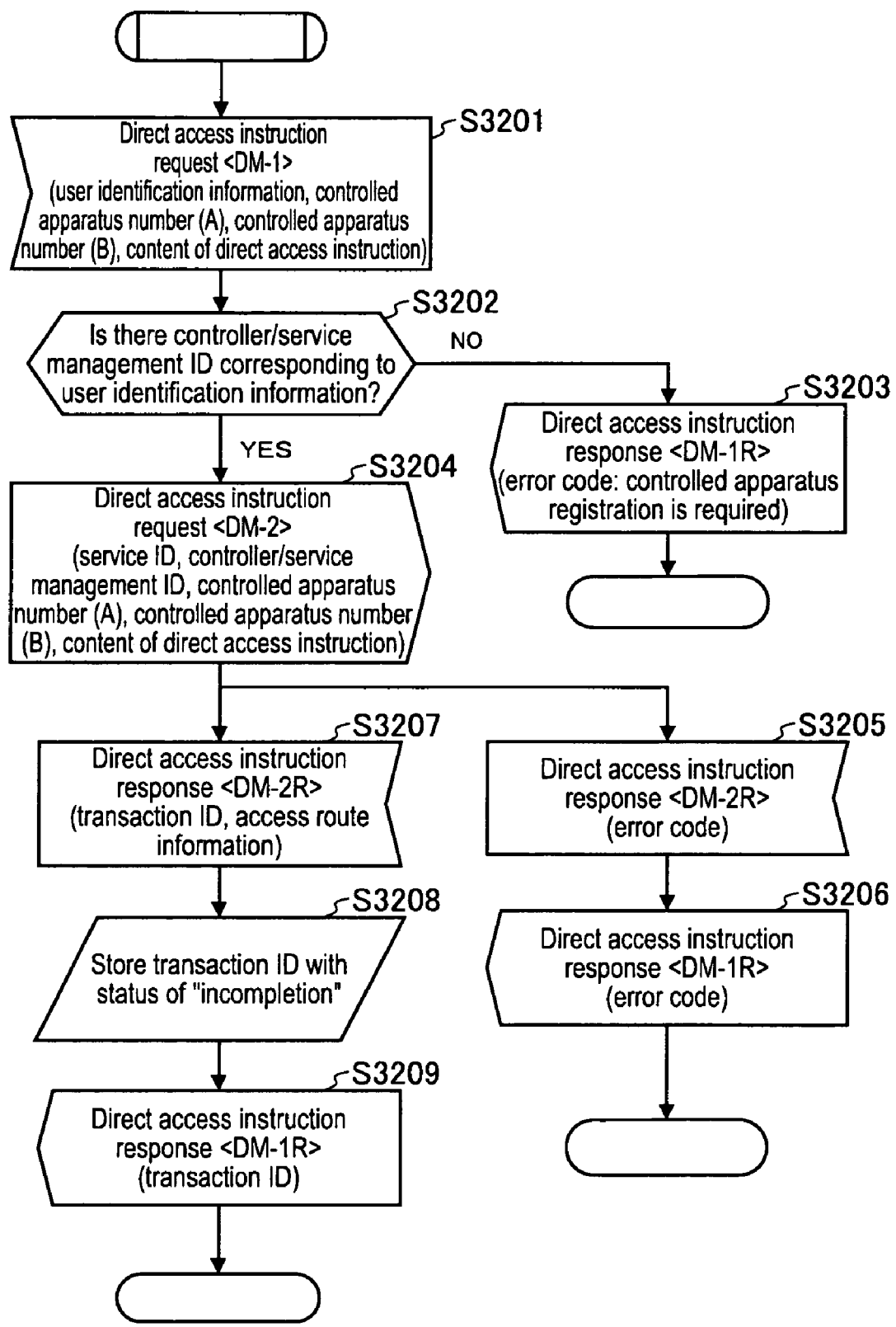
FIG. 32 is a flowchart showing an operation of the service server relating to the copy processing of content data.
Figure 33:
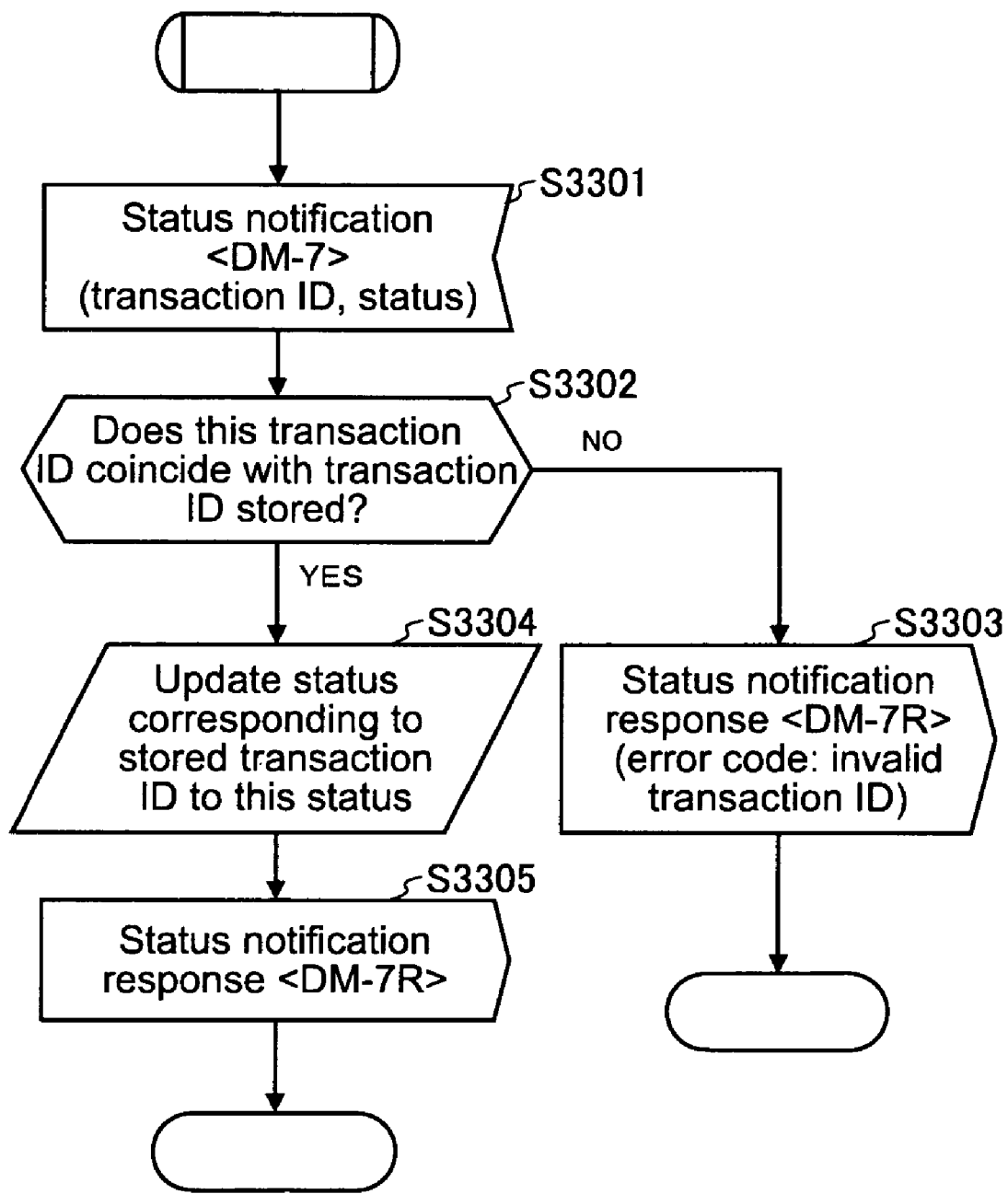
FIG. 33 is a flowchart showing an operation of the service server relating to the copy processing of content data.
Figure 34:
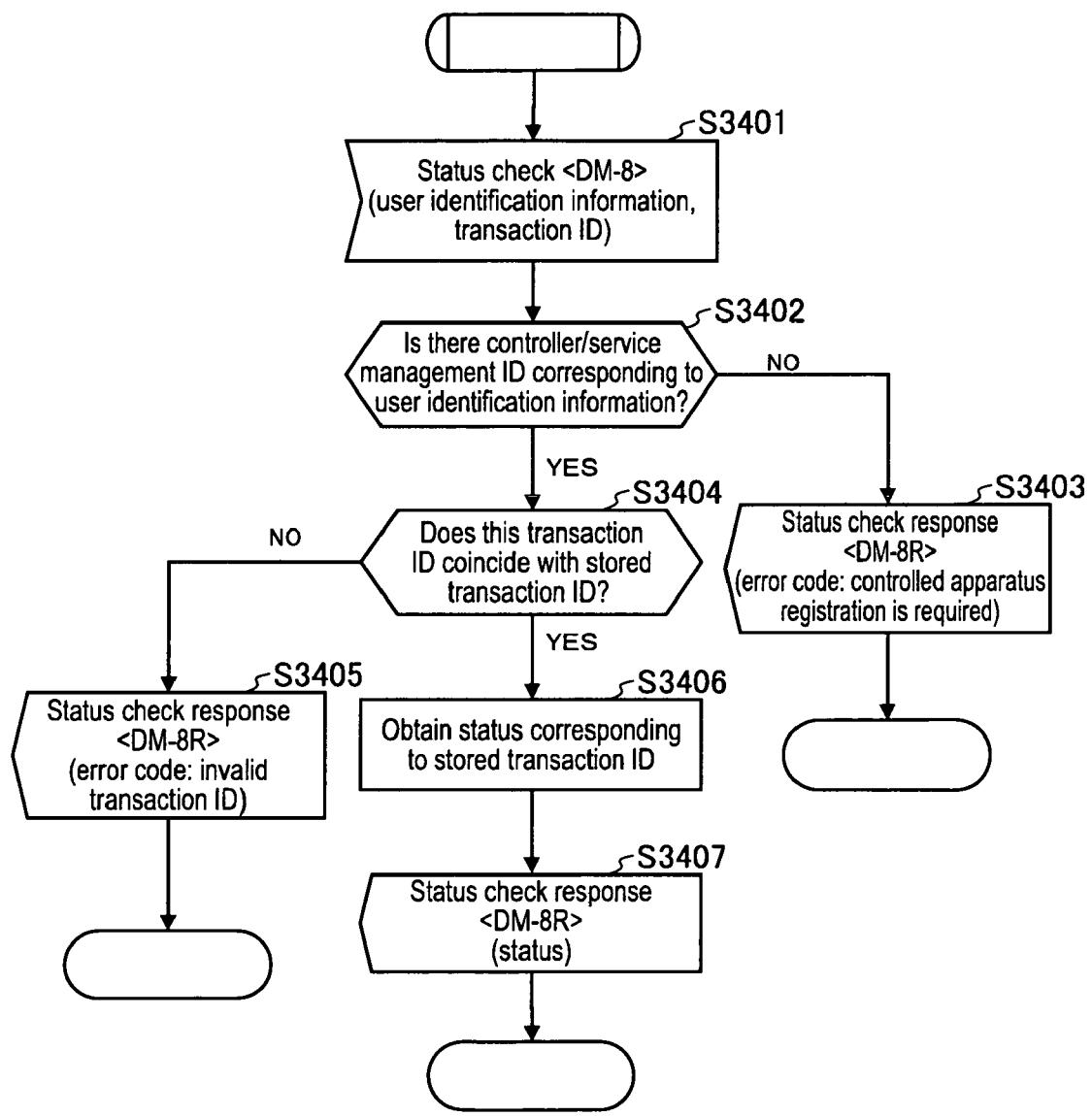
FIG. 34 is a flowchart showing an operation of the service server relating to the copy processing of content data.
Figure 35:
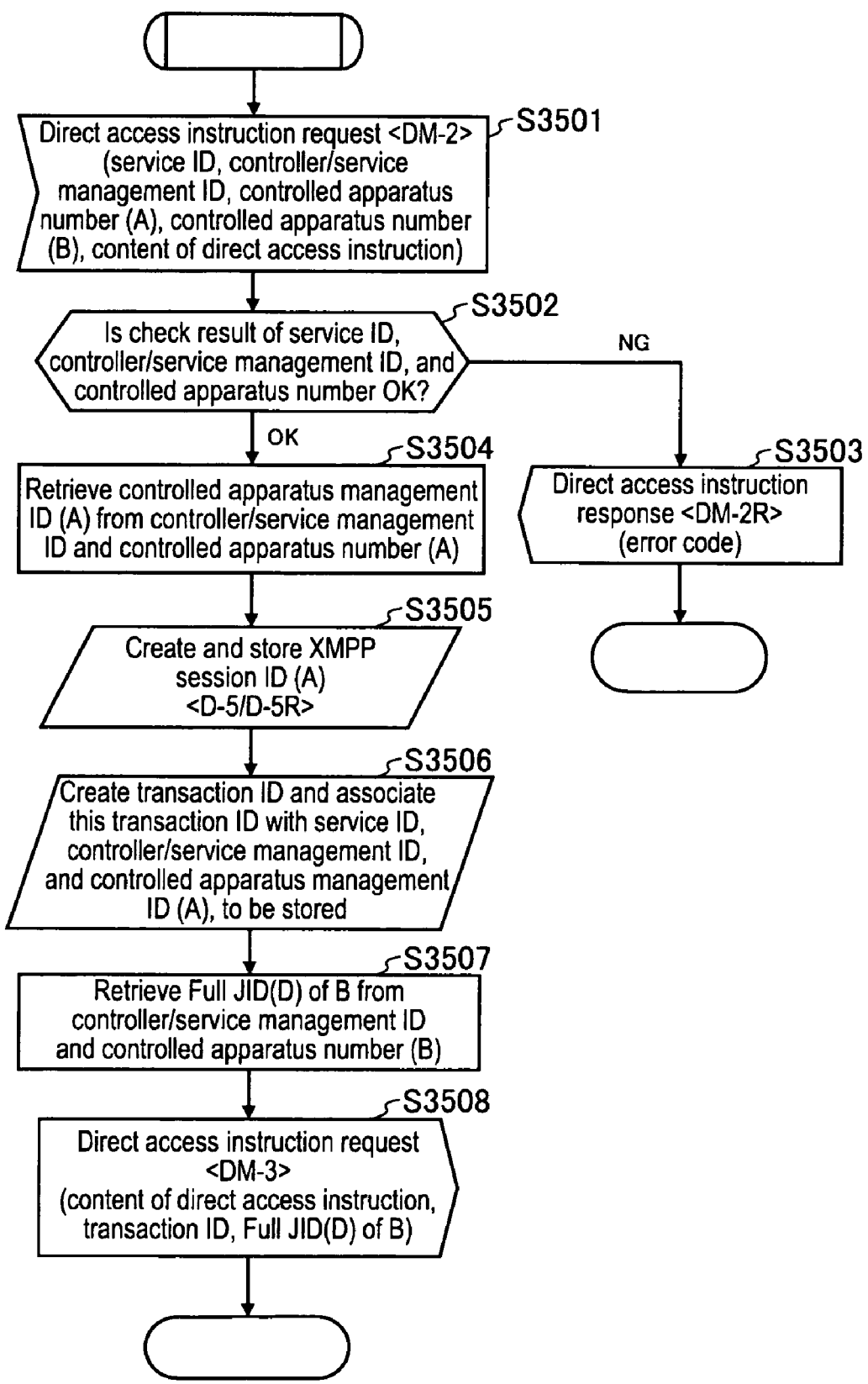
FIG. 35 is a flowchart showing an operation of the direct access management server relating to the copy processing of content data.
Figure 36:
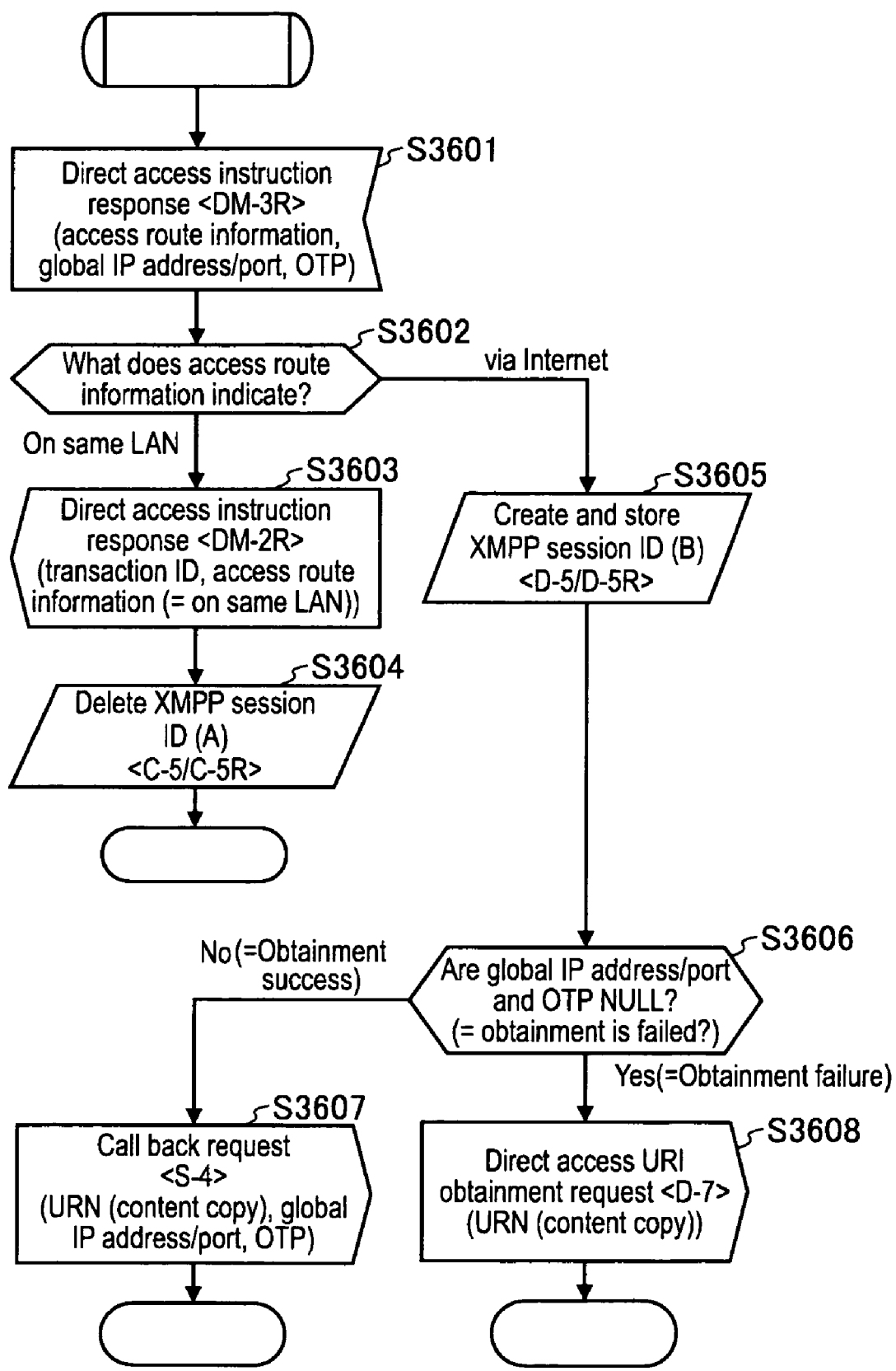
FIG. 36 is a flowchart showing an operation of the direct access management server relating to the copy processing of content data.
Figure 37:
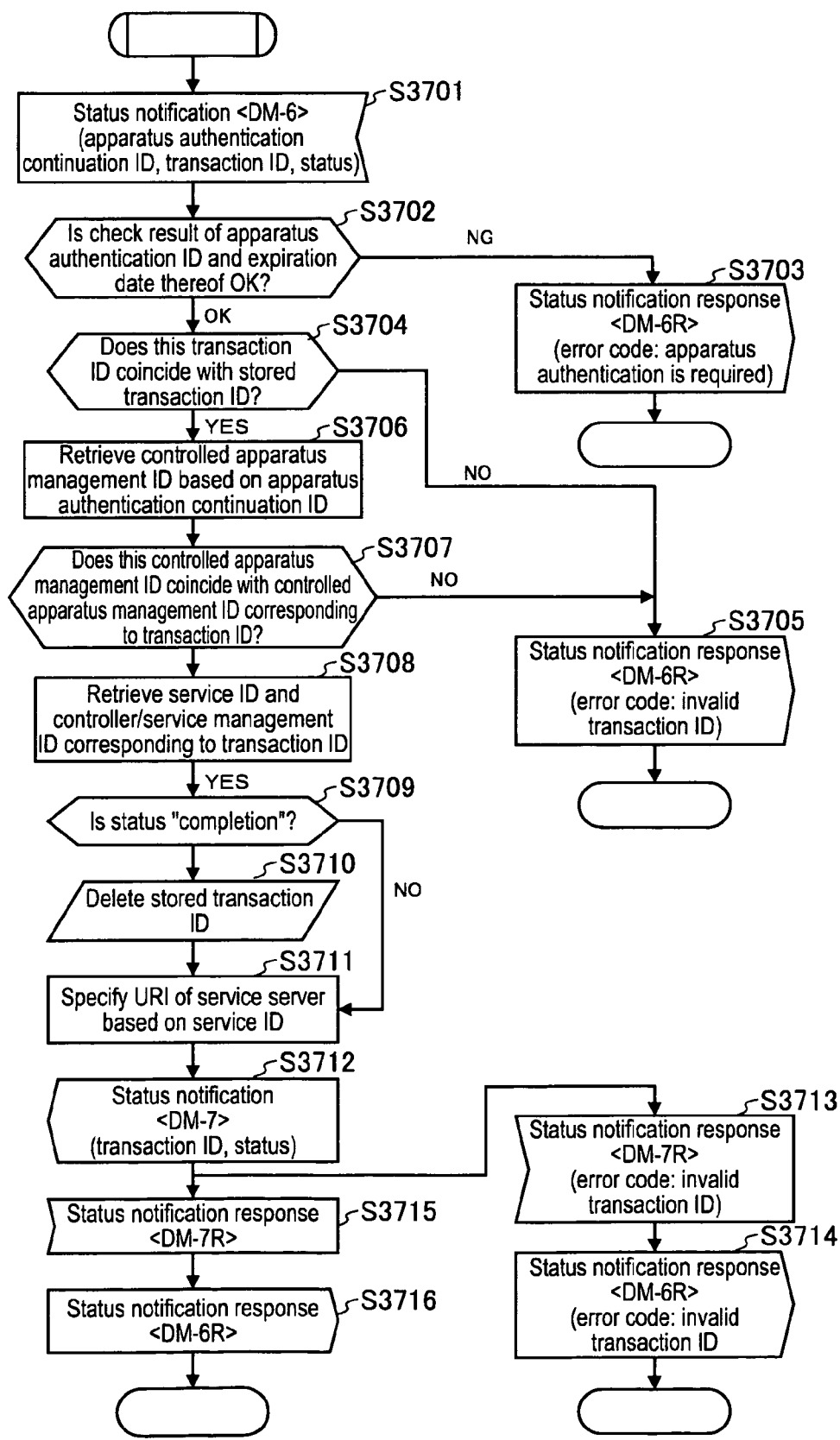
FIG. 37 is a flowchart showing an operation of the direct access management server relating to the copy processing of content data.
Figure 38:
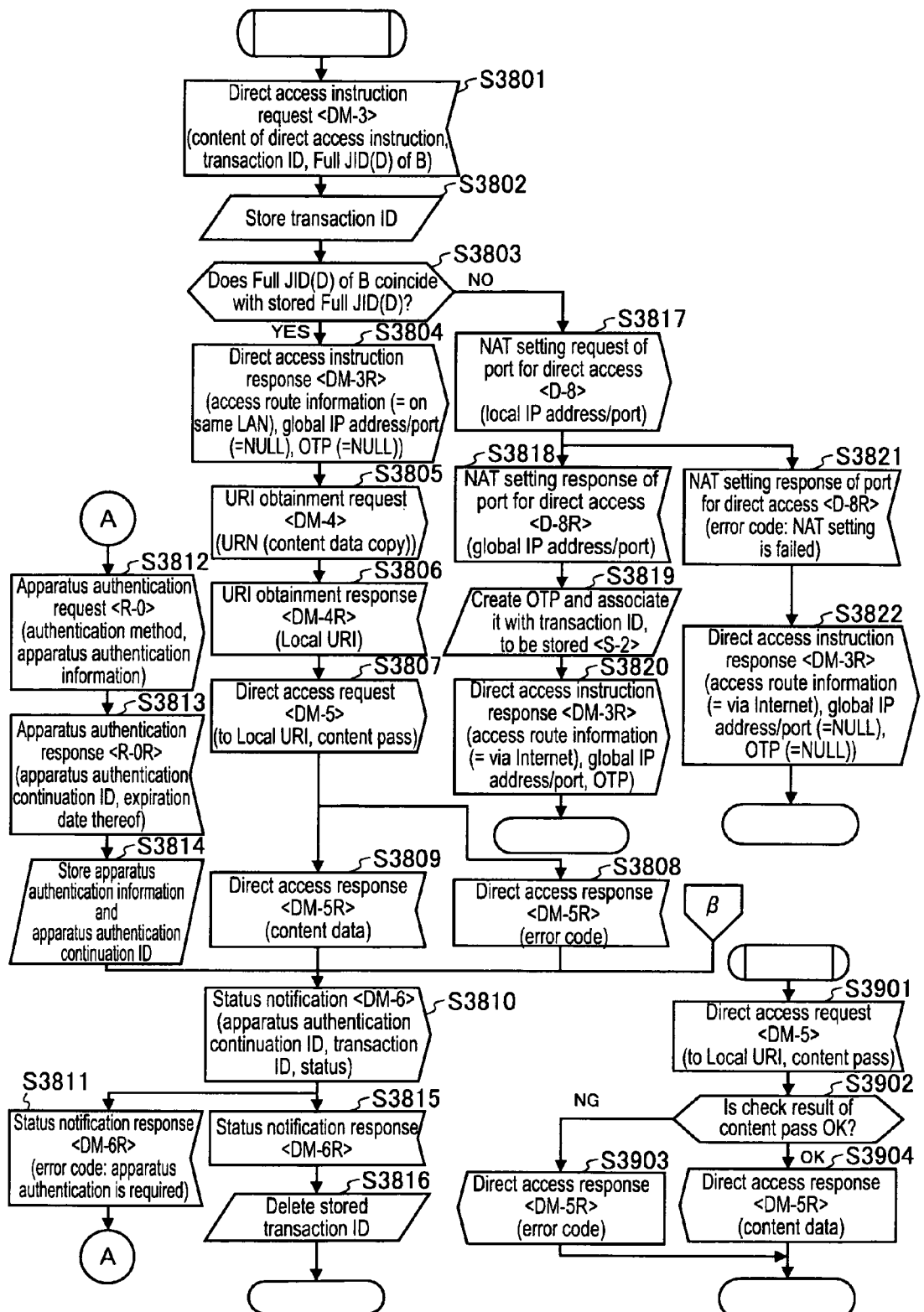
FIG. 38 is a flowchart showing an operation of the controlled apparatus relating to the copy processing of content data.

FIG. 25 is a sequence diagram of an entire system relating to a copy processing of content data (1). FIGS. 26 to 29 are tables each showing functions of interfaces relating to the copy processing of content data. FIGS. 30 and 31 are flowcharts each showing an operation of the controller 10 relating to the copy processing of content data. FIGS. 32 to 34 are flowcharts each showing an operation of the service server 30 relating to the copy processing of content data. FIGS. 35 to 37 are flowcharts each showing an operation of the direct access management server 40 relating to the copy processing of content data. FIG. 38 is a flowchart showing an operation of the controlled apparatus 20 relating to the copy processing of content data.

First, when the user of the controller 10 instructs the controller 10 to start to use the direct access (Step S3001 of FIG. 30), the controller 10 transmits to the service server 30 a direct access instruction request <DM-1> including user identification information preset thereto, numbers (A) and (B) of the controlled apparatus 20A and 20B, and a content of a direct access instruction (Step S3002 of FIG. 30). Herein, the numbers of the controlled apparatuses 20A and 20B and the content of the direct access instruction are given by the user of the controller 10. The content of the direct access instruction includes the service URN that specifies a service of a copy of the content data, information indicating which of the specified two controlled apparatuses 20A and 20B functions as a copy source and which of them functions as a copy destination, information indicating a position where the content data of the copy source is placed, and the like. Herein, it is supposed that the controlled apparatus 20A is the copy destination and the controlled apparatus 20B is the copy source.

Upon reception of the direct access instruction request <DM-1> from the controller 10 (Step S3201 of FIG. 32), the service server 30 judges whether the controller/service management ID corresponding to the user identification information included in the direct access instruction request <DM-1> is stored in the storage portion 31 (Step S3202 of FIG. 32). In a case where the controller/service management ID corresponding to the user identification information is not stored in the storage portion 31, an error code indicating that the registration of the controlled apparatus is required is transmitted to the controller 10 as a direct access instruction response <DM-1R> (Step S3203 of FIG. 32).

Upon reception of the error code as the direct access instruction response <DM-1R> from the service server 30 (Step S3003 of FIG. 30), the controller 10 causes the display portion to display a message corresponding to the error code to the user (Step S3004 of FIG. 30).

On the other hand, the check result in S3202 of FIG. 32 shows that the controller/service management ID corresponding to the user identification information included in the direct access instruction request <DM-1> is stored in the storage portion 31, the service server 30 transmits to the SOAP server 42 in the direct access management server 40 a direct access instruction request <DM-2> including the service ID serving as information for identifying the service, the controller/service management ID, the numbers (A) and (B) of the two controlled apparatuses 20A and 20B, and the content of the direct access instruction (Step S3204 of FIG. 32).

Upon reception of the direct access instruction request <DM-2> from the service server 30 (Step S3501 of FIG. 35), the SOAP server 42 in the direct access management server 40 judges whether a combination of the service ID, the controller/service management ID, and the number (A) of the controlled apparatus 20A and a combination of the service ID, the controller/service management ID, and the number (B) of the controlled apparatus 20B are stored in the storage portion 41 (Step S3502 of FIG. 35). When the combinations are not stored, an error code indicating that the registration of the controlled apparatus is required as a direct access instruction response <DM-2R> is transmitted to the service server 30 (Step S3503 of FIG. 35).

Upon reception of the direct access instruction response <DM-2R> from the SOAP server 42 in the direct access management server 40 (Step S3205 of FIG. 32), the service server 30 transmits to the controller 10 the error code as the direct access instruction response <DM-1R> (Step S3206 of FIG. 32).

Upon reception of the error code as the direct access instruction response <DM-1R> from the service server 30 (Step S3003 of FIG. 30), the controller 10 causes the display portion to display an message corresponding to the error code to the user (Step S3004 of FIG. 30).

On the other hand, the check result in Step S3502 of FIG. 35 shows OK, the SOAP server 42 in the direct access management server 40 retrieves a controlled apparatus management ID corresponding to the number (A) of the controlled apparatus 20A from the storage portion 41 based on the number (A) of the controlled apparatus 20A and the controller/service management ID included in the direct access instruction request <DM-2> (Step S3504 of FIG. 35). Subsequently, the SOAP server 42 in the direct access management server 40 creates an XMPP session ID that can be used when the service server 30 directly accesses the controlled apparatus 20A, and stores in the storage portion 41 the XMPP session ID through association with the service ID, the controller/service management ID, the controlled apparatus management ID corresponding to the number (A) of the controlled apparatus 20A included in the direct access instruction request <DM-2> (Step S3505 of FIG. 35).

Next, the SOAP server 42 in the direct access management server 40 creates a transaction ID, and stores in the storage portion 41 the transaction ID through association with the service ID, the controller/service management ID, the controlled apparatus management ID corresponding to the number (A) of the controlled apparatus 20A included in the direct access instruction request <DM-2> (Step S3506 of FIG. 35).

Subsequently, the SOAP server 42 in the direct access management server 40 retrieves from the storage portion 41 the Full JID(D) that is the XMPP login ID required for the controlled apparatus 20B to log in the XMPP server 43, based on the controller/service management ID and the number (B) of the controlled apparatus 20B included in the direct access instruction request <DM-2> (Step S3507 of FIG. 35).

Then, the SOAP server 42 in the direct access management server 40 transmits to the controlled apparatus 20A a direct access instruction request <DM-3> including the content of the direct access instruction, the transaction ID, and the Full JID(D) of the controlled apparatus 20B through the constant connection session established between the XMPP server 43 and the controlled apparatus 20A (Step S3508 of FIG. 35).

Upon reception of the direct access instruction request <DM-3> (Step S3801 of FIG. 38), the controlled apparatus 20A stores the transaction ID included therein in the storage portion 21 (Step S3802 of FIG. 38). Subsequently, the controlled apparatus 20A judges whether the Full JID(D) of the controlled apparatus 20B included in the direct access instruction request <DM-3> coincides with the Full JID(D) of the controlled apparatus 20B already stored in the storage portion 21 as the Full JID(D) of the other controlled apparatus on the same LAN (Step S3803 of FIG. 38).

Herein, when the controlled apparatuses 20A and 20B are connected via the same LAN, the two Full JID(D)s coincide with each other. When the controlled apparatuses 20A and 20B are not connected via the same LAN, that is, when they are connected via the Internet, the two Full JID(D)s do not coincide with each other. Herein, a description will be given on the assumption that the controlled apparatuses 20A and 20B are connected via the same LAN. An operation in a case where they are not connected via the same LAN will be described later.

When the controlled apparatus 20A judges that the Full JID(D) of the controlled apparatus 20B included in the direct access instruction request <DM-3> coincides with the Full JID(D) of the controlled apparatus 20B stored in the storage portion 21, a direct access instruction response <DM-3R> including access route information indicating that the access between the controlled apparatuses 20A and 20B is performed via the same LAN is transmitted to the SOAP server 42 in the direct access management server 40 through the constant connection session established between the XMPP server 43 and the controlled apparatus 20A (Step S3804 of FIG. 38).

The direct access instruction response <DM-3R> includes not only the access route information but also the port number and the global IP address of the controlled apparatus 20A and an OTP (onetime password). Note that in a case where the access route information is a value indicating that the access route is the same LAN, the port number and the global IP address of the controlled apparatus 20A and the OTP (onetime password) each are set to a NULL value. Meanwhile, when the access route information is a value indicating that the access route is the Internet and the controlled apparatus 20A can obtain from the router 50 the global IP address and the port number as the NAT setting response <D-8R>, significant values are set as the global IP address and port number and the OTP (onetime password). Further, when the access route information is a value indicating that the access route is the Internet but the controlled apparatus 20A cannot obtain the global IP address and port number as the NAT setting response <D-8R>, the global IP address and port number and the OTP (onetime password) are also set to NULL values.

Upon reception of the direct access instruction response <DM-3R> including the access route information indicating that the access route is the same LAN (Step S3601 of FIG. 36), the SOAP server 42 in the direct access management server 40 checks the access route information included in the direct access instruction response <DM-3R> (Step S3602 of FIG. 36). When the access route information indicates the same LAN, the SOAP server 42 in the direct access management server 40 transmits to the service server 30 the direct access instruction response <DM-2R> including the transaction ID stored in the storage portion 41 and the access route information included in the direct access instruction response <DM-3R> (Step S3603 of FIG. 36).

Upon reception of the direct access instruction response <DM-2R> including the transaction ID and the access route information (Step S3207 of FIG. 32), the service server 30 stores in the storage portion 31 the transaction ID included in the direct access instruction response <DM-2R> and a status indicating "incompletion" through association with each other (Step S3208 of FIG. 32). After that, the service server 30 transmits to the controller 10 the direct access instruction response <DM-1R> including the transaction ID (Step S3209 of FIG. 32).

Upon reception of the direct access instruction response <DM-1R> including the transaction ID from the service server 30 (Step S3005 of FIG. 30), the controller 10 stores the transaction ID in the storage portion 11, and causes the display portion to display to the user a message indicating that the instruction of copying the content data is completed (Step S3006 of FIG. 30).

On the other hand, after transmitting to the service server 30 the direct access instruction response <DM-2R> including the transaction ID and the access route information indicating that the access route is the same LAN, the SOAP server 42 in the direct access management server 40 transmits to the XMPP server 43 the XMPP logout request <C-5> including the XMPP session ID that can be used when the service server 30 directly accesses the controlled apparatus 20A. After receiving a response <C-5R> to the XMPP logout request <C-5>, the SOAP server 42 deletes the XMPP session ID stored in the storage portion 41 (Step S3604 of FIG. 36). Thus, the XMPP logout of the service server 30 is completed.

On the other hand, after transmitting the direct access instruction response <DM-3R> including the access route information to the SOAP server 42 in the direct access management server 40, the controlled apparatus 20A transmits, to the controlled apparatus 20B via the LAN, a URI obtainment request <DM-4> including a service URN (copy of content data) of the content of the direct access instruction included in the direct access instruction request <DM-3> (Step S3805 of FIG. 38), and receives a local URI of the controlled apparatus 20B as an URI obtainment response <DM-4R> (Step S3806 of FIG. 38). Subsequently, the controlled apparatus 20A transmits to the controlled apparatus 20B a direct access request <DM-5> including a content pass in the content of the direct access instruction included in the direct access instruction request <DM-3> based on the local URI received as the URI obtainment response <DM-4R> (Step S3807 of FIG. 38). The content pass refers to character string information indicating a position where the content data is placed.

Upon reception of the direct access request <DM-5> including the content pass from the controlled apparatus 20A (Step S3901 of FIG. 38), the controlled apparatus 20B checks whether content data corresponding to the content pass included in the direct access request <DM-5> is present (Step S3902 of FIG. 38). When the content data is not present, the controlled apparatus 20B transmits to the controlled apparatus 20A an error code to this effect as a direct access response <DM-5R> (Step S3903 of FIG. 38). Upon reception of the error code as the direct access response <DM-5R> from the controlled apparatus 20B (Step S3808 of FIG. 38), the controlled apparatus 20A transmits to the SOAP server 42 in the direct access management server 40 a status indicating the error and a status notification <DM-6> including the transaction ID and the apparatus authentication continuation ID stored in the storage portion 21 (Step S3810 of FIG. 38).

On the other hand, when the check result in Step S3902 of FIG. 38 shows that the content data corresponding to the content pass is present, the controlled apparatus 20B transmits the content data as the direct access response <DM-5R> to the controlled apparatus 20A via the LAN in order to copy the content to the controlled apparatus 20A (Step S3904 of FIG. 38). The controlled apparatus 20A receives the content data from the controlled apparatus 20B via the LAN as the direct access response <DM-5R> (Step S3809 of FIG. 38). As a result, the content data is copied from the controlled apparatus 20B to the controlled apparatus 20A. After the copy of the content data is completed, the controlled apparatus 20A transmits to the SOAP server 42 in the direct access management server 40 a status notification <DM-6> including a status indicating "completion (success)", the transaction ID, and the apparatus authentication continuation ID stored in the storage portion 21 (Step S3810 of FIG. 38).

Upon reception of the status notification <DM-6> from the controlled apparatus 20A (Step S3701 of FIG. 37), the SOAP server 42 in the direct access management server 40 checks the apparatus authentication continuation ID included in the status notification <DM-6> and an expiration date of the apparatus authentication continuation ID (Step S3702 of FIG. 37). In a case where the check result shows that the apparatus authentication continuation ID included in the status notification <DM-6> does not coincide with the ID stored in the storage portion 41 in the direct access management server 40, or the apparatus authentication continuation ID has been expired, the controlled apparatus 20A is not normally registered in the direct access management server 40, or the controlled apparatus 20A has been registered but the apparatus authentication continuation ID has been expired. Therefore, an error code indicating that the apparatus authentication is required is transmitted to the controlled apparatus 20A as the status notification response <DM-6R> (Step S3703 of FIG. 37).

Upon reception of the error code indicating that the apparatus authentication is required as the status notification response <DM-6R> from the SOAP server 42 in the direct access management server 40 (Step S3811 of FIG. 38), the controlled apparatus 20A transmits to the SOAP server 42 in the direct access management server 40 the apparatus authentication request <R-0> including information on an authentication method preset thereto and apparatus authentication information and performs again the apparatus authentication thereof (Steps S3812, S3813, and S3814 of FIG. 38). After the completion of the apparatus authentication thereof, the processing returns to Step 3810, and the controlled apparatus 20A transmits to the SOAP server 42 in the direct access management server 40 the status notification <DM-6> including the status indicating "completion (success)" and the transaction ID and the apparatus authentication continuation ID stored in the storage portion 21.

On the other hand, when the check result in Step S3702 of FIG. 37 shows that the apparatus authentication continuation ID included in the status notification <DM-6> is stored in the storage portion 41 and the apparatus authentication continuation ID is not expired, the SOAP server 42 in the direct access management server 40 checks whether the transaction ID included in the status notification <DM-6> coincides with the transaction ID stored in the storage portion 41 (Step S3704 of FIG. 37). When the transaction IDs do not coincide, the SOAP server 42 in the direct access management server 40 transmits to the controlled apparatus 20A an error code indicating that the transaction ID is invalid as a status notification response <DM-6R> (Step S3705 of FIG. 37).

On the other hand, when the SOAP server 42 in the direct access management server 40 judges that the transaction ID included in the status notification <DM-6> coincides with the transaction ID stored in the storage portion 41 in Step S3704 of FIG. 37, the SOAP server 42 in the direct access management server 40 retrieves from the storage portion 41 a controlled apparatus management ID stored through association with the apparatus authentication continuation ID included in the status notification <DM-6> (Step S3706 of FIG. 37), and judges whether the controlled apparatus management ID coincides with the controlled apparatus management ID stored in the storage portion 41 through association with the transaction ID included in the status notification <DM-6> (Step S3707 of FIG. 37). When the controlled apparatus management IDs do not coincide, the SOAP server 42 in the direct access management server 40 transmits to the controlled apparatus 20A an error code indicating that the transaction ID is invalid as the status notification response <DM-6R> (Step S3705 of FIG. 37).

When the SOAP server 42 in the direct access management server 40 judges that the controlled apparatus management IDs coincide in Step S3707 of FIG. 37, the SOAP server 42 recognizes that the transaction ID included in the status notification <DM-6> is valid, and retrieves from the storage portion 41 the controller/service management ID and service ID corresponding to the transaction ID (Step S3708 of FIG. 37). Next, the SOAP server 42 in the direct access management server 40 checks the content of the status included in the status notification <DM-6> (Step S3709 of FIG. 37). When the content indicates "completion (success)" or "completion (failure)", the corresponding transaction ID is deleted from the storage portion 41 (Step S3710 of FIG. 37). Otherwise, or after the transaction ID is deleted in Step S3710, the SOAP server 42 in the direct access management server 40 specifies a URI of the corresponding service server 30 based on the service ID retrieved in Step S3708 (Step S3711 of FIG. 37). Here, because the service ID and the URI are associated for each service server and stored in advance in the storage portion 41 in the direct access management server 40, the URI of the corresponding service server 30 can be specified based on the service ID retrieved in Step S3708.

After that, the SOAP server 42 in the direct access management server 40 transmits to the service server 30 a status notification <DM-7> including the transaction ID and the content of the status in the status notification <DM-6> obtained from the controlled apparatus 20A, based on the URI specified in Step S3711 (Step S3712 of FIG. 37).

Upon reception of the status notification <DM-7> from the SOAP server 42 in the direct access management server 40 (Step S3301 of FIG. 33), the service server 30 checks whether the transaction ID included in the status notification <DM-7> coincides with the transaction ID stored in the storage portion 31 (Step S3302 of FIG. 33). When the transaction IDs do not coincide, the service server 30 transmits to the SOAP server 42 in the direct access management server 40 an error code indicating that the transaction ID is invalid as a status notification response <DM-7R> (Step S3303 of FIG. 33)

Upon reception of the error code indicating that the transaction ID is invalid from the service server 30 as the status notification response <DM-7R> (Step S3713 of FIG. 37), the SOAP server 42 in the direct access management server 40 transmits the error code as the status notification response <DM-6R> to the controlled apparatus 20A (Step S3714 of FIG. 37).

On the other hand, when the service server 30 judges that the transaction ID included in the status notification <DM-7> coincides with the transaction ID stored in the storage portion 31 in Step S3302 of FIG. 33, the service server 30 updates the content of the status corresponding to the transaction ID stored in the storage portion 31 to the content of the status included in the status notification <DM-7> (Step S3304 of FIG. 33). Specifically, in this example, the content included in the status notification <DM-7> is "completion (success)", and therefore the content of the status corresponding to the transaction ID stored in the storage portion 31 becomes also "completion (success)". After that, the service server 30 transmits to the SOAP server 42 in the direct access management server 40 a code indicating that the content of the status is updated as the status notification response <DM-7R> (Step S3305 of FIG. 33).

Upon reception of the code indicating that the content of the status is updated as the status notification response <DM-7R> from the service server 30 (Step S3715 of FIG. 37), the SOAP server 42 in the direct access management server 40 transmits to the controlled apparatus 20A the code indicating the status update as the status notification response <DM-6R> (Step S3716 of FIG. 37). Upon reception of the code indicating "completion (success)" as the status notification response <DM-6R> from the SOAP server 42 in the direct access management server 40 (Step S3815 of FIG. 38), the controlled apparatus 20A deletes the transaction ID stored in the storage portion 21 (Step S3816 of FIG. 38). Thus, one transaction relating to the copy processing of the content data is completed.

Incidentally, the controller 10 can check the status of the content of the direct access instruction with respect to the service server 30 at an arbitrary timing.

Specifically, upon reception of the status check instruction from the user (Step S3101 of FIG. 31), the controller 10 transmits to the service server 30 a status check <DM-8> including the user identification information preset thereto and the transaction ID stored in the storage portion 11 (Step S3102 of FIG. 31). Upon reception of the status check <DM-8> from the controller 10 (Step S3401 of FIG. 34), the service server 30 judges whether the controller/service management ID corresponding to the user identification information included in the status check <DM-8> is stored in the storage portion 31 (Step S3402 of FIG. 34). When the controller/service management ID is not stored in the storage portion 31, the service server 30 transmits to the controller 10 an error code indicating that the registration of the controlled apparatus is required as a status check response <DM-8R> (Step S3403 of FIG. 34). Upon reception of the error code indicating that the registration of the controlled apparatus is required as the status check response <DM-8R> (Step S3103 of FIG. 31), the controller 10 causes the display portion to display a message corresponding to the error code to the user (Step 3104 of FIG. 31).

On the other hand, the judgment result in Step S3402 of FIG. 34 shows that the corresponding controller/service management ID is stored in the storage portion 31, the service server 30 judges whether the transaction ID stored in the status check <DM-8> coincides with the transaction ID stored in the storage portion 31 (Step S3404 of FIG. 34). When the transaction IDs do not coincide, the service server 30 transmits to the controller 10 an error code indicating that the transaction ID is invalid as the status check response <DM-8R> (Step S3405 of FIG. 34). Upon reception of the error code indicating that the transaction ID is invalid as the status check response <DM-8R> from the service server 30 (Step S3103 of FIG. 31), the controller 10 causes the display portion to display an error massage corresponding to the error code to the user (Step S3104 of FIG. 31).

When the judgment result in Step S3404 of FIG. 34 shows that the transaction ID stored in the status check <DM-8> coincides with the transaction ID stored in the storage portion 31, the service server 30 obtains the content of the status stored in the storage portion 31 through association with the transaction ID (Step S3406 of FIG. 34), and transmits to the controller 10 the content of the status as the status check response <DM-8R> (Step S3407 of FIG. 34). Upon reception of the content of the status as the status check response <DM-8R> from the service server 30 (Step S3105 of FIG. 31), the controller 10 causes the display portion to display the content of the status to the user (Step S3106 of FIG. 31). The content of the status in this case is "completion (success)", "completion (failure)", "incompletion", "percentage of completion", or the like.

The sequence diagram of FIG. 25 shows that an example in which the controller 10 transmits the status check <DM-8> to the service server 30 before and after a time point when the status notification <DM-7> indicating "completion (success)" is transmitted to the service server 30 and stored in the storage portion 31. In this case, when the status check <DM-8> is transmitted from the controller 10 to the service server 30 before the status notification <DM-7> indicating "completion (success)" is transmitted to the service server 30, the status check response <DM-8R> indicating "incompletion" is transmitted to the controller 10 from the service server 30, because the status stored in the storage portion 31 in the service server 30 is "incompletion". On the other hand, when the status check <DM-8> is transmitted from the controller 10 to the service server 30 after the status notification <DM-7> indicating the completion of the copy processing is transmitted to the service server 30, the status check response <DM-8R> indicating "completion (success)" is transmitted to the controller 10 from the service server 30, because the status stored in the storage portion 31 in the service server 30 is updated to "completion (success)".

[5. Copy Processing of Content Data (2)]

Next, a description will be given on an operation when content data recorded on the controlled apparatus 20B is copied to the controlled apparatus 20A based on an instruction from the controller 10 in a case where the controlled apparatuses 20A and 20B are not connected via the same LAN but connected via the Internet.

Figure 39:
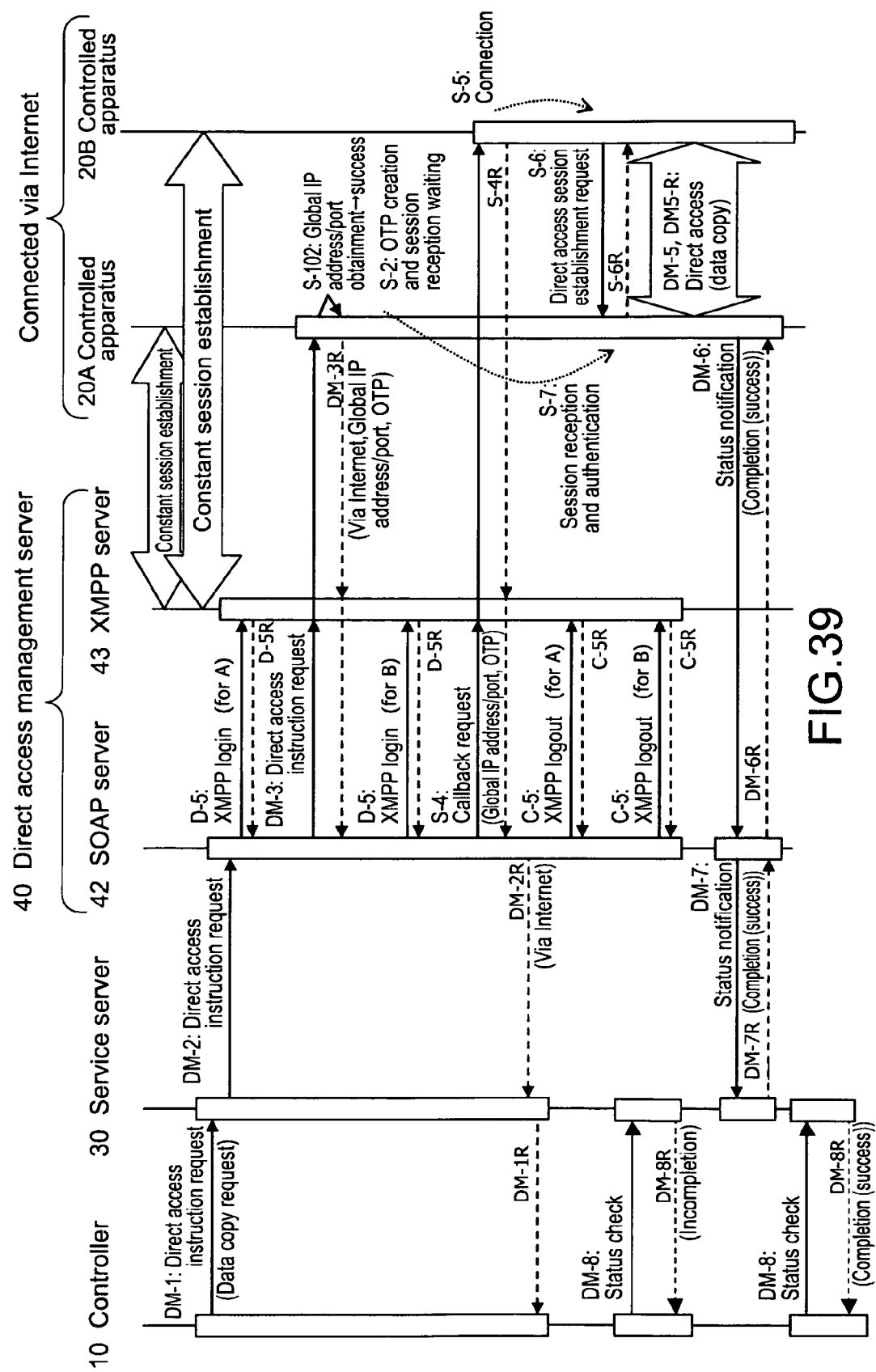
FIG. 39 is a sequence diagram showing an entire system relating to a copy processing of content data (2)
Figure 40:
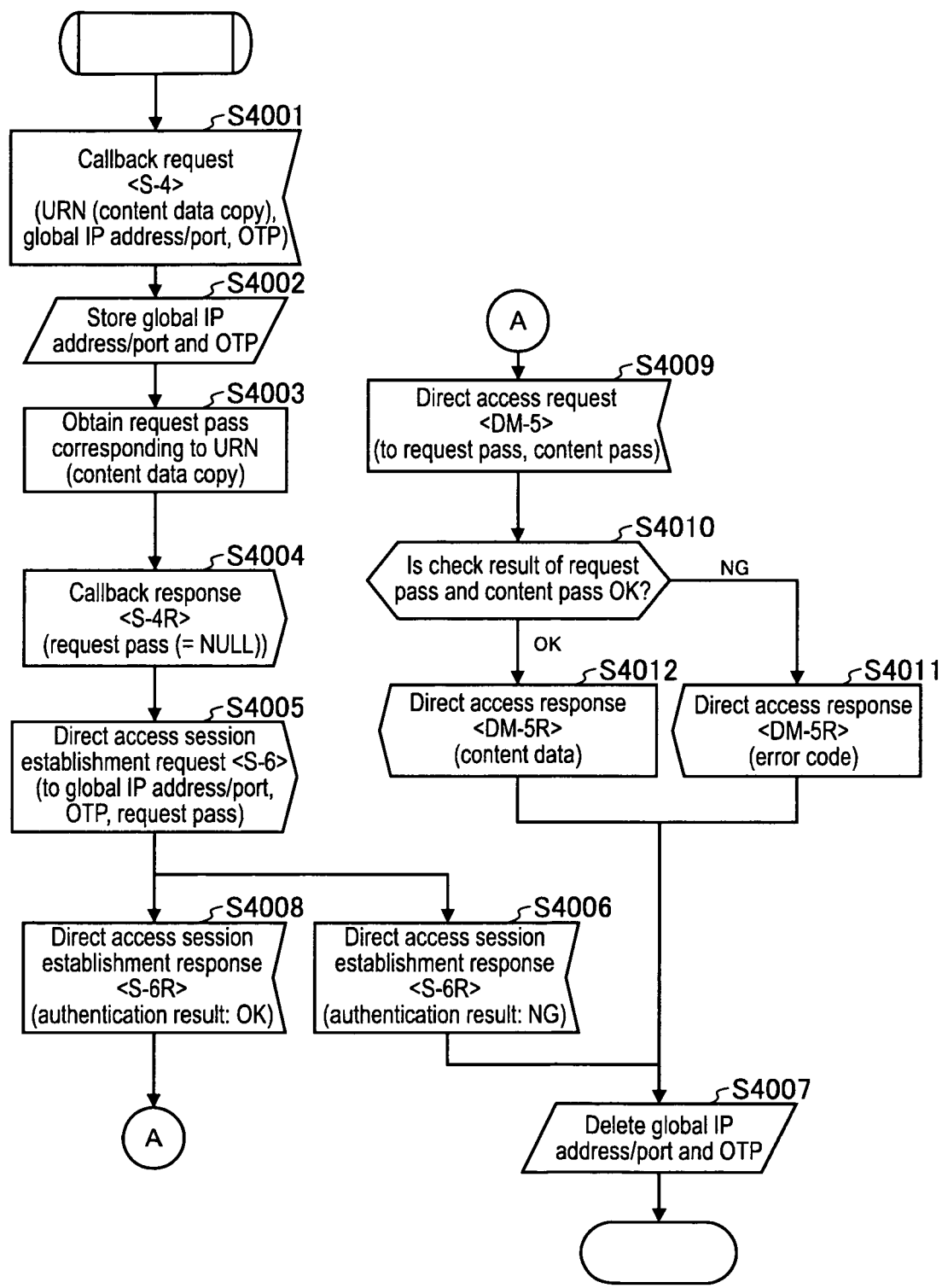
FIG. 40 is a flowchart showing an operation of the controlled apparatus relating to the copy processing of content data (2)
Figure 41:
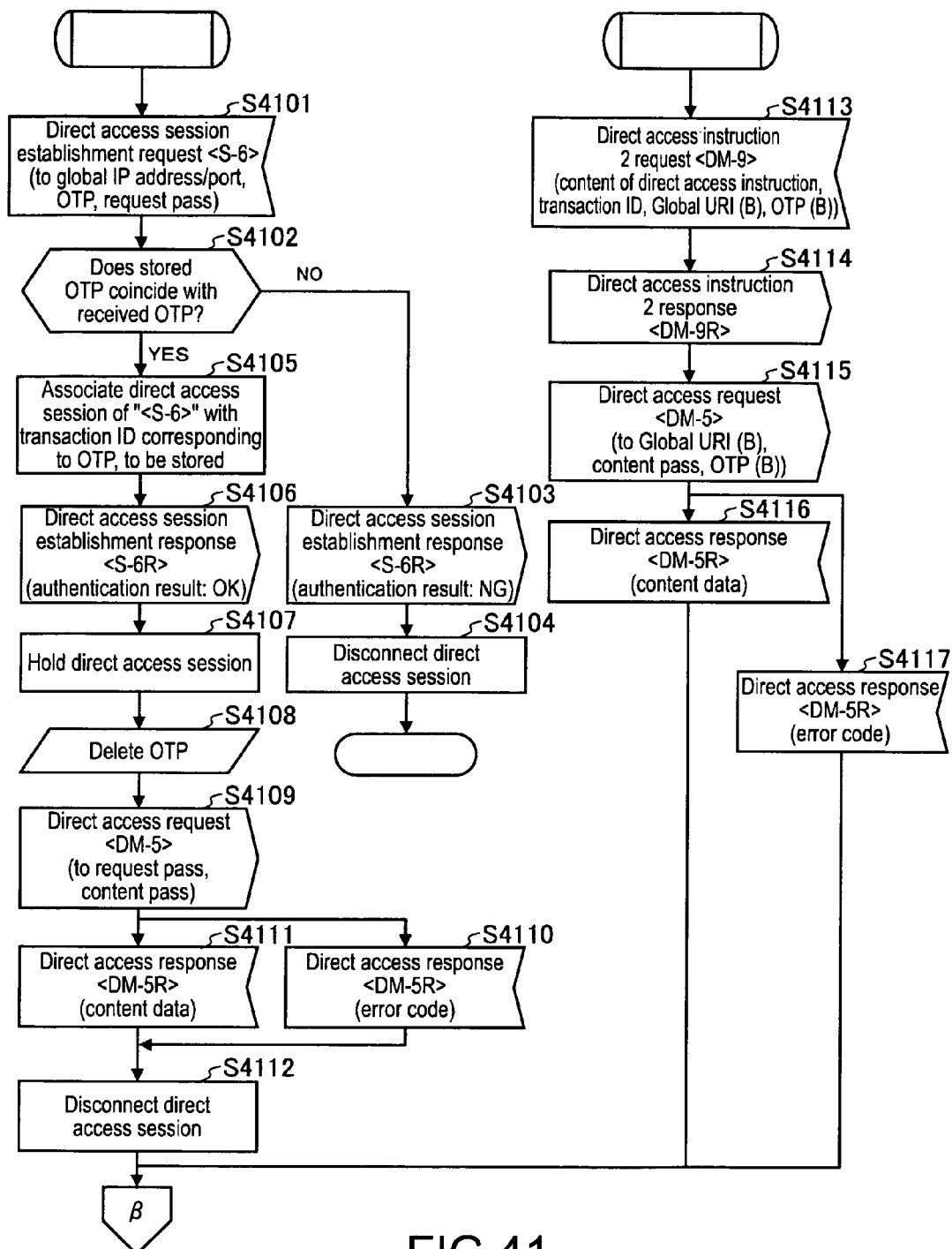
FIG. 41 is a flowchart showing an operation of the controlled apparatus relating to the copy processing of content data (2)
Figure 42:
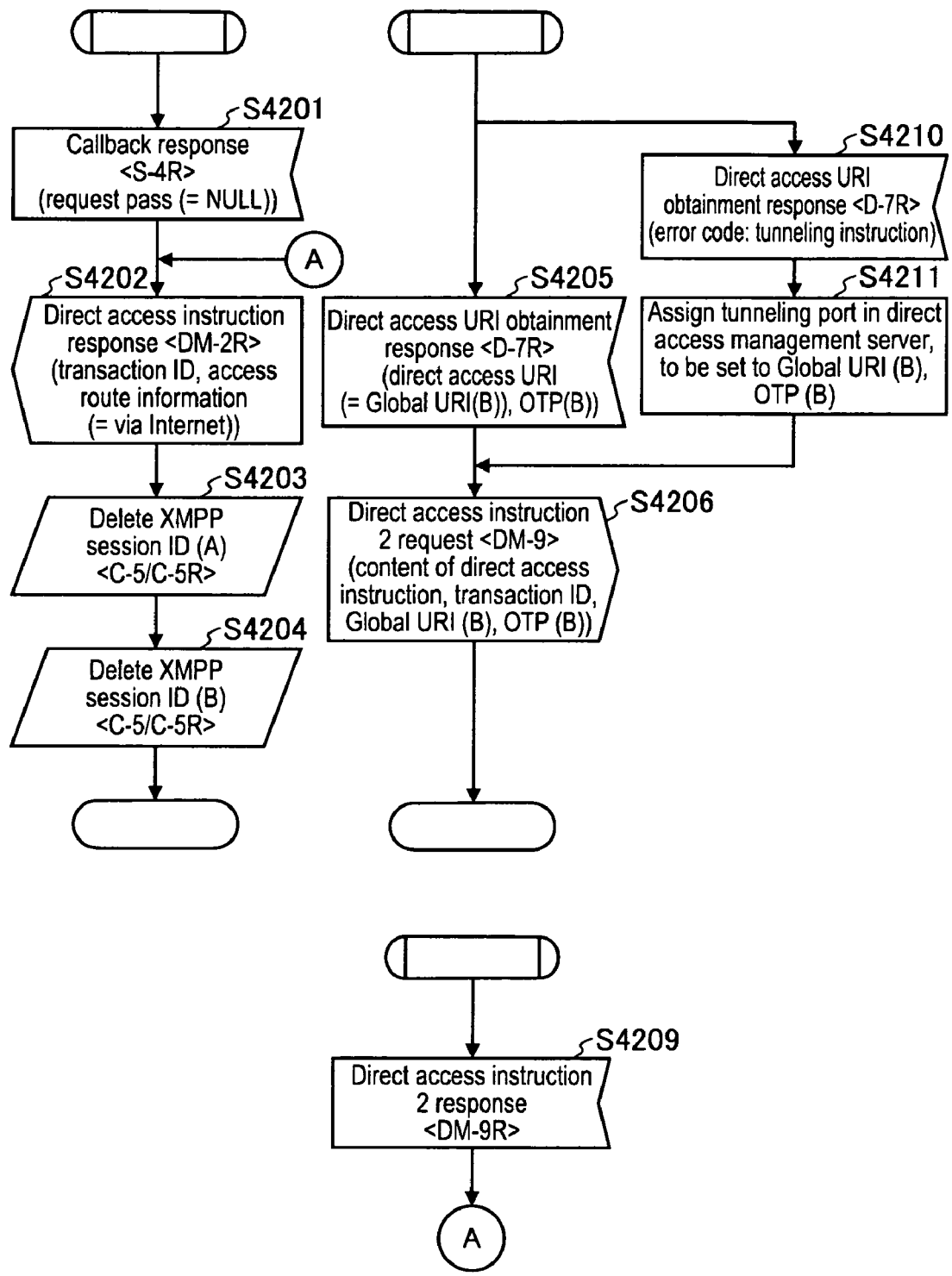
FIG. 42 is a flowchart showing an operation of the direct access management server relating to the copy processing of content data (2)

FIG. 39 is a sequence diagram showing an entire system relating to a copy processing of content data (2). FIGS. 40 and 41 are flowcharts each showing an operation of the controlled apparatus 20 relating to the copy processing of content data (2). FIG. 42 is a flowchart showing an operation of the direct access management server 40 relating to the copy processing of content data (2).

The operation from when the direct access instruction request <DM-1> is transmitted from the controller 10 to the service server 30 until the direct access instruction request <DM-3> is transmitted from the SOAP server 42 in the direct access management server 40 to the controlled apparatus 20A is the same as that in the above "4. Copy processing of content data (1)" section.

Upon reception of the direct access instruction request <DM-3> in Step S3801 of FIG. 38, the controlled apparatus 20A stores the transaction ID included therein in the storage portion 21 (Step S3802 of FIG. 38). Subsequently, in Step S3803 of FIG. 38, the controlled apparatus 20A judges whether the Full JID(D) of the controlled apparatus 20B included in the direct access instruction request <DM-3> coincides with the Full JID(D) of the controlled apparatus 20B stored in the storage portion 21 as the Full JID(D) of the other controlled apparatus on the same LAN. This operation is the same as that in the above "4. Copy processing of content data (1)" section.

In the case where the controlled apparatuses 20A and 20B are connected via the same LAN, the two Full JID(D)s thereof coincide. In the case where the controlled apparatuses 20A and 20B are not connected via the same LAN, that is, connected via the Internet, the two Full JID(D)s do not coincide. In this example, because the controlled apparatuses 20A and 20B are not connected via the same LAN, it is judged that the two Full JID(D)s do not coincide. In this case, the controlled apparatus 20A transmits to the router 50 the NAT setting request <D-8> of the port for the direct access, including the port number of the local port for the direct access and the local IP address previously assigned to each controlled apparatus 20, and make a request to the router 50 for mapping of the port number and the global IP address that can be accessed via the Internet to the local IP address and the port number (Step S3817 of FIG. 38).

Upon reception of the global IP address and the port number respectively corresponding to the local IP address and the port number of the controlled apparatus 20A from the router 50 as the NAT setting response <D-8R> to the NAT setting request <D-8> of the port for the direct access (Step S3818 of FIG. 38), the controlled apparatus 20A creates an OTP and stores the OTP through association with the transaction ID stored in the storage portion 21 (Step S3819 of FIG. 38). Subsequently, the controlled apparatus 20A transmits the direct access instruction response <DM-3R> including the OTP, the global IP address and the port number obtained from the router 50, and the access route information indicating that the access is performed between the controlled apparatuses 20A and 20B via the Internet, to the SOAP server 42 in the direct access management server 40 through the constant connection session established between the XMPP server 43 and the controlled apparatus 20A (Step S3820 of FIG. 38).

Upon reception of an error code indicating that the NAT setting is failed from the router 50 as the NAT setting response <D-8R> to the NAT setting request <D-8> of the port for the direct access (Step S3821 of FIG. 38), the controlled apparatus 20A transmits the direct access instruction response <DM-3R> in which the OTP, the global IP address, the port number, and the access route information indicating that the access is performed between the controlled apparatuses 20A and 20B via the Internet are each set to a NULL value, to the SOAP server 42 in the direct access management server 40 through the constant connection session established between the XMPP server 43 and the controlled apparatus 20A (Step S3822 of FIG. 38).

It should be noted that a description will be given on a case where the controlled apparatus 20A can obtain the global IP address and the port number from the router 50, and an operation in a case where the global IP address and the port number cannot be obtained will be described later.

Upon reception of the direct access instruction response <DM-3R> from the controlled apparatus 20A (Step S3601 of FIG. 36), the SOAP server 42 in the direct access management server 40 checks the access route information included in the direct access instruction response <DM-3R> (Step S3602 of FIG. 36). When the SOAP server 42 in the direct access management server 40 judges that the access route information indicates the Internet, the SOAP server 42 creates an XMPP session ID that can be used when the service server 30 directly accesses the controlled apparatus 20B, and stores the XMPP session ID in the storage portion 41 through association with the service ID and the controller/service management ID included in the direct access instruction request <DM-2> and the controlled apparatus management ID corresponding to the number (B) of the controlled apparatus 20B (Step S3605 of FIG. 36).

Next, the SOAP server 42 in the direct access management server 40 checks whether the global IP address, the port number, and the OTP included in the direct access instruction response <DM-3R> each are the NULL value (Step S3606 of FIG. 36). Herein, the case where the controlled apparatus 20A can obtain the global IP address and the port number from the router 50 is supposed. Therefore, the judgment result shows that the global IP address, the port number, and the OTP are not NULL values.

According to the judgment result, the SOAP server 42 in the direct access management server 40 transmits a callback request <S-4> including the global IP address, the port number, and the OTP included in the direct access instruction response <DM-3R> from the controlled apparatus 20A and the service URN (copy of the content data) to the controlled apparatus 20B through the constant connection session established between the XMPP server 43 and the controlled apparatus 20B (Step S3607 of FIG. 36).

Figure 52:
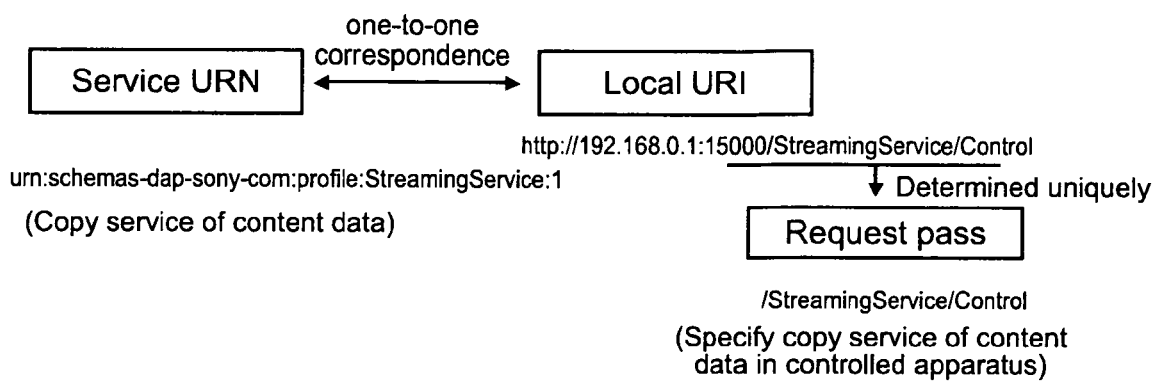
FIG. 52 is a diagram showing a specific example of a relationship among a service URN, a local URI, and a request pass.

Upon reception of the callback request <S-4> from the SOAP server 42 in the direct access management server 40 (Step S4001 of FIG. 40), the controlled apparatus 20B stores in the storage portion 21 the global IP address, the port number, and the OTP included in the callback request <S-4> (Step S4002 of FIG. 40). Next, the controlled apparatus 20B obtains a request pass corresponding to the service URN (copy of the content data) included in the callback request <S-4> (Step S4003 of FIG. 40). Herein, as shown in FIG. 52, the request pass corresponding to the service URN refers to, for example, information constituting a part of the local URI, from which the controlled apparatus 20 receives a request. Based on the request pass, the kind of the service is specified. In the storage portion 21 of each of the controlled apparatuses 20A and 20B, the service URN and the request pass are associated and stored.

After that, the controlled apparatus 20B transmits a callback response <S-4R> with the request pass as NULL value included therein to the SOAP server 42 in the direct access management server 40 through the constant connection session (Step S4004 of FIG. 40). Upon reception of the callback response <S-4R> including the request pass of NULL value from the controlled apparatus 20B (Step S4201 of FIG. 42), the SOAP server 42 in the direct access management server 40 transmits to the service server 30 the direct access instruction response <DM-2R> including the access route information (=via the Internet) and the transaction ID stored in the storage portion 41 (Step S4202 of FIG. 42).

Upon reception of the direct access instruction response <DM-2R> including the access route information (=via the Internet) and the transaction ID (Step S3207 of FIG. 32), the service server 30 stores in the storage portion 31 the transaction ID included in the direct access instruction response <DM-2R> and a status of "incompletion" through association with each other (Step S3208 of FIG. 32). After that, the service server 30 transmits to the controller 10 the direct access instruction response <DM-1R> including the transaction ID (Step S3209 of FIG. 32). Upon reception of the direct access instruction response <DM-1R> including the transaction ID from the service server 30 (Step S3005 of FIG. 30), the controller 10 stores the transaction ID in the storage portion 11, and causes the display portion to display to the user a massage indicating that the instruction of copying the content data is completed (Step S3006 of FIG. 30).

On the other hand, after transmitting to the service server 30 the direct access instruction response <DM-2R> including the transaction ID and the access route information indicating that the access route is the Internet, the SOAP server 42 in the direct access management server 40 transmits to the XMPP server 43 an XMPP logout request <C-5> including the XMPP session ID that can be used when the service server 30 directly accesses the controlled apparatus 20A, receives a response <C-5R> to this, and then deletes the XMPP session ID from the storage portion 41 (Step S4203 of FIG. 42). Subsequently, the SOAP server 42 in the direct access management server 40 transmits to the XMPP server 43 the XMPP logout request <C-5> including the XMPP session ID that can be used when the service server 30 directly accesses the controlled apparatus 20B, receives the response <C-5R> to this, and then deletes the XMPP session ID from the storage portion 41 (Step S4204 of FIG. 42). Thus, the XMPP logout of the service server 30 is completed.

After transmitting the callback response <S-4R> including the request pass of NULL value to the SOAP server 42 in the direct access management server 40 in Step S4004 of FIG. 40, the controlled apparatus 20B transmits to the controlled apparatus 20A via the Internet a direct access session establishment request <S-6> including the OTP included in the callback request <S-4> and the significant request pass obtained in Step S4003 of FIG. 40, based on the global IP address and the port number included in the callback request <S-4> received in Step S4001 of FIG. 40 (Step S4005 of FIG. 40).

Upon reception of the direct access session establishment request <S-6> from the controlled apparatus 20B via the Internet (Step S4101 of FIG. 41), the controlled apparatus 20A establishes the direct access session with the controlled apparatus 20B, and checks whether the OTP included in the direct access session establishment request <S-6> coincides with the OTP stored in the storage portion 21 (Step S4102 of FIG. 41). Herein, in the storage portion 21 of the controlled apparatus 20A, the OTP created in Step S3819 of FIG. 38 when the controlled apparatus 20A receives the NAT setting request <D-8R> of the port for the direct access including the global IP address and the port number from the router 50. Therefore, when the OTP included in the direct access session establishment request <S-6> does not coincide with any OTP stored in the storage portion 21, the controlled apparatus 20A judges that the authentication result is NG, and transmits an error code to this effect to the controlled apparatus 20B via the Internet as a direct access session establishment response <S-6R> (Step S4103 of FIG. 41). Then, the controlled apparatus 20A disconnects the direct access session with the controlled apparatus 20B (Step S4104 of FIG. 41).

Upon reception of the error code indicating that the authentication result is NG from the controlled apparatus 20A as the direct access session establishment response <S-6R> (Step S4006 of FIG. 40), the controlled apparatus 20B deletes the OTP and the global IP address and port number of the controlled apparatus 20A which are obtained by the callback request <S-4> and stored in the storage portion 21, and terminates the processing (Step S4007 of FIG. 40).

On the other hand, when the controlled apparatus 20A judges that the OTP included in the direct access session establishment request <S-6> coincides with the OTP stored in the storage portion 21 in Step S4102 of FIG. 41, the controlled apparatus 20A associates the direct access session established with the controlled apparatus 20B, with the transaction ID corresponding to the OTP, and stores it in the storage portion 21 (Step S4105 of FIG. 41). Subsequently, the controlled apparatus 20A transmits a code indicating that the authentication result is OK to the controlled apparatus 20B via the Internet as the direct access session establishment response <S-6R> (Step S4106 of FIG. 41).

Upon reception of the code indicating that the authentication result is OK from the controlled apparatus 20A as the direct access session establishment response <S-6R> (Step S4008 of FIG. 40), the controlled apparatus 20B stands by for reception of the direct access request <DM-5> from the controlled apparatus 20A.

On the other hand, after transmitting the code indicating that the authentication result is OK to the controlled apparatus 20B as the direct access session establishment response <S-6R>, the controlled apparatus 20A holds the direct access session (Step S4107 of FIG. 41), and deletes from the storage portion 21 the OTP that coincides with the OTP included in the direct access session establishment request <S-6> (Step S4108 of FIG. 41). After that, the controlled apparatus 20A transmits the direct access request <DM-5> including the request pass included in the direct access session establishment request <S-6> received from the controlled apparatus 20B and the content pass of the content of the direct access instruction, which is included in the direct access instruction request <DM-3> from the service server 30, to the controlled apparatus 20B through the direct access session (Step S4109 of FIG. 41).

Upon reception of the direct access request <DM-5> from the controlled apparatus 20A through the direct access session (Step S4009 of FIG. 40), the controlled apparatus 20B checks whether the request pass included in the direct access request <DM-5> coincides with the request pass stored in the storage portion 21, and whether the content data corresponding to the content pass included in the direct access request <DM-5> is present (Step S4010 of FIG. 40). When the request passes do not coincide, or when the corresponding content data is not present, the controlled apparatus 20B transmits an error code to this effect as the direct access response <DM-5R> to the controlled apparatus 20A through the direct access session (Step S4011 of FIG. 40). Upon reception of the error code as the direct access response <DM-5R> from the controlled apparatus 20B (Step S4110 of FIG. 41), the controlled apparatus 20A disconnects the direct access session established with the controlled apparatus 20B (Step S4112 of FIG. 41).

On the other hand, when the check result in Step S4010 of FIG. 40 is OK, that is, the request pass included in the direct access request <DM-5> coincides with the request pass stored in the storage portion 21, and the content data corresponding to the content pass included in the direct access request <DM-5> is present, the controlled apparatus 20B transmits the content data as the direct access response <DM-5R> to the controlled apparatus 20A through the direct access session (Step S4012 of FIG. 40). The controlled apparatus 20A receives the content data as the direct access response <DM-5R> from the controlled apparatus 20B through the direct access session (Step S4111 of FIG. 41). When the reception of the content data is completed, the controlled apparatus 20A disconnects the direct access session established with the controlled apparatus 20B (Step S4112 of FIG. 41).

After the transmission of the content data as the direct access response <DM-5R> to the controlled apparatus 20A is completed, the controlled apparatus 20B deletes the OTP and the global IP address and port number of the controlled apparatus 20A which are obtained by the callback request <S-4> and stored in the storage portion 21 (Step S4007 of FIG. 40).

Upon reception of the content data as the direct access response <DM-5R> from the controlled apparatus 20B, the controlled apparatus 20A disconnects the direct access session established with the controlled apparatus 20B, and then transmits to the SOAP server 42 in the direct access management server 40 the status notification <DM-6> including the status of "completion (success)" and the transaction ID and apparatus authentication ID stored in the storage portion 21 (Step S3810 of FIG. 38). On the other hand, upon reception of the error code as the content data as the direct access response <DM-5R> from the controlled apparatus 20B, the controlled apparatus 20A transmits to the SOAP server 42 in the direct access management server 40 the status notification <DM-6> including the status of "completion (failure)" and the transaction ID and the apparatus authentication ID stored in the storage portion 21 (Step S3810 of FIG. 38). A subsequent operation is the same as that in the above "4. Copy processing of content data (1)" section. An operation in a case where the controller 10 checks the status of the content of the direct access instruction with respect to the service server 30 at an arbitrary timing is also the same as that in the above "4. Copy processing of content data (1)" section.

[6. Copy Processing of Content Data (3)]

Described above in "5. Copy processing of content data (2)" section is the sequence in the case where the controlled apparatus 20A can obtain the global IP address and the port number from the router 50. Next, a description will be given on an operation of a copy processing in a case where the controlled apparatus 20A fails to obtain the global IP address and the port number from the router 50, but the controlled apparatus 20B succeeds in obtaining them.

Figure 43:
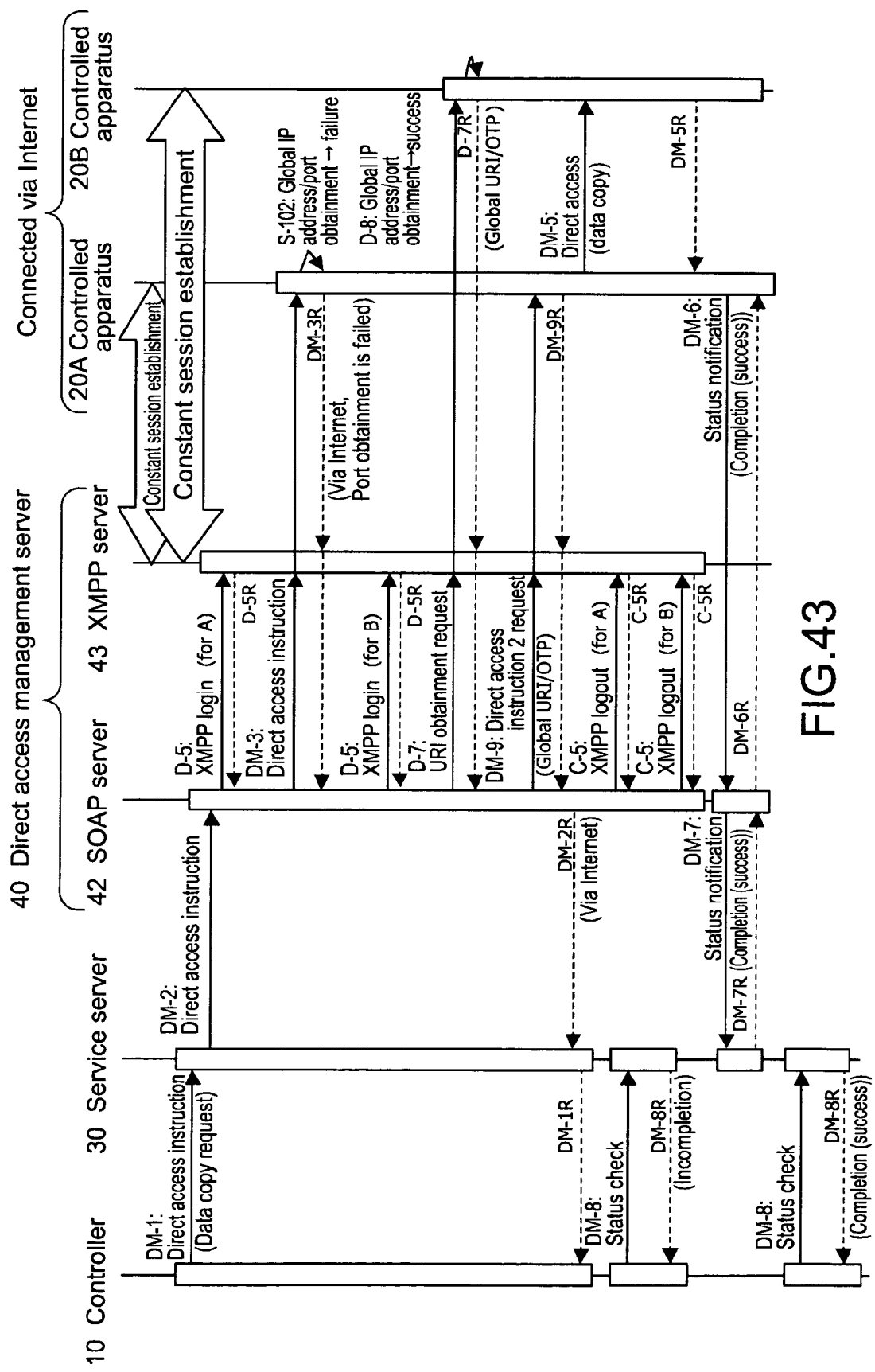
FIG. 43 is a sequence diagram showing an entire system relating to a copy processing of content data (3)
Figure 44:
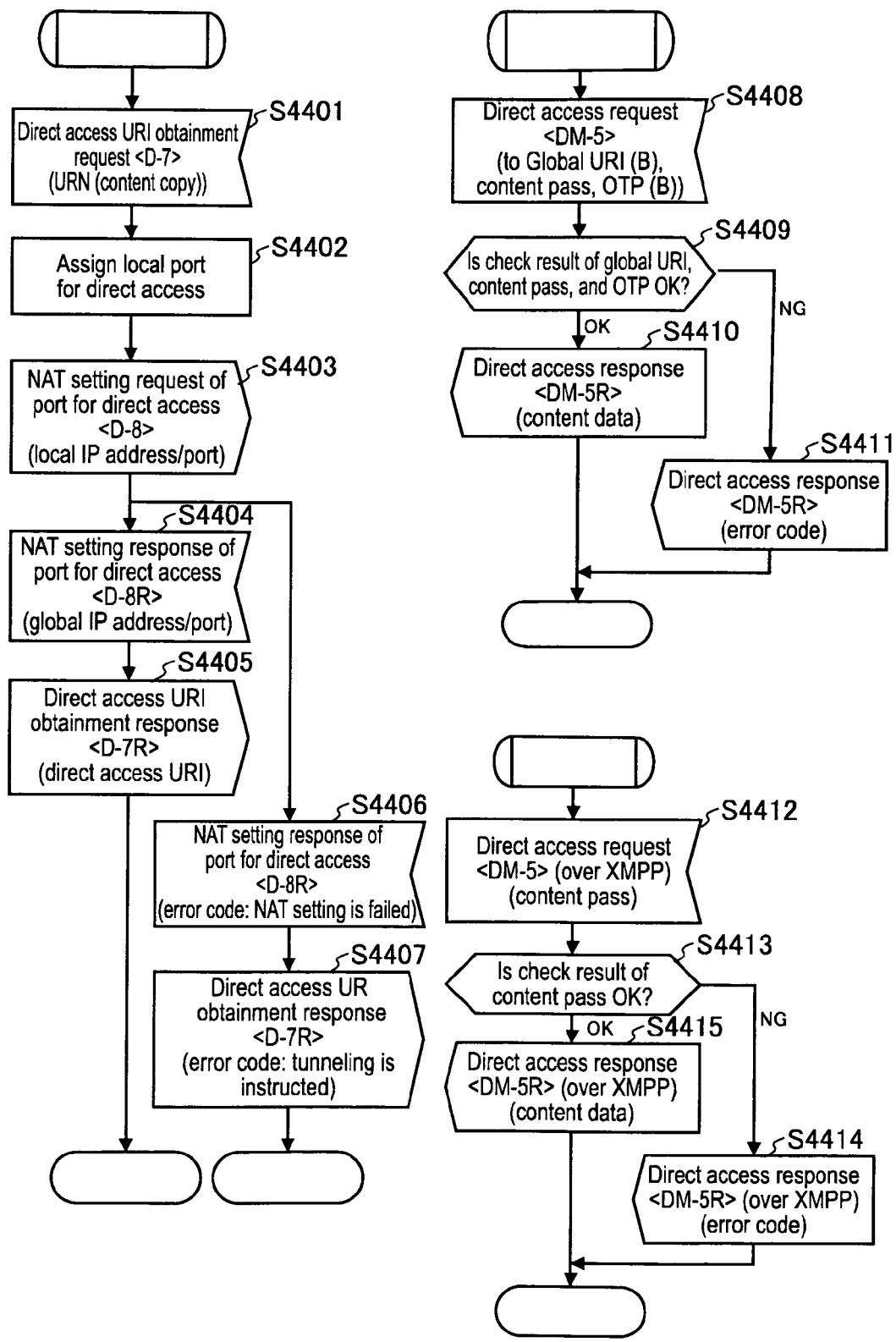
FIG. 44 is a flowchart showing an operation of the controlled apparatus relating to the copy processing of content data (3)

FIG. 43 is a sequence diagram showing an entire system relating to a copy processing of content data (3). FIG. 44 is a flowchart showing an operation of the controlled apparatus 20 relating to the copy processing of content data (3).

The operation from when the direct access instruction request <DM-1> is transmitted from the controller 10 to the service server 30 until the direct access instruction request <DM-3> is transmitted from the SOAP server 42 in the direct access management server 40 to the controlled apparatus 20A is the same as that in the above "4. Copy processing of content data (1)" and "5. Copy processing of content data (2)" sections.

The controlled apparatuses 20A and 20B are not connected via the same LAN. Therefore, in Step S3803 of FIG. 38, the controlled apparatus 20A judges that the Full JID(D) of the controlled apparatus 20B included in the direct access instruction request <DM-3> does not coincide with the Full JID(D) of the controlled apparatus 20B stored in the storage portion 21 as the Full JID(D) of the other controlled apparatus on the same LAN. The controlled apparatus 20A transmits to the router 50 the NAT setting request <D-8> of the port for the direct access (Step S3817 of FIG. 38), and receives the error code indicating that the NAT setting is failed from the router 50 as the NAT setting response <D-8R> (Step S3821 of FIG. 38). Thus, the controlled apparatus 20A transmits the direct access instruction response <DM-3R> including the OTP, the global IP address, and the port number, each of which is set to a NULL value, and the access route information (=via the Internet), to the SOAP server 42 in the direct access management server 40 through the constant connection session established between the XMPP server 43 and the controlled apparatus 20A (Step S3822 of FIG. 38)

Consequently, in Step S3606 of FIG. 36, the SOAP server 42 in the direct access management server 40 detects that the global IP address, the port number, and the OTP included in the direct access instruction response <DM-3R> are NULL values, and judges that the controlled apparatus 20A has failed to obtain the global IP address and the port number from the router 50. After that, the processing shifts to a different processing from that in the above "5. Copy processing of content data (2)" section.

That is, the SOAP server 42 in the direct access management server 40 transmits the direct access URI obtainment request <D-7> including the service URN (copy of content data) to the controlled apparatus 20B through the constant connection session established between the XMPP server 43 and the controlled apparatus 20B (Step S3608 of FIG. 36).

Upon reception of the direct access URI obtainment request <D-7> from the SOAP server 42 in the direct access management server 40 (Step S4401 of FIG. 44), the controlled apparatus 20B assigns a port number of each local port for the direct access (Step S4402 of FIG. 44). Next, the controlled apparatus 20B transmits to the router 50 the NAT setting request <D-8> of the port for the direct access, including a local IP address and the port number of the local port for the direct access that are assigned in advance, requests the router 50 to perform mapping of a global IP address and the port number accessible via the Internet with respect to the local IP address and the port number (Step S4403 of FIG. 44).

Upon reception of the global IP address and the port number that are respectively corresponded to the local IP address and the port number from the router 50 as the NAT setting response <D-8R> to the NAT setting request <D-8> of the port for the direct access (Step S4404 of FIG. 44), the controlled apparatus 20B creates a direct access URI based on the global IP address, the port number, and the OTP, and transmits the direct access URI as the direct access URI obtainment response <D-7R> to the SOAP server 42 in the direct access management server 40 (Step S4405 of FIG. 44).

Upon reception of an error code indicating that the NAT setting is failed from the router 50 as the NAT setting response <D-8R> to the NAT setting request <D-8> of the port for the direct access (Step S4406 of FIG. 44), the controlled apparatus 20B transmits to the SOAP server 42 in the direct access management server 40 the error code indicating an instruction to perform data transmission in a tunneling mode via a port for tunneling that is provided to the direct access management server 40, as the direct access URI obtainment response <D-7R> (Step S4407 of FIG. 44).

It should be noted that a description will be given on a case where the controlled apparatus 20B succeeds in obtaining the global IP address and the port number, and then transmits the direct access URI to the SOAP server 42 in the direct access management server 40 as the direct access URI obtainment response <D-7R>. A description will be given later on a subsequent operation in a case where the controlled apparatus 20B transmits to the SOAP server 42 in the direct access management server 40 the error code of a tunneling instruction as the direct access URI obtainment response <D-7R> after the obtainment of the global IP address and the port number is failed.

Upon reception of the direct access URI as the direct access URI obtainment response <D-7R> from the controlled apparatus 20B (Step S42 of FIG. 4205), the SOAP server 42 in the direct access management server 40 transmits a direct access instruction 2 request <DM-9> including the content of the direct access instruction and the transaction ID included in the direct access instruction request <DM-2> obtained from the service server 30 in Step S3501 of FIG. 35 and the global URI and the OTP extracted from the direct access URI, to the controlled apparatus 20A through the constant connection session established between the controlled apparatus 20A and the XMPP server 43 in the direct access management server 40 (Step S4206 of FIG. 42). It should be noted that the global URI refers to a URI constituted of the global IP address, the port number, and the request pass.

Upon reception of the direct access instruction 2 request <DM-9> from the SOAP server 42 in the direct access management server 40 (Step S4113 of FIG. 41), the controlled apparatus 20A transmits a direct access instruction 2 response <DM-9R> to the SOAP server 42 in the direct access management server 40 (Step S4114 of FIG. 41). Subsequently, the controlled apparatus 20A transmits the direct access request <DM-5> including the OTP and the content pass to the controlled apparatus 20B via the Internet based on the global URI and the content of the direct access instruction included in the direct access instruction 2 request <DM-9> (Step S4115 of FIG. 41). An operation after the controlled apparatus 20B receives the direct access request <DM-5> will be described later.

Upon reception of the direct access instruction 2 response <DM-9R> from the controlled apparatus 20A (Step S4209 of FIG. 42), the SOAP server 42 in the direct access management server 40 transmits to the service server 30 the direct access instruction response <DM-2R> including the transaction ID and the access route information (=via the Internet) stored in the storage portion 41 (Step S4202 of FIG. 42).

Upon reception of the direct access instruction response <DM-2R> including the transaction ID and the access route information (=via the Internet) stored in the storage portion 41 (Step S3207 of FIG. 32), the service server 30 stores in the storage portion 31 the status of "start" and the transaction ID included in the direct access instruction response <DM-2R> through association with each other (Step S3208 of FIG. 32). Then, the service server 30 transmits to the controller 10 the direct access instruction response <DM-1R> including the transaction ID (Step S3209 of FIG. 32). Upon reception of the direct access instruction response <DM-1R> including the transaction ID from the service server 30 (Step S3005 of FIG. 30), the controller 10 stores the transaction ID in the storage portion 11 and causes the display portion to display to the user a message of the completion of the copy instruction of the content data (Step S3006 of FIG. 30).

After transmitting to the service server 30 the direct access instruction response <DM-2R> including the transaction ID and the access route information indicating that the access route is the Internet, the SOAP server 42 in the direct access management server 40 transmits to the XMPP server 43 the XMPP logout request <C-5> including the XMPP session ID that can be used when the service server 30 directly accesses the controlled apparatus 20A, receives the XMPP logout response <C-5R> thereto, and then deletes the XMPP session ID stored in the storage portion 41 (Step S4203 of FIG. 42). Subsequently, the SOAP server 42 in the direct access management server 40 transmits to the XMPP server 43 the XMPP logout request <C-5> including the XMPP session ID that can be used when the service server 30 directly accesses the controlled apparatus 20B, receives the XMPP logout response <C-5R>, and then deletes the XMPP session ID from the storage portion 41 (Step S4204 of FIG. 42). Consequently, the XMPP logout of the service server 30 is completed.

On the other hand, upon reception of the direct access request <DM-5> from the controlled apparatus 20A (Step S4408 of FIG. 44), the controlled apparatus 20B checks the content pass, the global URI, and the OTP of the controlled apparatus 20B included therein (Step S4409 of FIG. 44). On the assumption that a case where the global URI and the OTP included in the direct access request <DM-5> received coincide with the global URI and the OTP stored in the storage portion 21 and content data corresponding to the content pass is present is judged to be OK, when the check result shows OK, the controlled apparatus 20B transmits to the controlled apparatus 20A via the Internet the corresponding content data as the direct access response <DM-5R> based on the global URI, in order to copy the content data to the controlled apparatus 20A (Step S4410 of FIG. 44). On the other hand, the check result in Step S4409 of FIG. 44 shows NG, the controlled apparatus 20B transmits an error code as the direct access response <DM-5R> to the controlled apparatus 20A via the Internet (Step S4411 of FIG. 44).

Upon reception of the content data as the direct access response <DM-5R> from the controlled apparatus 20B via the Internet (Step S4116 of FIG. 41), the controlled apparatus 20A stores (copies) the content data in the storage portion 21, then performs the processing of the status notification <DM-6> in Step S3810 of FIG. 38, and transmits to the SOAP server 42 in the direct access management server 40 the status notification <DM-6> including the apparatus authentication continuation ID and the transaction ID stored in the storage portion 21 (Step S3810 of FIG. 38). A subsequent operation is the same as that of the copy processing described above. On the other hand, upon reception of the error code as the direct access response <DM-5R> from the controlled apparatus 20B via the Internet (Step S4117 of FIG. 41), the controlled apparatus 20A transmits to the SOAP server 42 in the direct access management server 40 the status notification <DM-6> including the apparatus authentication notification ID and the transaction ID stored in the storage portion 21 and the status of "completion (failure)" (Step S3810 of FIG. 38). A subsequent operation is the same as that of the copy processing described above. Further, the operation in a case where the controller 10 checks the status of the content of the direct access instruction with respect to the service server 30 at an arbitrary timing is also the same as that of the copy processing.

[7. Copy Processing of Content Data (4)]

Next, a description will be given on an operation in a case where both the controlled apparatuses 20A and 20B cannot obtain the global IP address and the port number in response to the NAT setting request of the port for the direct access in the sequence in the above "6. Copy processing of content data (3)" section.

Figure 45:
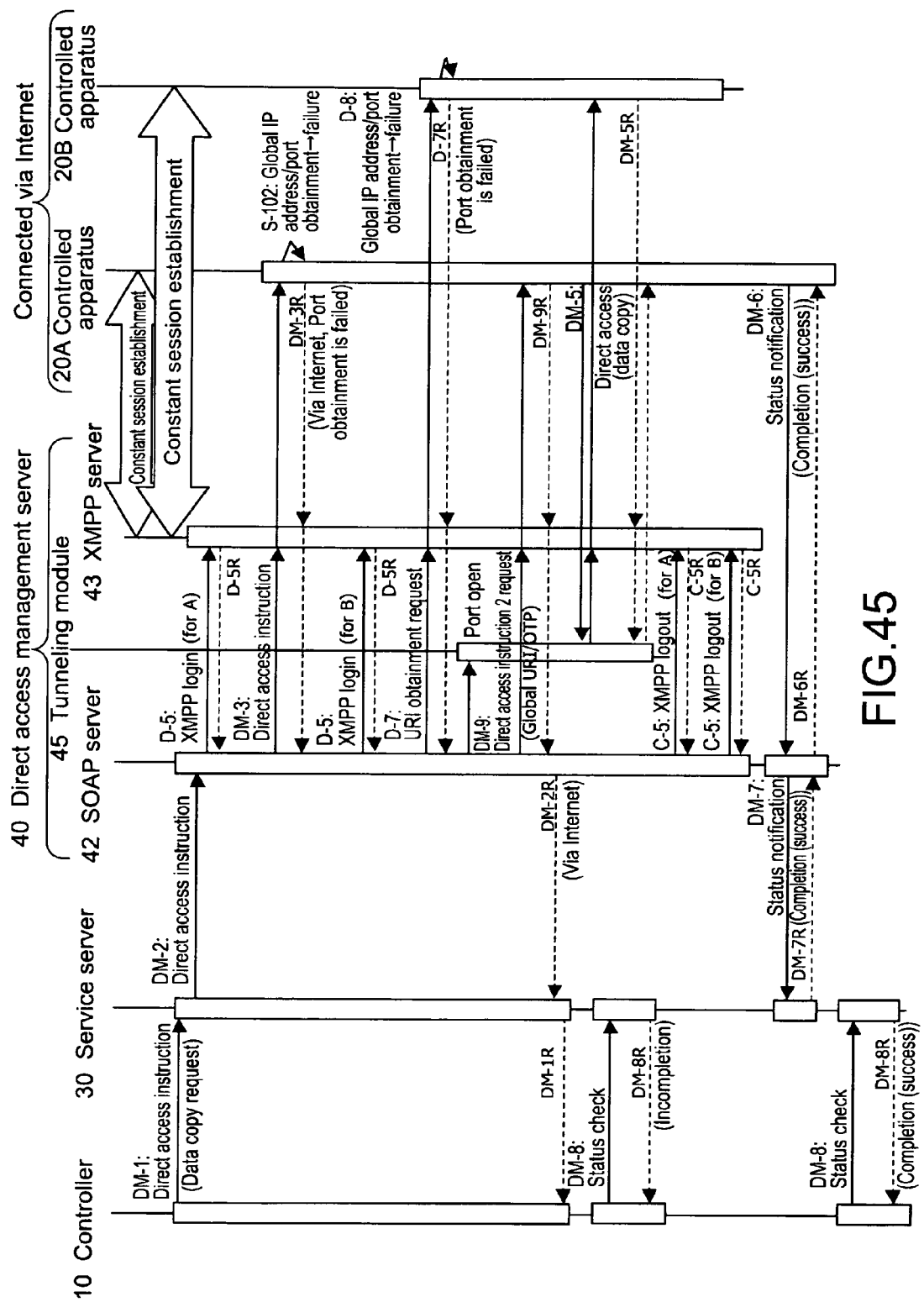
FIG. 45 is a sequence diagram showing an entire system relating to a copy processing of content data (4)
Figure 46:
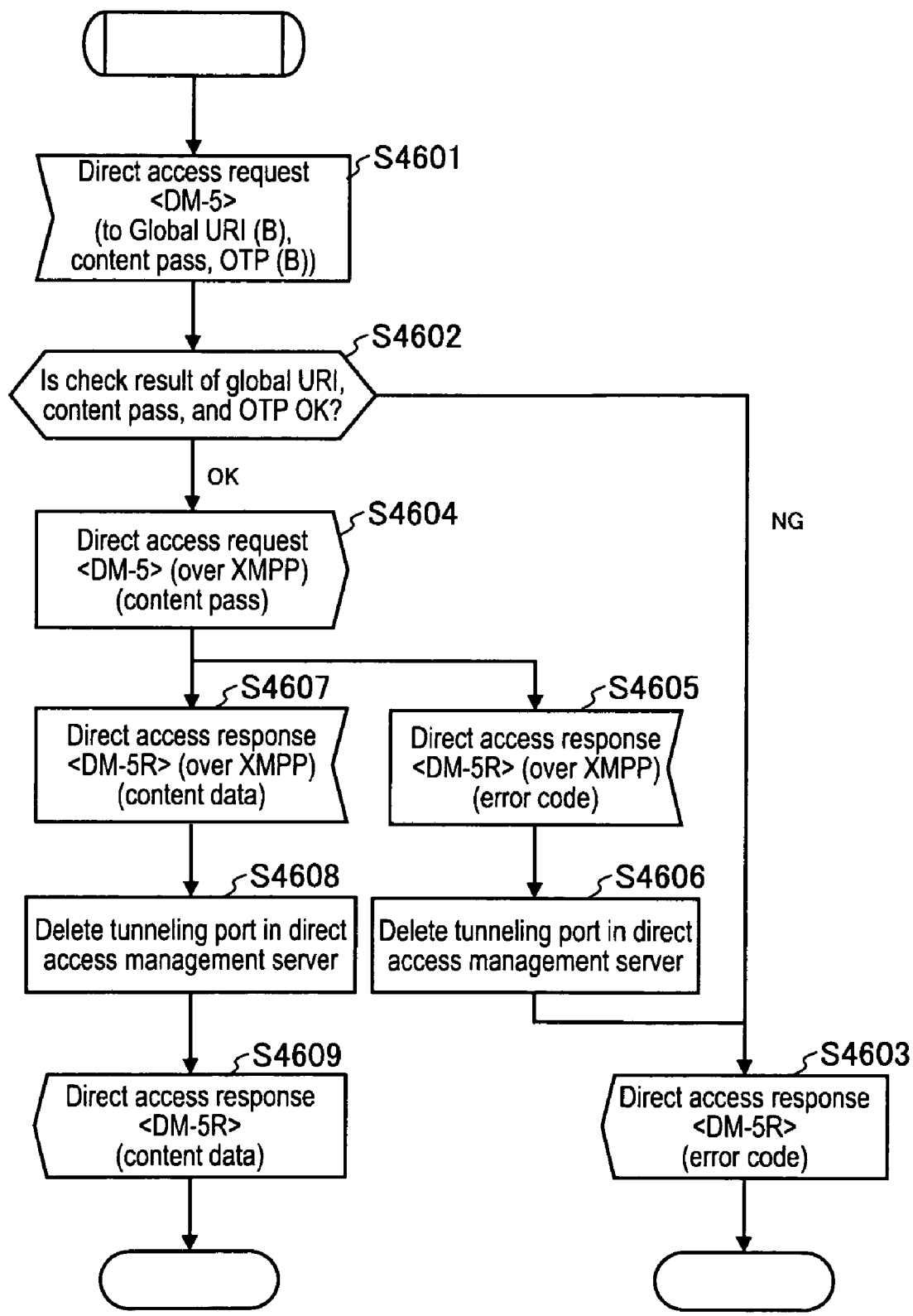
FIG. 46 is a flowchart showing an operation of the direct access management server relating to the copy processing of content data (4)

FIG. 45 is a sequence diagram showing an entire system relating to a copy processing of content data (4). FIG. 46 is a flowchart showing an operation of the direct access management server 40 relating to the copy processing of content data (4).

The operation from when the direct access instruction request <DM-1> is transmitted from the controller 10 to the service server 30 until the NAT setting request <D-8> of the port for the direct access is transmitted from the controlled apparatus 20B to the router 50 is the same as that in the above "6. Copy processing of content data (3)" section.

Upon reception of the error code indicating that the NAT setting is failed from the router 50 as the NAT setting response <D-8R> to the NAT setting request <D-8> of the port for the direct access (Step S4406 of FIG. 44), the controlled apparatus 20B transmits to the SOAP server 42 in the direct access management server 40 the error code that indicates an instruction to perform data transmission in a tunneling mode via a port for tunneling that is provided to the direct access management server 40, as the direct access URI obtainment response <D-7R> (Step S4407 of FIG. 44).

Upon reception of the error code indicating an instruction to perform data transmission in the tunneling mode as the direct access URI obtainment response <D-7R> from the controlled apparatus 20B (Step S4210 of FIG. 42), the SOAP server 42 in the direct access management server 40 assigns a port for tunneling to the direct access management server 40, sets, as the global URI to which the direct access request <DM-5> is to be transmitted (described later), the global URI constituted of the port number of the assigned port for tunneling and the global IP address of the direct access management server 40, and sets the OTP (Step S4211 of FIG. 42). The global URI and the OTP set are associated with each other and stored in the storage portion 41.

Next, the SOAP server 42 in the direct access management server 40 transmits the direct access instruction 2 request <DM-9> including the content of the direct access instruction and the transaction ID included in the direct access instruction request <DM-2> obtained from the service server 30 in Step S3501 of FIG. 35 and the global URI and the OTP set in Step S4211 of FIG. 42 to the controlled apparatus 20A through the constant connection session established between the controlled apparatus 20A and the XMPP server 43 in the direct access management server 40 (Step S4206 of FIG. 42).

Upon reception of the direct access instruction 2 request <DM-9> from the SOAP server 42 in the direct access management server 40 (Step S4113 of FIG. 41), the controlled apparatus 20A transmits the direct access instruction 2 response <DM-9R> to the SOAP server 42 in the direct access management server 40 (Step S4114 of FIG. 41).

Upon reception of the direct access instruction 2 response <DM-9R> from the controlled apparatus 20A (Step S4209 of FIG. 42), the SOAP server 42 in the direct access management server 40 transmits to the service server 30 the direct access instruction response <DM-2R> including the transaction ID and the access route information (=via the Internet) stored in the storage portion 41 (Step S4202 of FIG. 42).

Upon reception of the direct access instruction response <DM-2R> including the transaction ID and the access route information (=via the Internet) (Step S3207 of FIG. 32), the service server 30 stores in the storage portion 31 the status of "start" and the transaction ID included in the direct access instruction response <DM-2R> through association with each other (Step S3208 of FIG. 32). Then, the service server 30 transmits to the controller 10 the direct access instruction response <DM-1R> including the transaction ID (Step S3209 of FIG. 32). Upon reception of the direct access instruction response <DM-1R> including the transaction ID from the service server 30 (Step S3005 of FIG. 30), the controller 10 stores the transaction ID in the storage portion 11 and causes the display portion to display to the user a message indicating that the copy instruction of the content data is completed (Step S3006 of FIG. 30).

On the other hand, after transmitting the direct access instruction 2 response <DM-9R> to the SOAP server 42 in the direct access management server 40 in Step S4114 of FIG. 41, the controlled apparatus 20A transmits the direct access request <DM-5> including the OTP and the content pass to the global URI included in the direct access instruction 2 request <DM-9> (Step S4115 of FIG. 41). The global URI included in the direct access instruction 2 request <DM-9> is constituted of the global IP address of the direct access management server 40 and the port number of the port for tunneling. Therefore, the direct access request <DM-5> is received by a tunneling module 45 in the direct access management server 40. The tunneling module 45 refers to a module for controlling the transmission/reception of data by tunneling with the use of the port for tunneling.

Upon reception of the direct access request <DM-5> from the controlled apparatus 20A (Step S4601 of FIG. 46), the tunneling module 45 in the direct access management server 40 checks the global URI and the OTP included in the request (Step S4602 of FIG. 46). In this check, a case where the combination of the global URI and the OTP included in the direct access request <DM-5> received is stored in the storage portion 41 is judged to be OK, and a case where the combination is not stored therein is judged to be NG. When, the check result shows NG, the tunneling module 45 in the direct access management server 40 transmits an error code as the direct access response <DM-5R> to the controlled apparatus 20A (Step S4603 of FIG. 46).

Upon reception of the error code as the direct access response <DM-5R> from the tunneling module 45 in the direct access management server 40 (Step S4117 of FIG. 41), the controlled apparatus 20A transmits to the SOAP server 42 in the direct access management server 40 the status notification <DM-6> including a status of "completion (failure)" and the apparatus authentication continuation ID and transaction ID stored in the storage portion 21 (Step S3810 of FIG. 38). A subsequent operation is the same as that of the copy processing described above.

On the other hand, when the check result in Step S4602 of FIG. 46 shows OK, the tunneling module 45 in the direct access management server 40 transmits the direct access request <DM-5> including the content pass stored in the storage portion 41 to the controlled apparatus 20B through the constant connection session established between the XMPP server 43 and the controlled apparatus 20B (Step S4604 of FIG. 46).

Upon reception of the direct access request <DM-5> including the content pass from the tunneling module 45 in the direct access management server 40 through the constant connection session (Step S4412 of FIG. 44), the controlled apparatus 20B checks whether content data corresponding to the content pass included in the direct access request <DM-5> is present (Step S4413 of FIG. 44). When the content data is not present, the controlled apparatus 20B transmits an error code to this effect as the direct access response <DM-5R> to the tunneling module 45 in the direct access management server 40 through the constant connection session (Step S4414 of FIG. 44).

Upon reception of the error code as the direct access response <DM-5R> from the controlled apparatus 20B (Step S4605 of FIG. 46), the tunneling module 45 in the direct access management server 40 deletes the tunneling port set in the direct access management server 40 (Step S4606 of FIG. 46), and then transmits the error code to the controlled apparatus 20A as the direct access response <DM-5R> (Step S4603 of FIG. 46).

Upon reception of the error code as the direct access response <DM-5R> from the tunneling module 45 in the direct access management server 40 (Step S4117 of FIG. 41), the controlled apparatus 20A transmits to the SOAP server 42 in the direct access management server 40 the status notification <DM-6> including a status of "completion (failure)" and the apparatus authentication continuation ID and transaction ID stored in the storage portion 21 (Step S3810 of FIG. 38). A subsequent operation is the same as that of the copy processing described above.

When the check result in Step S4413 of FIG. 44 shows that the content data corresponding to the content pass is present, the controlled apparatus 20B transmits the content data to the tunneling module 45 in the direct access management server 40 as the direct access response <DM-5R> (Step S4415 of FIG. 44).

Upon reception of the content data as the direct access response <DM-5R> from the controlled apparatus 20B (Step S4607 of FIG. 46), the tunneling module 45 in the direct access management server 40 deletes the port for tunneling set in the direct access management server 40 (Step S4608 of FIG. 46), and transmits the content data to the controlled apparatus 20A as the direct access response <DM-5R> (Step S4609 of FIG. 46).

The controlled apparatus 20A receives the content data as the direct access response <DM-5R> from the tunneling module 45 in the direct access management server 40 (Step S4116 of FIG. 41) and stores the content data in the storage portion 21. Consequently, the copy of the content data from the controlled apparatus 20B to the controlled apparatus 20A is completed.

On the other hand, after transmitting the content data as the direct access response <DM-5R> to the controlled apparatus 20A, the SOAP server 42 in the direct access management server 40 transmits to the XMPP server 43 the XMPP logout request <C-5> including the XMPP session ID that can be used when the service server 30 directly accesses the controlled apparatus 20A. Then, after receiving the XMPP logout response <C-5R>, the SOAP server 42 deletes the XMPP session ID stored in the storage portion 41. Subsequently, the SOAP server 42 in the direct access management server 40 transmits to the XMPP server 43 the XMPP logout request <C-5> including the XMPP session ID that can be used when the service server 30 directly accesses the controlled apparatus 20B. Then, after receiving the XMPP logout response <C-5R>, the SOAP server 42 deletes the XMPP session ID stored in the storage portion 41. Thus, the XMPP logout of the service server 30 is completed.

After that, the processing proceeds to the status notification <DM-6> in Step S3810 of FIG. 38. The controlled apparatus 20A transmits, to the SOAP server 42 in the direct access management server 40, the status notification <DM-6> including the status of "completion (success)" and the apparatus authentication continuation ID and the transaction ID stored in the storage portion 21 (Step S3810 of FIG. 38). A subsequent operation is the same as that of the copy processing described above. Also, the operation when the controller 10 checks the status of the content of the direct access instruction with respect to the service server 30 at an arbitrary timing is the same as that of the copy processing described above.

[8. Cancel of Copy Processing of Content Data]

Next, a description will be given on an operation when a copy processing of content data is canceled, paused, and restarted under direct access control by the user in a case where the controlled apparatuses 20A and 20B are connected on the same LAN.

Figure 47:
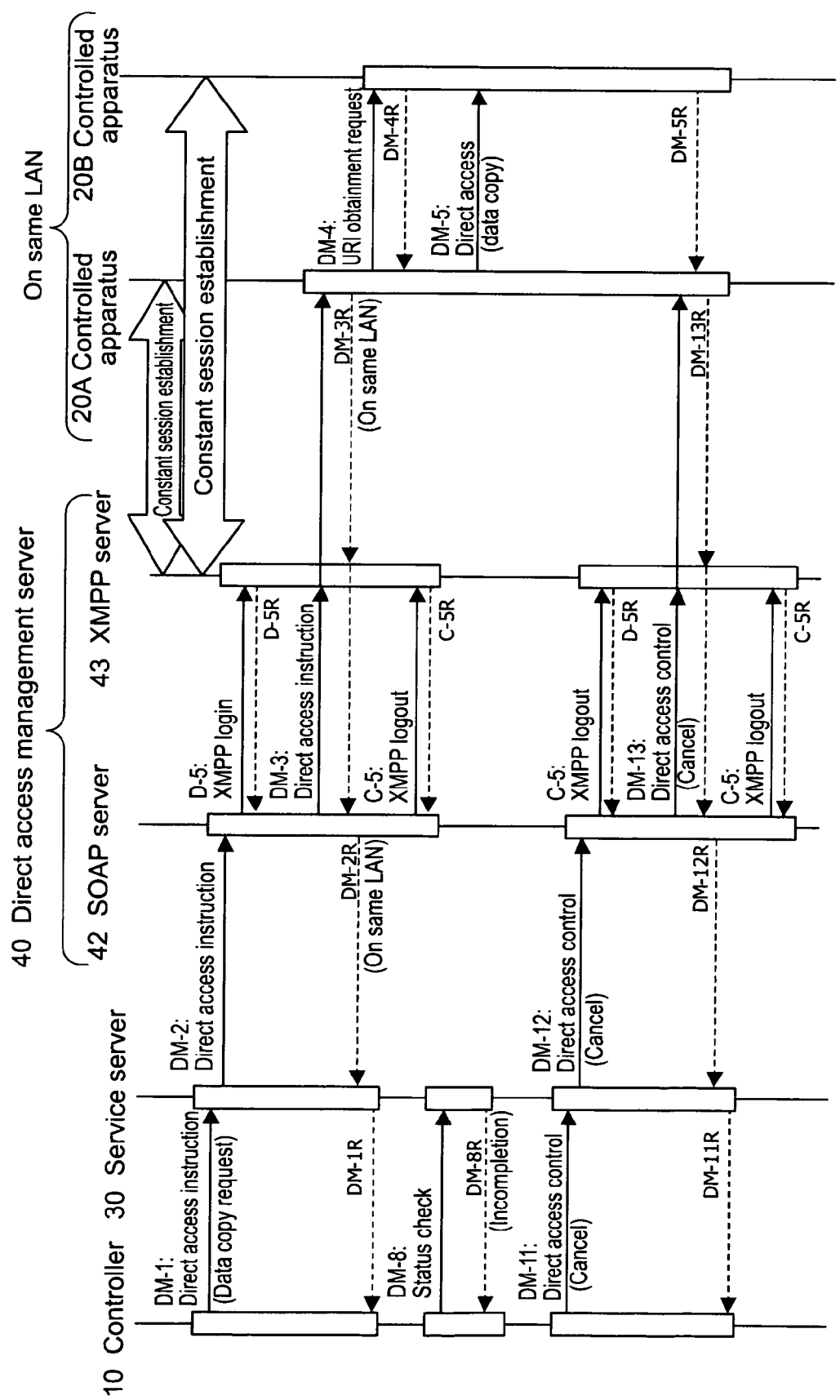
FIG. 47 is a sequence diagram showing an entire system relating to direct access control.
Figure 48:
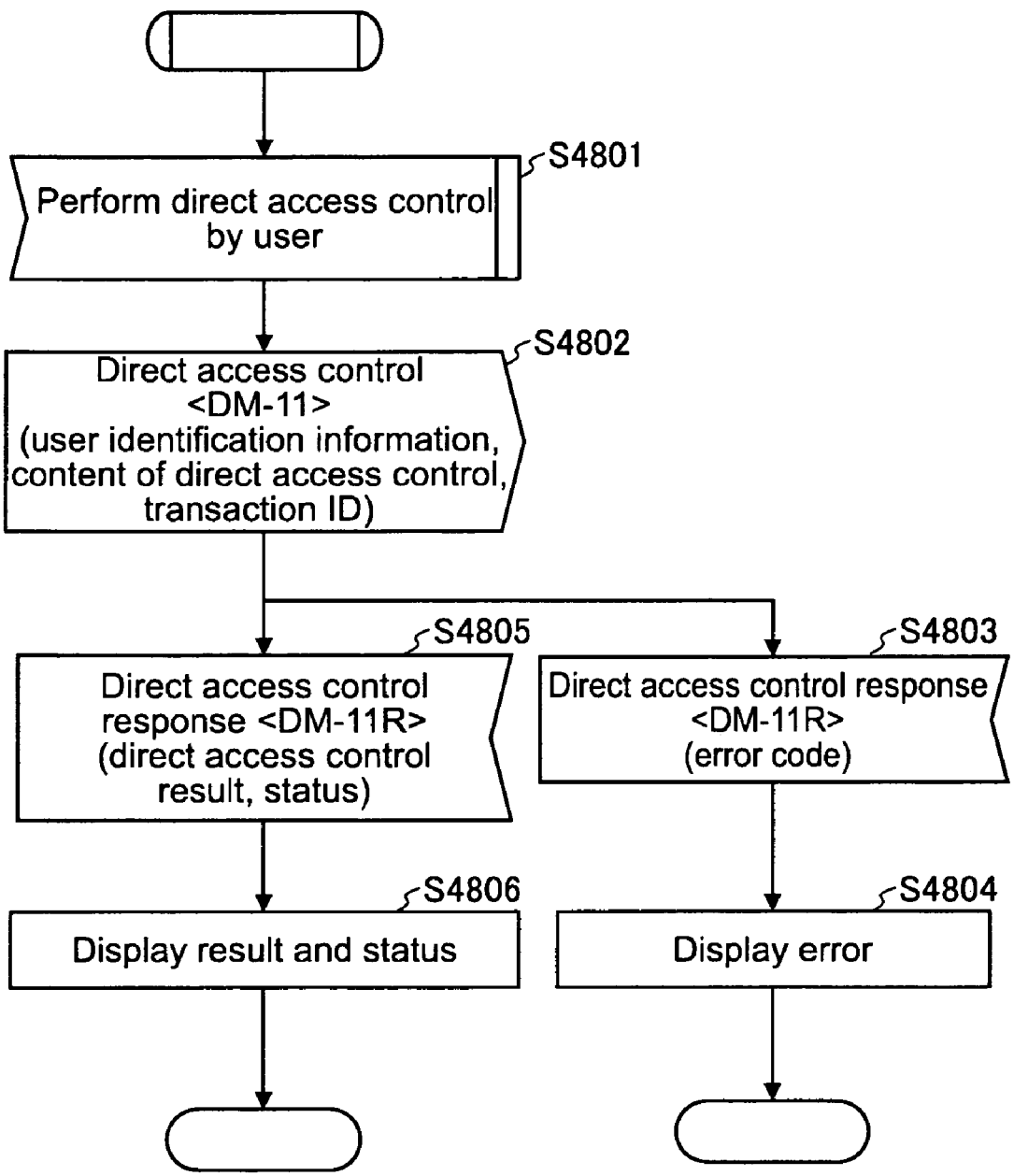
FIG. 48 is a flowchart showing an operation of the controller relating to the direct access control.
Figure 49:
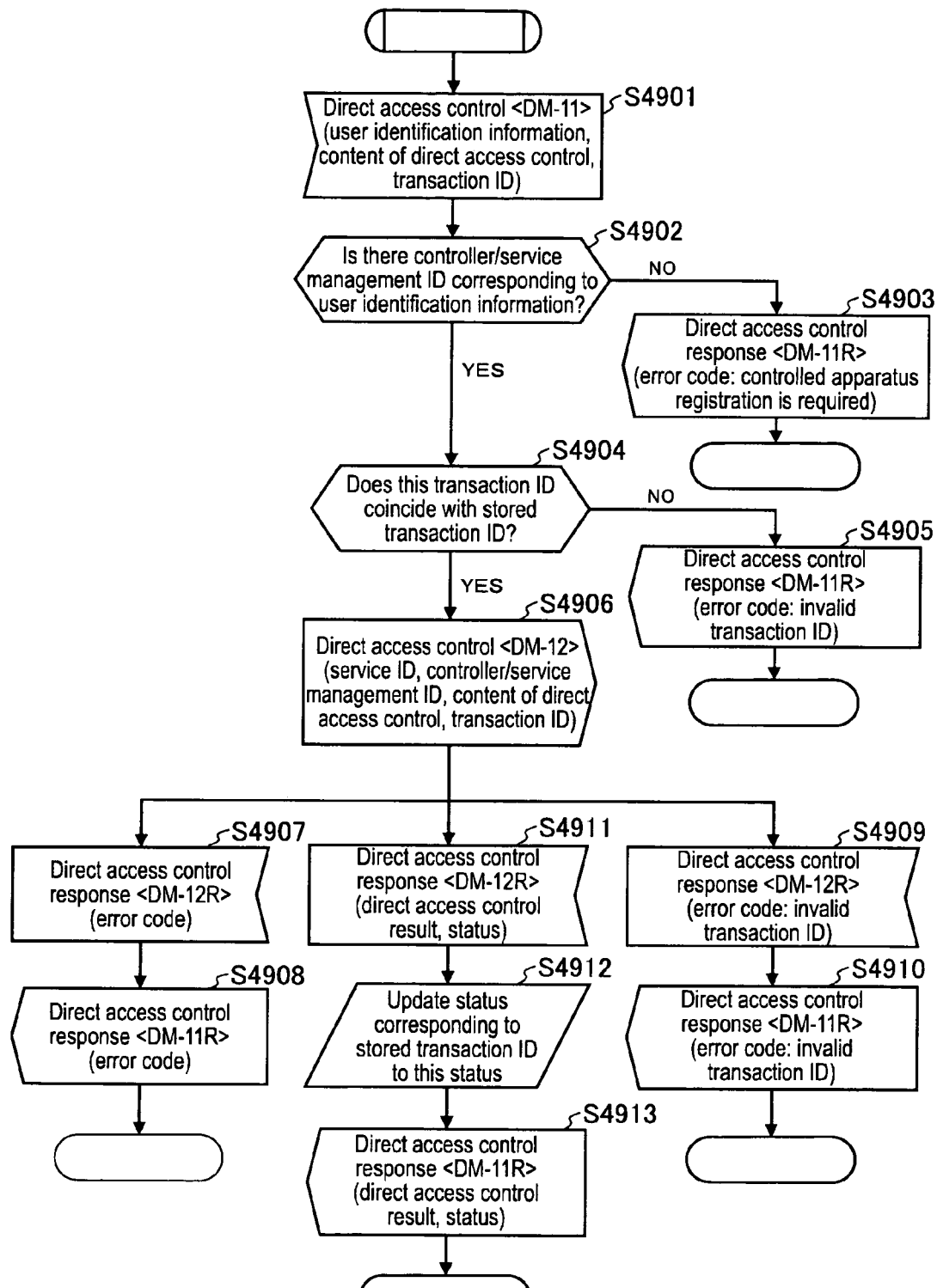
FIG. 49 is a flowchart showing an operation of the service server relating to the direct access control.
Figure 50:
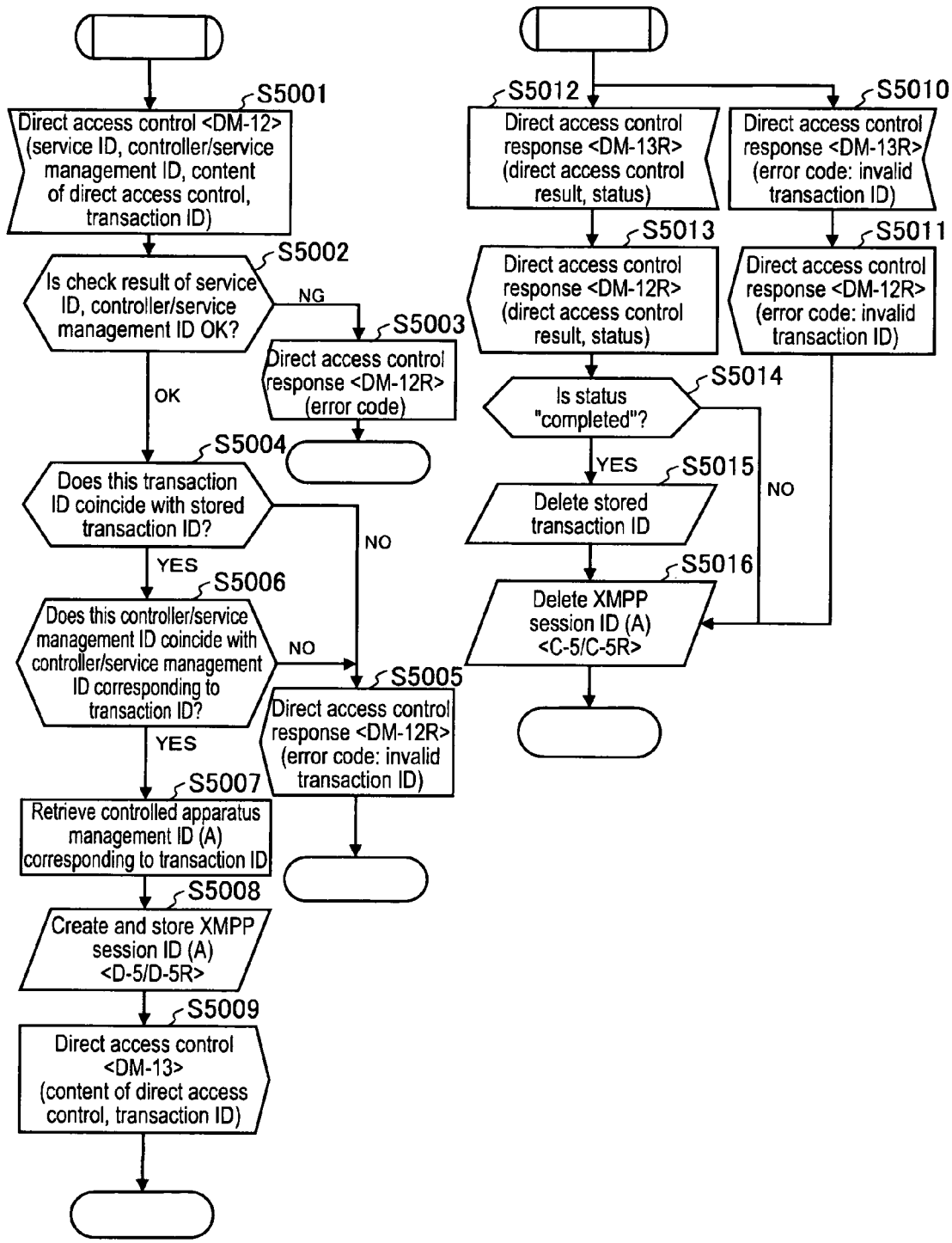
FIG. 50 is a flowchart showing an operation of the direct access management server relating to the direct access control.
Figure 51:
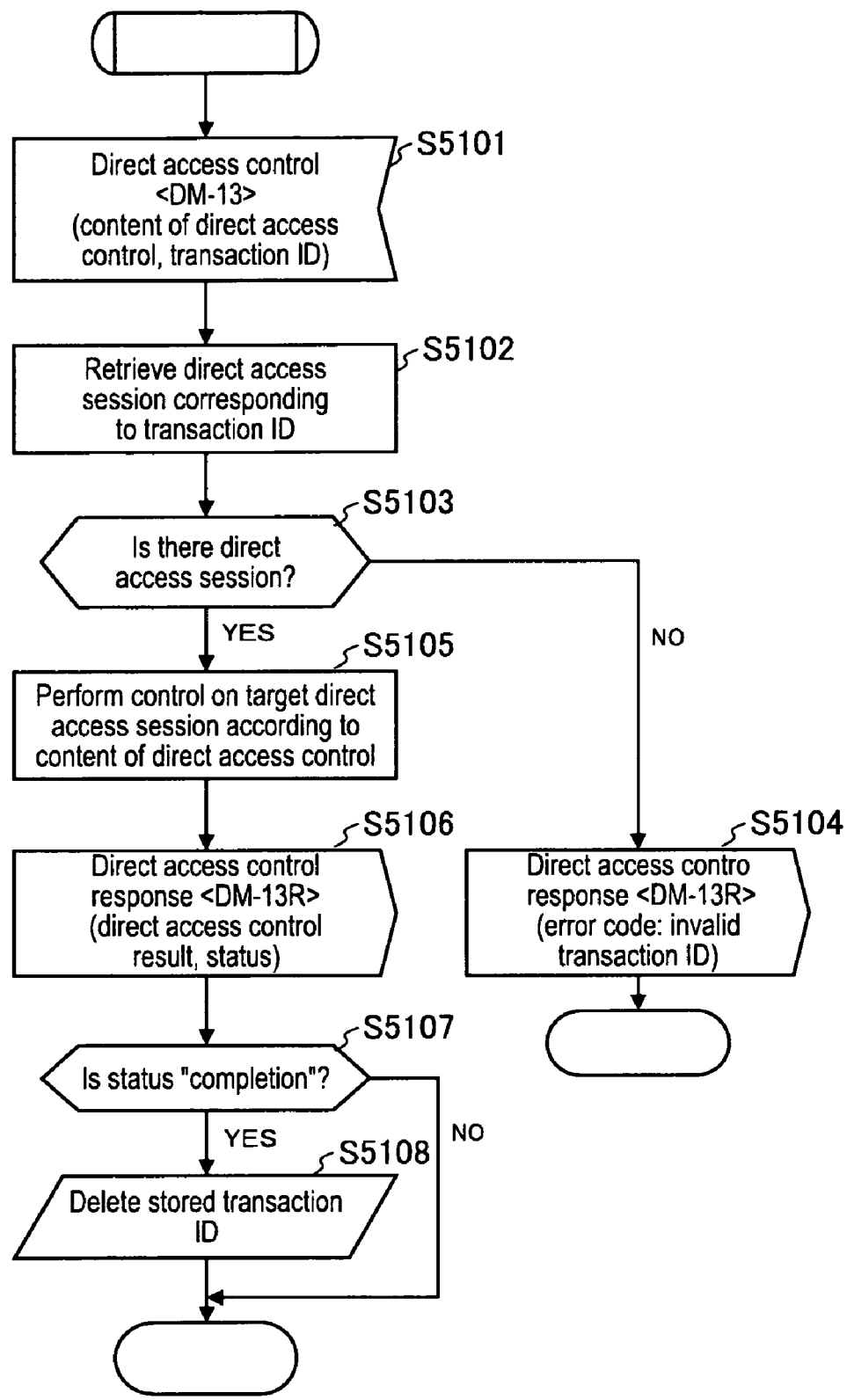
FIG. 51 is a flowchart showing an operation of the controlled apparatus relating to the direct access control.

FIG. 47 is a sequence diagram showing an entire system relating to the direct access control. FIG. 48 is a flowchart showing an operation of the controller 10 relating to the direct access control. FIG. 49 is a flowchart showing an operation of the service server 30 relating to the direct access control. FIG. 50 is a flowchart showing an operation of the direct access management server 40 relating to the direct access control. FIG. 51 is a flowchart showing an operation of the controlled apparatus 20 relating to the direct access control.

The operation of the entire system from when the direct access instruction request <DM-1> is transmitted from the controller 10 to the service server 30 until the controller 10 receives the direct access instruction response <DM-1R> including the transaction ID from the service server 30, stores the transaction ID in the storage portion 11, and causes the display portion to display to the user the message indicating the completion of the copy instruction of the content data is the same as that in the above "4. Copy processing of content data (1)" section.

After that, when the user of the controller 10 gives an instruction of the direct access control to the controller 10 (Step S4801 of FIG. 48), the controller 10 transmits to the service server 30 a direct access control request <DM-11> including a transaction ID, a content of a direct access control, user identification information preset thereto (Step S4802 of FIG. 48). The content of the direct access control is selected from among items relevant to the copy processing such as "cancel", "pause", and "restart" by the user. The transaction ID is a transaction ID corresponding to a copy processing that is a direct access control target in the copy processing currently performed.

Upon reception of a direct access control request <DM-11> from the controller 10 (Step S4901 of FIG. 49), the service server 30 judges whether a controller/service management ID corresponding to the user identification information included in the direct access control request <DM-11> is stored in the storage portion 31 (Step S4902 of FIG. 49). When the controller/service management ID is not stored, the service server 30 transmits to the controller 10 an error code indicating that registration of the controlled apparatus is required as a direct access control response <DM-11R> (Step S4903 of FIG. 49).

Upon reception of the error code as the direct access control response <DM-11R> from the service server 30, the controller 10 causes the display portion to display a message corresponding to the error code to the user (Step S4804 of FIG. 48).

On the other hand, when the service server 30 judges in Step S4902 of FIG. 49 that the controller/service management ID corresponding to the user identification information included in the direct access control request <DM-11> is stored in the storage portion 31, the service server 30 judges whether a transaction ID included in the direct access control request <DM-11> coincides with a transaction ID stored in the storage portion 31 (Step S4904 of FIG. 49). When the transaction IDs do not coincide, the service server 30 transmits to the controller 10 an error code indicating that the transaction ID is invalid as the direct access control response <DM-11R> (Step S4905 of FIG. 49).

When the service server 30 judges in Step S4904 of FIG. 49 that the transaction ID included in the direct access control request <DM-11> coincides with the transaction ID stored in the storage portion 31, the service server 30 transmits to the SOAP server 42 in the direct access management server 40 a direct access control request <DM-12> including a transaction ID, a content of a direct access control, the controller/service management ID, the service ID as information for identifying the service (Step S4906 of FIG. 49).

Upon reception of the direct access control request <DM-12> from the service server 30 (Step S5001 of FIG. 50), the SOAP server 42 in the direct access management server 40 judges whether the combination of the controller/service management ID and the service ID included in the direct access control request <DM-12> is stored in the storage portion 41 (Step S5002 of FIG. 50). When the combination is not stored in the storage portion 41, the SOAP server 42 in the direct access management server 40 transmits to the service server 30 an error code indicating that the registration of the controller apparatus is required as the direct access control response <DM-12R> (Step S5003 of FIG. 50).

Upon reception of the error code as the direct access control response <DM-12R> from the SOAP server 42 in the direct access management server 40 (Step S4907 of FIG. 49), the service server 30 transmits to the controller 10 the error code as the direct access control response <DM-11R> (Step S4908 of FIG. 49).

Upon reception of the error code as the direct access control response <DM-11R> from the service server 30 (Step S4803 of FIG. 48), the controller 10 causes the display portion to display a message corresponding to the error code to the user (Step S4804 of FIG. 48).

When the judgment result in Step S5002 of FIG. 50 shows that the combination of the controller/service management ID and the service ID included in the direct access control request <DM-12> is stored in the storage portion 41, the SOAP server 42 in the direct access management server 40 judges whether the transaction ID included in the direct access control request <DM-12> coincides with the transaction ID stored in the storage portion 41 (Step S5004 of FIG. 50). When the transaction IDs do not coincide, the SOAP server 42 in the direct access management server 40 transmits to the service server 30 an error code indicating that the transaction ID is invalid as the direct access control response <DM-12R> (Step S5005 of FIG. 50).

Upon reception of the error code indicating that the transaction ID is invalid as the direct access control response <DM-12R> from the SOAP server 42 in the direct access management server 40 (Step S4909 of FIG. 49), the service server 30 transmits to the controller 10 the error code as the direct access control response <DM-11R> (Step S4910 of FIG. 49).

Upon reception of the error code as the direct access control response <DM-11R> from the service server 30 (Step S4803 of FIG. 48), the controller 10 causes the display portion to display an message corresponding to the error code to the user (Step S4804 of FIG. 48).

When the judgment result in Step S5004 of FIG. 50 shows that the transaction ID included in the direct access control request <DM-12> coincides with the transaction ID stored in the storage portion 41, the SOAP server 42 in the direct access management server 40 judges whether the controller/service management ID included in the direct access control request <DM-12> coincides with the controller/service management ID corresponding to the transaction ID (Step S5006 of FIG. 50). When the controller/service management IDs do not coincide, the SOAP server 42 in the direct access management server 40 transmits to the service server 30 an error code indicating that the transaction ID is invalid as the direct access control response <DM-12R> (Step S5005 of FIG. 50). When the controller/service management IDs coincide, the SOAP server 42 in the direct access management server 40 retrieves the controller management ID corresponding to the transaction ID from the storage portion 41 (Step S5007 of FIG. 50).

Subsequently, the SOAP server 42 in the direct access management server 40 creates the XMPP session ID that can be used when the service server 30 directly accesses the controlled apparatus 20A, and stores in the storage portion 41 the XMPP session ID through association with the service ID, the controller/service management ID, the controlled apparatus management ID included in the direct access control request <DM-12> (Step S5008 of FIG. 50). After that, the SOAP server 42 in the direct access management server 40 transmits the direct access control request <DM-13> including the transaction ID and the content of the direct access control obtained from the direct access control request <DM-12> to the controlled apparatus 20A through the constant connection session established between the XMPP server 43 and the controlled apparatus 20A (Step S5009 of FIG. 50).

Upon reception of the direct access control request <DM-13> from the SOAP server 42 in the direct access management server 40 (Step S5101 of FIG. 51), the controlled apparatus 20A retrieves a direct access session corresponding to the transaction ID included in the direct access control request <DM-13> (Step S5102 of FIG. 51). When the direct access session corresponding to the transaction ID is not present (NO in Step S5103 of FIG. 51), the controlled apparatus 20A judges that the transaction ID included in the direct access control request <DM-13> is invalid, and transmits an error code to this effect as the direct access control response <DM-13R> to the SOAP server 42 in the direct access management server 40 through the constant connection session established between the XMPP server 43 and the controlled apparatus 20A (Step S5104 of FIG. 51).

Upon reception of the error code indicating that the transaction ID is invalid as the direct access control response <DM-13R> from the controlled apparatus 20A (Step S5010 of FIG. 50), the SOAP server 42 in the direct access management server 40 transmits to the service server 30 the error code indicating that the transaction ID is invalid as the direct access control response <DM-12R> (Step S5011 of FIG. 50). After that, the SOAP server 42 in the direct access management server 40 transmits to the XMPP server 43 the XMPP logout request <C-5> including the XMPP session ID that can be used when the service server 30 directly accesses the controlled apparatus 20A, receives the XMPP logout response <C-5R>, and then deletes the XMPP session ID stored in the storage portion 41 (Step S5016 of FIG. 50).

Upon reception of the error code indicating that the transaction ID is invalid as the direct access control response <DM-12R> from the SOAP server 42 in the direct access management server 40 (Step S4909 of FIG. 49), the service server 30 transmits to the controller 10 the error code as the direct access control response <DM-11R> (Step S4910 of FIG. 49).

Upon reception of the error code as the direct access control response <DM-11R> from the service server 30 (Step S4803 of FIG. 48), the controller 10 causes the display portion to display a message corresponding to the error code to the user (Step S4804 of FIG. 48).

When the judgment result in Step S5102 of FIG. 51 shows that the direct access session corresponding to the transaction ID is present (YES in Step S5103 of FIG. 51), the controlled apparatus 20A performs control on the direct access session based on the content of the direct access control included in the direct access control request <DM-13> (Step S5105 of FIG. 51). Although the contents of the direct access control include "cancel", "pause", "restart", and the like of the copy processing, the sequence diagram in FIG. 47 shows a case where the content of the direct access control is "cancel". In this case, the control is performed such that the copy processing in progress is canceled by the direct access session.

Upon completion of the direct access control, the controlled apparatus 20A transmits the direct access control response <DM-13R> including the direct access control result and the status to the SOAP server 42 in the direct access management server 40 through the constant connection session established between the XMPP server 43 and the controlled apparatus 20A (Step S5106 of FIG. 51). The direct access control result corresponds to the content of the direct access control. For example, when the content of the direct access control is "cancel", the direct access control result shows "cancel completion". The status is information indicating a status relating to the copy processing at the time of the cancel. When the copy processing is completed before the cancel, the result shows "completion (success)" or "completion (failure)". When the copy processing is not completed before the cancel, the result shows "incompletion". After that, when the status is "completion (success)" or "completion (failure)" (YES in Step S5107 of FIG. 51), the controlled apparatus 20A deletes the transaction ID corresponding to the completed direct access session (Step S5108 of FIG. 51). When the status is other than "completion (success)" or "completion (failure)" (NO in Step S5107 of FIG. 51), the processing is terminated with the transaction ID left in the storage portion 21.

On the other hand, upon reception of the direct access control response <DM-13R> including the direct access control result and the status from the controlled apparatus 20A (Step S5012 of FIG. 50), the SOAP server 42 in the direct access management server 40 transmits the direct access control response <DM-12R> including the direct access control result and the status to the service server 30 (Step S5013 of FIG. 50).

Upon reception of the direct access control response <DM-12R> including the direct access control result and the status from the SOAP server 42 in the direct access management server 40 (Step S4911 of FIG. 49), the service server 30 updates the content of the status corresponding to the transaction ID stored in the storage portion 31 in accordance with the content of the status in the direct access control response <DM-12R> (Step S4912 of FIG. 49). After that, the service server 30 transmits to the controller 10 the direct access control response <DM-11R> including the direct access control result and the status (Step S4913 of FIG. 49).

Upon reception of the direct access control response <DM-11R> including the direct access control result and the status from the service server 30 (Step S4805 of FIG. 48), the controller 10 causes the display portion to display the direct access control result and the status to the user (Step S4806 of FIG. 48).

After transmitting the direct access control response <DM-11R> to the controller 10, the service server 30 checks the content of the status. When the check result shows "completion (success)" or "completion (failure)" (YES in Step S5014 of FIG. 50), the service server 30 deletes the transaction ID corresponding to the direct access session in which the copy processing is completed (Step S5016 of FIG. 50). When the check result is other than "completion (success)" or "completion (failure)" (NO in Step S5014 of FIG. 50), the processing is terminated with the transaction ID left in the storage portion 21.

Described above is the operation when the copy processing of the content data is canceled, paused, and restarted based on the direct access control by the user in the case where the controlled apparatuses 20A and 20B are connected on the same LAN. The same holds true for a case where the controlled apparatuses 20A and 20B are connected via the Internet.

As described above, according to this embodiment, the content data can be directly transferred and copied from one controlled apparatus 20 to the other by the operation with the controller 10. As a result, the data transfer when the content data is copied between the controlled apparatuses 20 can be efficiently performed.

Further, according to this embodiment, regardless of whether the access route between the controlled apparatuses 20A and 20B is the same LAN or the Internet, the content data can be copied from one controlled apparatus 20 to the other by the same operation with the controller 10 without taking the difference into consideration by the user.

Further, according to this embodiment, when the obtainment of the global IP address and the port number of each of the controlled apparatuses 20A and 20B with the router 50 is failed, the port for tunneling is set in the direct access management server 40, with the result that the content data can be transferred from one controlled apparatus 20 to the other in the tunneling mode.

Further, according to this embodiment, by the operation with the controller 10, for example, the status (e.g., completion or incompletion) of the copy processing of the content data can be checked, or the copy processing in progress can be canceled or restarted, as needed.

It should be noted that the present invention is not limited to the above embodiment and can of course be variously changed without departing from the gist of the present invention.

What is claimed is:

1. A server apparatus, comprising:
a registration means for associating a first apparatus with a plurality of second apparatuses as the control targets thereof, and registering the first apparatus and the plurality of second apparatuses associated;
a constant connection session establishment means for establishing a constant connection session with each of the plurality of second apparatuses;
a request reception means for receiving from the first apparatus a first request to transfer data between the plurality of second apparatuses, wherein the first request includes information to specify one of the plurality of second apparatuses as a data transfer source and information to specify one of the plurality of second apparatuses as a data transfer destination;
a request transmission means for transmitting a second request to directly transfer data between the plurality of second apparatuses to the second apparatus as the data transfer destination through the constant connection session in response to the received first request, wherein the second request includes login identification information of the second apparatus as the data transfer source required for the second apparatus as the data transfer source to log into the server apparatus; and
a determining means for determining, based on information from the second apparatus as the data transfer destination relating to an access route between the second apparatus as the data transfer source and the second apparatus as the data transfer destination, the information relating to the access route being based on a determination by the second apparatus as the data transfer destination whether the login identification information of the second request coincides with login identification information of the second apparatus as the data transfer source stored at the second apparatus as the data transfer destination as login identification of an apparatus among the second apparatuses connected to the second apparatus as the data transfer destination via a same local access network, (i) the access route between the second apparatus as the data transfer source and the second apparatus as the data transfer destination is via the same local access network on which the second apparatus as the data transfer source and the second apparatus as the data transfer destination are connected and (ii) the access route between the second apparatus as the data transfer source and the second apparatus as the data transfer destination is via the Internet,
wherein at least one of the registration means, the constant connection session establishment means, the request reception means, the request transmission means or the determining means includes a processor.

2. The server apparatus according to claim 1, wherein the first request includes information to specify data to be transferred.

3. The server apparatus according to claim 1, further comprising:
means for receiving, from the one of the plurality of second apparatuses that receives the second request, information relating to an access route between the plurality of second apparatuses; and
means for exchanging, in a case where it is determined that the access route between the plurality of second apparatuses is the Internet based on the received information relating to the access route, information between the plurality of second apparatuses, which is necessary to directly transfer data between the plurality of second apparatuses via the Internet.

4. The server apparatus according to claim 3, further comprising:
means for setting, in a case where the information necessary to directly transfer data between the plurality of second apparatuses via the Internet is failed to be obtained, a port for tunneling, and transmitting information necessary to access the port for tunneling to the one of the plurality of second apparatuses via the constant connection session; and means for performing control such that data is transferred between the plurality of second apparatuses via the port for tunneling and the constant connection session established with the other one of the plurality of second apparatuses.

5. The server apparatus according to claim 1, further comprising:
means for receiving a data transfer completion notification from the one of the plurality of second apparatuses; and
means for transmitting to the first apparatus the data transfer completion notification received from the one of the plurality of second apparatuses.

6. The server apparatus according to claim 1, further comprising:
means for receiving from the first apparatus a third request to cancel data transfer in progress between the plurality of second apparatuses; and
means for transmitting a request to stop data transfer in progress between the plurality of second apparatuses to one of the plurality of second apparatuses via the constant connection session in response to the third request.

7. A network system, comprising:
a first apparatus;
a plurality of second apparatuses, each of which is a control target of the first apparatus; and
a server apparatus,
wherein the first apparatus includes
a first request transmission means for transmitting to the server apparatus a first request to transfer data between the plurality of second apparatuses, wherein the first request includes information to specify one of the plurality of second apparatuses as a data transfer source and information to specify one of the plurality of second apparatuses as a data transfer destination,
wherein the server apparatus includes
a registration means for associating the first apparatus with the plurality of second apparatuses as the control targets thereof and registering the first apparatus and the plurality of second apparatuses associated,
a constant connection session establishment means for establishing a constant connection session with each of the plurality of second apparatuses,
a request reception means for receiving from the first apparatus the first request to transfer data between the plurality of second apparatuses,
a second request transmission means for transmitting a second request to directly transfer data between the plurality of second apparatuses to the second apparatus as the data transfer destination through the constant connection session in response to the received first request, wherein the second request includes login identification information of the second apparatus as the data transfer source required for the second apparatus as the data transfer source to log into the server apparatus,
a determining means for determining, based on information from the second apparatus as the data transfer destination relating to an access route between the second apparatus as the data transfer source and the second apparatus as the data transfer destination, the information relating to the access route being based on a determination by the second apparatus as the data transfer destination whether the login identification information of the second request coincides with login identification information of the second apparatus as the data transfer source stored at the second apparatus as the data transfer destination as login identification of an apparatus among the second apparatuses connected to the second apparatus as the data transfer destination via a same local access network, (i) the access route between the second apparatus as the data transfer source and the second apparatus as the data transfer destination is via the same local access network on which the second apparatus as the data transfer source and the second apparatus as the data transfer destination are connected and (ii) the access route between the second apparatus as the data transfer source and the second apparatus as the data transfer destination is via the Internet, and
wherein the plurality of second apparatuses each include
a data transfer means for transferring data between the plurality of second apparatuses in response to the second request from the server apparatus.

8. A data transfer method for a network system including a first apparatus, a plurality of second apparatuses as control targets thereof, and a server apparatus, the data transfer method comprising:
transmitting a first request to transfer data between the plurality of the second apparatuses from a first request means of the first apparatus to the server apparatus, wherein the first request includes information to specify one of the plurality of second apparatuses as a data transfer source and information to specify one of the plurality of second apparatuses as a data transfer destination;
associating the first apparatus with the plurality of second apparatuses and registering the first apparatuses and the plurality of second apparatuses by a registering means of the server apparatus;
establishing a constant connection session with each of the plurality of second apparatuses by a constant connection session establishment means of the server apparatus;
transmitting a second request to directly transfer data between the plurality of second apparatuses to the second apparatus as the data transfer destination through the constant connection session by a second request transmission means of the server apparatus in response to the first request received from the first apparatus, wherein the second request includes login identification information of the second apparatus as the data transfer source required for the second apparatus as the data transfer source to log into the server apparatus;
determining, based on information from the second apparatus as the data transfer destination relating to an access route between the second apparatus as the data transfer source and the second apparatus as the data transfer destination, the information relating to the access route being based on a determination by the second apparatus as the data transfer destination whether the login identification information of the second request coincides with login identification information of the second apparatus as the data transfer source stored at the second apparatus as the data transfer destination as login identification of an apparatus among the second apparatuses connected to the second apparatus as the data transfer destination via a same local access network, (i) the access route between the second apparatus as the data transfer source and the second apparatus as the data transfer destination is via the same local access network on which the second apparatus as the data transfer source and the second apparatus as the data transfer destination are connected as opposed to (ii) the access route between the second apparatus as the data transfer source and the second apparatus as the data transfer destination is via the Internet, and transferring data between the plurality of second apparatuses by a data transfer means of the plurality of second apparatuses in response to the second request from the server apparatus.

9. A non-transitory storage medium recorded with a computer-readable program executable by a computer, wherein the program comprises:
associating a first apparatus with a plurality of second apparatuses as the control targets thereof and registering the first apparatus and the plurality of second apparatuses associated,
establishing a constant connection session with each of the plurality of second apparatuses,
receiving from the first apparatus a first request to transfer data between the plurality of second apparatuses, wherein the first request includes information to specify one of the plurality of second apparatuses as a data transfer source and information to specify one of the plurality of second apparatuses as a data transfer destination,
transmitting a second request to directly transfer data between the plurality of second apparatuses to the second apparatus as the data transfer destination through the constant connection session in response to the received first request, wherein the second request includes login identification information of the second apparatus as the data transfer source required for the second apparatus as the data transfer source to log into a server, and
determining, based on information from the second apparatus as the data transfer destination relating to an access route between the second apparatus as the data transfer source and the second apparatus as the data transfer destination, the information relating to the access route being based on a determination by the second apparatus as the data transfer destination whether the login identification information of the second request coincides with login identification information of the second apparatus as the data transfer source stored at the second apparatus as the data transfer destination as login identification of an apparatus among the second apparatuses connected to the second apparatus as the data transfer destination via a same local access network, (i) the access route between the second apparatus as the data transfer source and the second apparatus as the data transfer destination is via the same local access network on which the second apparatus as the data transfer source and the second apparatus as the data transfer destination are connected as opposed to (ii) the access route between the second apparatus as the data transfer source and the second apparatus as the data transfer destination is via the Internet.

10. A server apparatus, comprising:
a registration unit to associate a first apparatus with a plurality of second apparatuses as the control targets thereof, and register the first apparatus and the plurality of second apparatuses associated;
a constant connection session establishment unit to establish a constant connection session with each of the plurality of second apparatuses;
a request reception unit to receive from the first apparatus a first request to transfer data between the plurality of second apparatuses, wherein the first request includes information to specify one of the plurality of second apparatuses as a data transfer source and information to specify one of the plurality of second apparatuses as a data transfer destination; and
a request transmission unit to transmit a second request to directly transfer data between the plurality of second apparatuses to the second apparatus as the data transfer destination through the constant connection session in response to the received first request, wherein the second request includes login identification information of the second apparatus as the data transfer source required for the second apparatus as the data transfer source to log into the server apparatus,
a determination unit to determine, based on information from the second apparatus as the data transfer destination relating to an access route between the second apparatus as the data transfer source and the second apparatus as the data transfer destination, the information relating to the access route being based on a determination by the second apparatus as the data transfer destination whether the login identification information of the second request coincides with login identification information of the second apparatus as the data transfer source stored at the second apparatus as the data transfer destination as login identification of an apparatus among the second apparatuses connected to the second apparatus as the data transfer destination via a same local access network, (i) the access route between the second apparatus as the data transfer source and the second apparatus as the data transfer destination is via the same local access network on which the second apparatus as the data transfer source and the second apparatus as the data transfer destination are connected and (ii) the access route between the second apparatus as the data transfer source and the second apparatus as the data transfer destination is via the Internet,
wherein at least one of the registration unit, the constant connection session establishment unit, the request reception unit, the request transmission unit or the determination unit includes a processor.

* * * * *